United States Patent
Takimoto et al.

(10) Patent No.: US 6,942,245 B2
(45) Date of Patent: *Sep. 13, 2005

(54) AIR BAG DEVICE FOR KNEE PROTECTION

(75) Inventors: Masahiro Takimoto, Aichi (JP); Toru Koyama, Aichi (JP)

(73) Assignee: Toyoda Gosei, Co., Ltd., Aichi-ken (JP)

( * ) Notice: Subject to any disclaimer, the term of this patent is extended or adjusted under 35 U.S.C. 154(b) by 61 days.

This patent is subject to a terminal disclaimer.

(21) Appl. No.: 10/311,330

(22) PCT Filed: Jul. 5, 2001

(86) PCT No.: PCT/JP01/05847

§ 371 (c)(1),
(2), (4) Date: Dec. 30, 2002

(87) PCT Pub. No.: WO02/04261

PCT Pub. Date: Jan. 17, 2002

(65) Prior Publication Data

US 2003/0132617 A1 Jul. 17, 2003

(30) Foreign Application Priority Data

| Jul. 7, 2000 | (JP) | ........................ 2000-207289 |
| Sep. 4, 2000 | (JP) | ........................ 2000-267177 |
| Dec. 13, 2000 | (JP) | ........................ 2000-379371 |
| Dec. 18, 2000 | (JP) | ........................ 2000-384096 |

(51) Int. Cl.[7] ............................................ B60R 21/22
(52) U.S. Cl. .................................. 280/730.1; 280/743.1
(58) Field of Search ........................... 280/728.2, 730.1, 280/731, 732, 743.1

(56) References Cited

U.S. PATENT DOCUMENTS

| 3,618,978 A | * | 11/1971 | Klove et al. | ............. 280/730.1 |
| 3,784,223 A | * | 1/1974 | Hass et al. | ................ 280/730.1 |
| 4,543,848 A | * | 10/1985 | Beauch | ........................ 74/493 |
| 4,773,674 A | * | 9/1988 | Wierschem | .................. 280/777 |
| 5,570,901 A | * | 11/1996 | Fyrainer | .................. 280/730.1 |
| 6,073,959 A | * | 6/2000 | Heinz et al. | ................. 280/729 |
| 6,092,836 A | * | 7/2000 | Saslecov | .................. 280/730.1 |

FOREIGN PATENT DOCUMENTS

| DE | 29807424 U1 | 10/1998 |
| DE | 19900592 A1 | 7/2000 |
| EP | 0684167 A1 | 11/1995 |
| EP | 0818360 A1 | 1/1998 |
| JP | 08-080797 | 3/1996 |
| JP | A-8-301054 | 11/1996 |
| JP | A-9-123863 | 5/1997 |
| JP | A-10-59103 | 3/1998 |
| JP | A-10-71911 | 3/1998 |
| JP | A-10-315894 | 12/1998 |
| JP | A-11-240411 | 9/1999 |
| JP | A-2000-225911 | 8/2000 |

* cited by examiner

Primary Examiner—David R. Dunn
(74) Attorney, Agent, or Firm—Posz Law Group, PLC

(57) ABSTRACT

A knee protecting airbag device (M1), wherein an airbag (26) covers the substantial lower surface (9a) of a column cover (9) protruded to a driver side. Therefore, the airbag is minimized in the capacity without deteriorating the protection of the knee of the driver. As a result, it is possible to shorten the time period required for the airbag to complete the expansion and inflation. The airbag has a generally plate shape capable of covering at least the lower surface of the column cover when it completes the inflation. Even if the knee of the driver comes close to the column cover when the driver depresses a brake pedal or the like, the airbag being expanded and inflated is smoothly arranged in a narrow space between the knee of the driver and the column cover lower surface without interfering with the knee of the driver. With the knee protecting airbag device according to the present invention, therefore, the airbag is rapidly expanded and inflated in the narrow space between the column cover and the knee of the driver thereby to protect the knee of the driver properly.

9 Claims, 44 Drawing Sheets

Sectional View Taken Along Line X-X

Sectional View
Taken Along Line XI-XI

Completely
Inflated Time

AIR BAG DEVICE FOR KNEE PROTECTION

BACKGROUND OF THE INVENTION

1. Field of the Invention

The present invention relates to a knee protecting airbag device in which an airbag to be expanded and inflated with an inflating gas let in protects the knee of a driver.

2. Description of Related Art

In the prior art, the device for protecting the knee of a driver is known in Japanese Patent Laid-Open No. 6-32195, EP Publication No. 0684167A1, EP Publication No. 0818360A1 and so on. In the prior art, more specifically, there is a device which has a pad near a column cover below a steering wheel to protrude to hold the knee of the driver when activated. There is another device which has an airbag to expand and inflate to protect the knee of the driver when activated.

However, the knee protecting devices of the prior art have a room for further improvement in the proper protection of the knee of the driver although the activated pad or airbag covers a wide area.

More specifically, there are partially arranged hard parts such as a key cylinder, a parking brake release lever or a telescopic mechanism control lever around the knee of the driver. In the devices of the prior art, however, a pad or an airbag is arranged for evenly covering not only those hard portions but also non-hard portions apart from the hard portions.

On the other hand, when the device acts, the driver mostly depresses a brake pedal. In this case, the space between the column cover and the knee of the driver is narrow. Therefore, it may be difficult to arrange a pad or an airbag smoothly between the column cover and the knee of the driver. Thus, there is a room for improvement in the proper protection of the knee of the driver from this viewpoint as well.

SUMMARY OF THE INVENTION

The present invention contemplates to solve the above-specified problems and has an object to provide a knee protecting airbag device capable of protecting the knee of a driver properly.

In a first knee protecting airbag device according to the present invention, an airbag for protecting the knee of the driver is so folded and housed below the steering column as to expand and inflate while rising along the lower surface of the column cover. This airbag takes such a generally plate shape when having completed the expansion and inflation as can cover only the substantial lower surface of a column cover covering a steering column.

In the first knee protecting airbag device according to the present invention, the airbag is constructed to cover only the substantial lower surface of the column cover protruded to the driver's side. Therefore, the airbag can minimize its capacity without deteriorating the protection performance of the knee of the driver. As a result, it is possible to shorten the time period till the expansion and inflation are completed.

On the other hand, the airbag has a generally plate shape capable of covering only the lower surface of the column cover when it completes the inflation. Therefore, even if the knee of the driver comes close to the column cover when the driver depresses a brake pedal or the like, the airbag being expanded and inflated is smoothly arranged in a narrow space between the knee of the driver and the column cover lower surface without interfering with the knee of the driver. Especially at the time of the expansion and inflation, the airbag rises along the column cover lower surface, so that it goes more smoothly into the clearance between the knee of the driver and the column cover lower surface.

With the first knee protecting airbag device according to the present invention, therefore, the airbag is rapidly expanded and inflated in the narrow space between the column cover and the knee of the driver, thereby to protect the knee of the driver properly.

In the first knee protecting airbag device according to the present invention, moreover, minimum capacity of the airbag helps downsize the airbag device including the inflator for feeding the inflating gas to the airbag. As a result, the airbag device is easily mounted on the vehicle without interfering with the surrounding parts even if it is housed either within the lower portion of the column cover or within the lower panel of the instrument panel below the column cover.

In the first knee protecting airbag device of the present invention, when a hard portion is to be formed on the lower surface of the column cover, the airbag is desirably constructed to cover the hard portion when completing the expansion and inflation. In this construction, the airbag having completed the expansion and inflation covers the hard portion in the column cover. Therefore, the knee of the driver is restrained by the airbag, instead of interfering with the hard portion, so that the knee is properly protected.

The aforementioned hard portion is formed of a key cylinder and so on arranged on the column cover side face.

In the aforementioned airbag, it is desired that the portion for covering the hard portion is set thicker than the remaining general portion. In this construction, it is not that the airbag is thickened as a whole. Instead, the airbag is constructed so that only the portion for covering the hard portion is made thicker than the remaining general portion. In other words, the remaining general portion can be made as thin as possible. Therefore, the airbag can be as small and compact as possible when it completes the inflation, thereby to shorten the time period from the action start to the completion of the expansion and inflation. Moreover, the airbag also takes a compact shape when housed. Naturally, the capacity of the airbag can be minimized so that it can be easily arranged, when expanded and inflated, in the narrow space between the column cover and the knee.

On the other hand, in the first knee protecting airbag device, it is desired that the thickness of the airbag is set by connecting the peripheral walls, as opposed in the thickness direction to each other, partially. With this construction, the airbag being expanded and inflated is easily formed into a plate shape by connecting the peripheral walls partially to each other. In this construction, moreover, the portions having different thickness can be easily formed in the airbag, and the thick portions of the airbag can be easily positioned.

When these peripheral walls are to be connected, moreover, the airbag to be expanded and inflated can be formed more easily into a plate shape if a plurality of connection portions are arranged in the airbag.

In a second knee protecting airbag device according to the present invention, an airbag capable of protecting the knee of a driver takes a generally plate shape when having completed the expansion and inflation. The airbag is constructed to cover the lower surface of a column cover and at least a hard portion in the vicinity of the column cover. Moreover, the airbag is so folded and housed below the steering column that it can be expanded and inflated while rising along the lower surface of the column cover.

In this second knee protecting airbag device, the airbag covers the column cover lower surface including the vicinity of the column cover over a wide range. Therefore, the airbag widens the protection range to protect the knee of the driver effectively. Moreover, since the airbag having completed the expansion and inflation covers the hard portion near the column cover, the airbag restrains the knee of the driver, which would otherwise interfere with the hard portion, so that the airbag protects the knee of the driver properly. Naturally, the airbag has a generally plate shape when it completes the inflation. Even if the knee of the driver comes close to the column cover when the driver depresses a brake pedal or the like, the airbag being expanded and inflated is smoothly arranged in the narrow space between the knee of the driver and the column cover lower surface. At the time of the expansion and inflation, moreover, the airbag rises along the column cover lower surface, so that it can go more smoothly into the clearance between the knee of the driver and the column cover lower surface.

The aforementioned hard portion can be exemplified by an arrangement portion for a key cylinder.

In the second knee protecting airbag device, too, the airbag is desirably constructed to make the portion for covering the hard portion thicker than the remaining general portion. In this construction, the airbag is not thickened as a whole but is made thicker only at the portion for covering the hard portion than the remaining general portion. Accordingly, the remaining general portion can be made as thin as possible. Therefore, the airbag protects the knee of the driver efficiently from the hard portion. Moreover, the airbag can make the capacity as small and compact as possible when it completes the inflation and can shorten the time period from the action start to the completion of the expansion and inflation. Moreover, the airbag also makes its shape compact when housed. Naturally, this construction minimizes the capacity of the airbag so that the expanded and inflated airbag is easily arranged in the narrow space between the column cover and the knee.

In the second knee protecting airbag device, too, the thickness of the airbag is desirably set by connecting the peripheral walls, as opposed in the thickness direction to each other, partially. With this construction, the airbag being expanded and inflated is easily formed into a plate shape by connecting the peripheral walls partially to each other. Moreover, it is easy to form portions of different thickness in the airbag, and to position the thickened portions in the airbag.

When these peripheral walls are to be connected to each other, the airbag to be expanded and inflated is formed more easily in its entirety into a plate shape if a plurality of connection portions are arranged in the airbag.

In a third knee protecting airbag device according to the invention, an airbag capable of protecting the knee of a driver is formed into such a shape when having completed the expansion and inflation as covers at least the lower surface of a column cover covering a steering column. Moreover, the airbag is constructed to set the portion for covering a hard area thicker than the remaining general portion. The airbag is so folded and housed below the steering column as to expand and inflate while rising along the lower surface of the column cover.

In this third knee protecting airbag device, the airbag having completed the expansion and inflation covers not only the lower surface of the column cover but also the hard area with the portions which have been set to have a larger thickness. Therefore, the knee of the driver, which would otherwise interfere with the hard area, is restrained, by the thick portions of the airbag having high cushioning actions so that it can be properly protected by the airbag. Since the airbag covers at least the lower side of the column cover protruded to the driver's side, it naturally protects the knee of the driver as well from the column cover.

Moreover, the airbag is not thickened as a whole, but is made thicker only at the portion for covering the hard area than the remaining general portion. Therefore, the airbag can be as small and compact as possible when it completes the inflation, thereby to shorten the time period from the action start to the completion of the expansion and inflation. Moreover, the airbag also takes a compact shape when housed. In this construction, since the capacity of the airbag can naturally be minimized, it is easily arranged, when expanded and inflated, in the narrow space between the column cover and the knee. At the time of the expansion and inflation, still moreover, the airbag rises along the column cover lower surface so that it goes more smoothly into the clearance between the knee of the driver and the column cover lower surface.

The aforementioned hard area is exemplified by the arranging portion for a key cylinder on or near the column cover.

The third knee protecting airbag device is desirably formed into a generally plate shape, and the thickness size of the airbag is desirably set by connecting the peripheral walls, as opposed in the thickness direction to each other, partially. In this construction, the airbag is formed into a generally plate shape when it completes the inflation. Even if the knee of the driver comes close to the column cover when the driver depresses the brake pedal, therefore, the airbag being expanded and inflated is smoothly arranged in the narrow space between the knee of the driver and the column cover lower surface. Moreover, the plate shape of the airbag is also easily formed by connecting the peripheral walls partially to each other. By these partial connections of the peripheral walls, moreover, the portions of different thickness sizes can be easily formed in the airbag, and it is easy to position the thickened portions of the airbag.

In case the peripheral walls are connected to each other, the airbag to be expanded and inflated is formed more easily in its entirety into the plate shape if a plurality of connection portions are arranged in the airbag.

Moreover, the following construction is desired when the peripheral walls are formed of the column cover side wall portion and the driver's side wall portion opposed to each other, and these opposed column cover side wall portion and driver side wall portion are connected by means of band-shaped tethers. Specifically, the tether connects the column cover side wall portion and the driver side wall portion by arranging the joint portion to the driver side wall portion, at a position which is more distant from the portion covering the hard area than such a position on the driver's side wall as opposed from the joint portion of the tether to the column cover side wall portion, in the thickness direction of the airbag. In this construction at the inflated portion covering the hard area, the driver side wall portion is more easily inflated than the column cover side wall portion. As a result, even if the tether is arranged in the vicinity of the portion for covering the hard area, this hard-area-covering portion can be easily enlarged in the capacity and be thickened.

Moreover, it is desired that the hard-area-covering portion is arranged closer to the downstream side of the inflating gas than the general portion. With this construction, the flow of the inflating gas to the hard-area-covering portion is low in the course of the expansion and inflation although the hard area covering portion is to become thicker than the general portion at the completion of the inflation. Therefore, the hard-area-covering portion is smoothly arranged before the completion of the expansion and inflation between the knee of the driver and the hard area and is inflated.

In a fourth knee protecting airbag device according to the present invention, an airbag for protecting the knee of a driver is folded and housed on the lower side of a steering column, and expands to spread over at least the lower surface of the column cover covering the steering column, at the expanding and inflating time. The airbag is constructed to include: an upper portion to be expanded upward from the housed portion of the airbag along the lower surface of a column cover; and a lower portion to be expanded downward from the housed portion of the airbag along a panel arranged below the housed portion of the airbag.

In the fourth knee protecting airbag device according to the present invention, the upper portion in the airbag covers the portion from the upper portion of the knee of the driver to the vicinity of the thigh, and the lower portion in the airbag covers the portion from the lower portion of the knee of the driver to the vicinity of the leg. Therefore, the airbag expanded and inflated protects the knee of the driver properly over a wide range. While the airbag is being expanded and inflated, on the other hand, the upper portion completes the expansion and inflation while ascending along the column cover lower surface, and the lower portion completes the expansion and inflation while descending along the panel. As a result, the airbag suppresses the protrusion to the knee and the pressure on the knee of the driver.

DESCRIPTION OF THE PREFERRED EMBODIMENTS

The embodiments of the present invention will be described with reference to the accompanying drawings. Here, the present invention should not be limited to the embodiments disclosed herewith. All the modifications within the requirements of the claims and the equivalents with respect to the requirements of the claims should be included in the scope of the claims.

Figure 1:
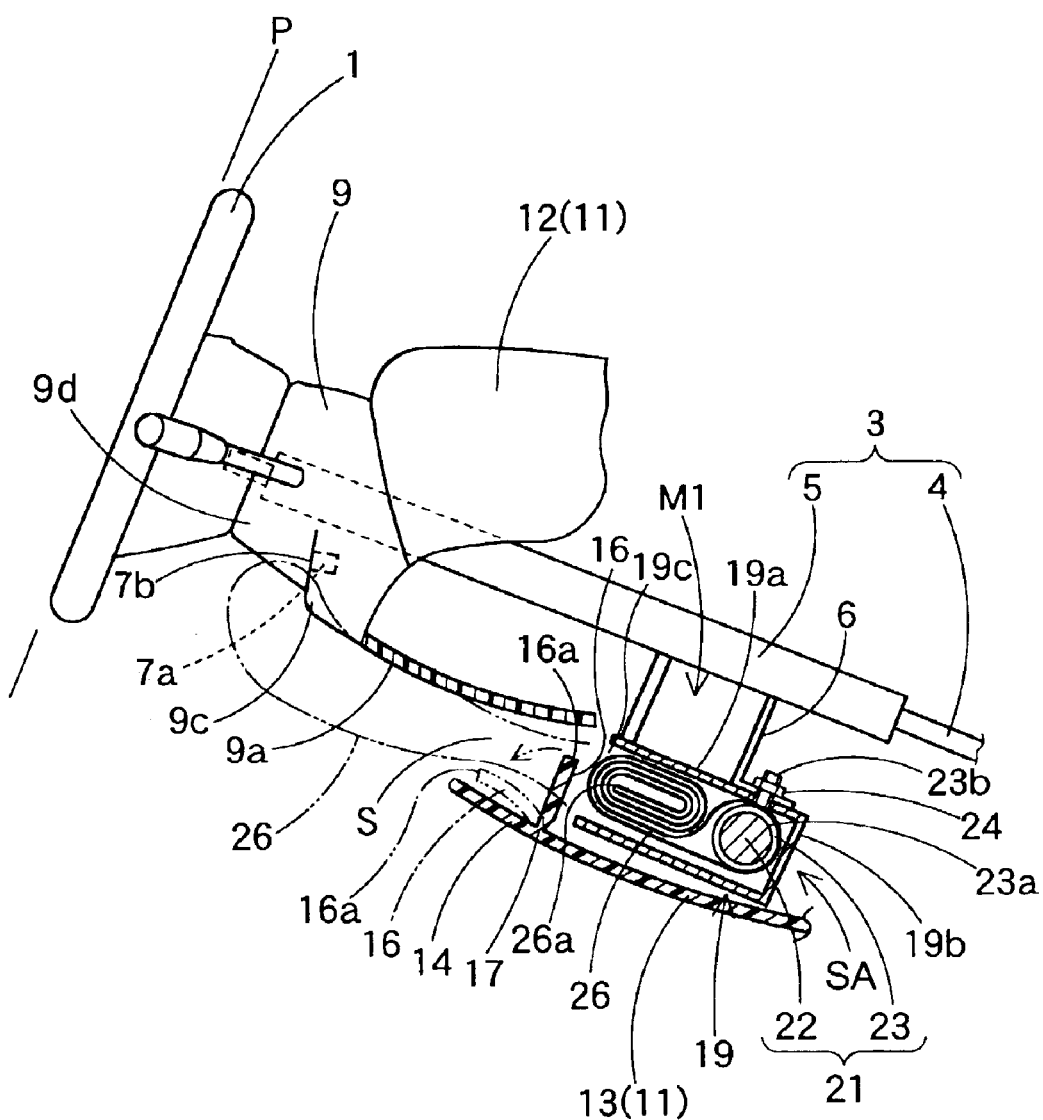
FIG. 1 is a sectional view showing a knee protecting airbag device of a first embodiment of the present invention in use.
Figure 2:
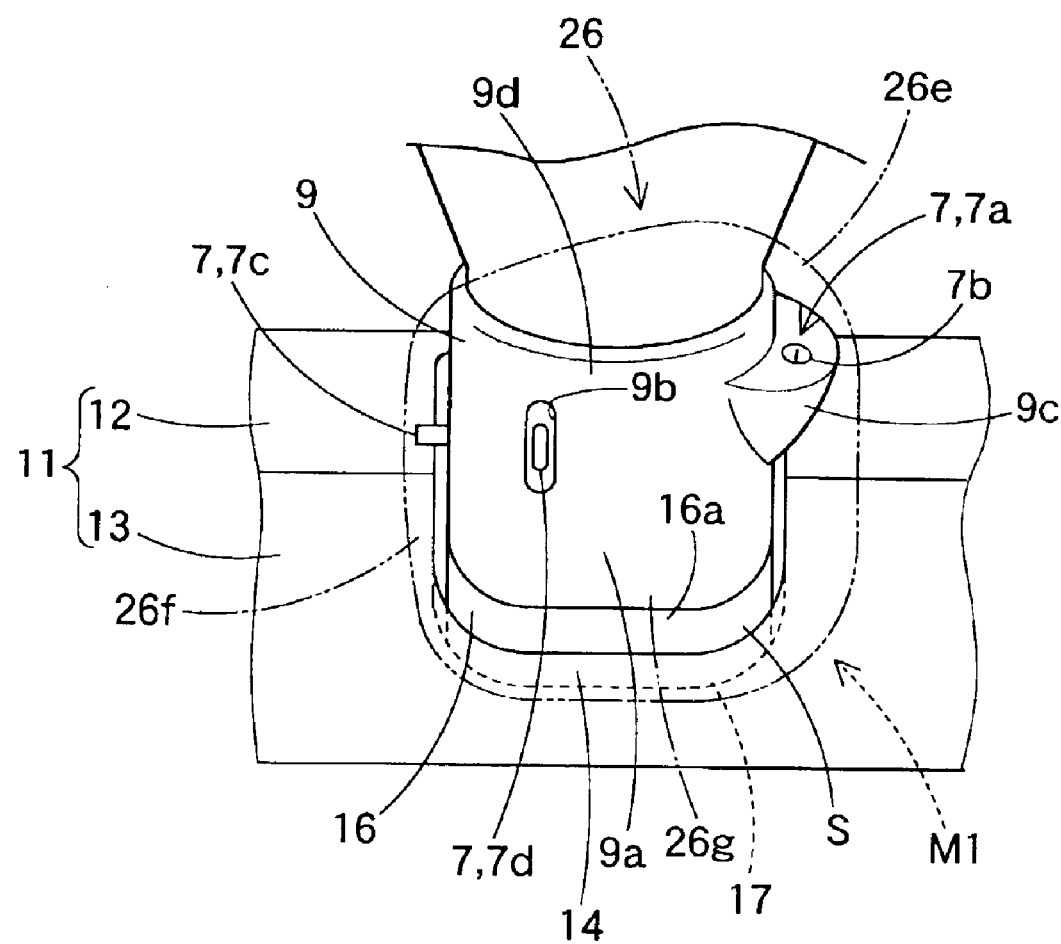
FIG. 2 is a front elevation of the vicinity of a column cover of the first embodiment.

A knee protecting airbag device M1 of a first embodiment is arranged at the lower side of the column cover 9 and on the side of the lower surface 9a of a column cover 9 and is constructed, as shown in FIGS. 1 and 2, to include an airbag 26, an inflator 21 and a case 19. The airbag 26 is folded up and housed below a steering column 3. The inflator 21 feeds an inflating gas to the airbag 26. The case 19 houses the airbag 26 and the inflator 21.

The column cover 9 is made of a synthetic resin into a shape of a generally square cylinder, and covers the steering column 3 below a steering wheel 1. The column cover 9 is arranged along the axial direction of the steering column 3. Specifically, the column cover 9 is arranged at such a backward rising inclination as to have the vehicle's front side at a lower position and the vehicle's rear side at a higher position. Moreover, the lower surface 9a of the column cover 9 is formed generally in a rectangular shape and is curved to rise backward in the longitudinal direction of the vehicle.

The steering column 3 is provided as its accessories with: a key cylinder 7a for locking the steering of the steering wheel 1; a tilt mechanism control unit (or a control lever) 7c; and a telescopic mechanism control unit (or a control lever) 7d. These parts 7a, 7c and 7d are exposed on or protruded from the column cover 9 to form a hard unit 7 in the column cover 9. The key cylinder 7a is especially hard because it is formed of a metal block. Moreover, the key cylinder 7a is arranged on the righthand side face of the column cover 9, and a cover portion 9c is protruded in a generally halved frusto-conical shape from the column cover 9 to cover the key cylinder 7a. The tilt mechanism control lever 7c is arranged on the lefthand side face of the column cover 9, and the telescopic mechanism control lever 7d is so arranged as is protruded from a through hole 9b on the left edge side of the column cover lower surface 9a.

The steering column 3 is constructed to include: a main shaft 4 connected to the steering wheel 1; and a column tube 5 covering the main shaft 4. Between the main shaft 4 and the column tube 5, there are arranged the tilt mechanism, the telescopic mechanism and so on, although not shown. The tilt mechanism adjusts the angle of a ring plane P of the steering wheel 1. The telescopic mechanism moves and fixes the steering wheel 1 in the axial direction of the shaft 4.

The case 19 is made of a sheet metal and is constructed to include a peripheral wall portion 19a of a generally rectangular cylinder shape, and a bottom wall portion 19b having a generally rectangular shape and closing the bottom of the peripheral wall portion 19a. The case 19 is connected and fixed to an immovable portion of the column tube 5 of the steering column 3 by means of a bracket 6. In the case 19 on the vehicular rear side, there is arranged an opening 19c which is defined by the peripheral wall portion 19a. Moreover, the case 19 is arranged with its peripheral wall portion 19a being axially directed along the column cover lower surface 9a (or along the axial direction of the steering column 3). This arrangement is made so that the airbag 26 housed in the case 19 may be easily protruded along the lower surface 9a of the column cover 9.

Figure 6:
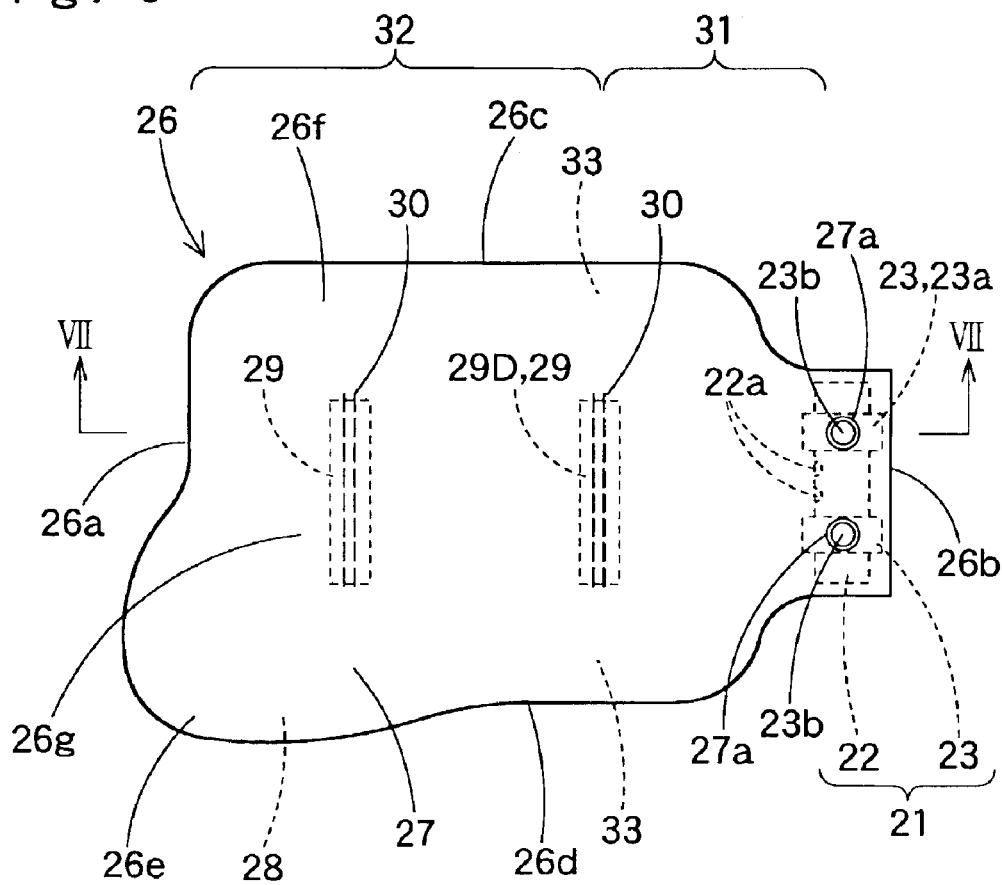
FIG. 6 is a top plan view of the airbag used in the first embodiment.

The inflator 21 is constructed, as shown in FIGS. 1 and 6, to include a body 22 and two bracket portions 23. The body 22 is of a cylinder type, constructed to discharge the inflating gas in response to an electric signal. The body 22 is provided with gas discharge ports 22a (as referred to FIG. 6) for discharging the inflating gas therefrom. In the case of the embodiment, the inflator 21 is activated in response to an electric signal coming from a predetermined control unit. When this inflator 21 acts, a not-shown airbag device mounted on the steering wheel 1 also acts simultaneously with the inflator 21 in response to an electric signal coming from a predetermined control unit. The bracket portions 23 are provided with retaining rings 23a and bolts 23b. The retaining rings 23a are made of a sheet metal and plastically deformable to shrink radially thereby to clamp the body 22. The bolts 23b are protruded from the retaining rings 23a. The inflator 21 is enveloped in the airbag 26 by assembling the bracket portions 23 with the body 22. Moreover, the inflator 21 is fastened to the bracket 6 by inserting the bolts 23b protruded from the airbag 26 into the case 19 and by using nuts 24. As a result, the inflator 21 is mounted and fixed together with the airbag 26 and the case 19 on the bracket 6.

Moreover, the airbag 26 thus folded and housed in the case 19 is housed within a lower panel 13 on the lower side of an instrument panel (or dashboard) 11. This dashboard 11 covers the column cover 9. On the lower panel 13 on the side of the column cover lower surface 9a, there is arranged a peripheral edge portion 14 having a generally halved square cylinder shape. The peripheral edge portion 14 is spaced at a clearance S from the peripheral edge of the column cover lower surface 9a. In the peripheral edge portion 14 on the vehicular front side, there is arranged a door portion 16 of a planar shape. The door portion 16 covers the rear side of the airbag 26 folded and housed, i.e., the opening 19c in the case peripheral wall portion 19a on the vehicular rear side. In the boundary portion between the lower edge side of the door portion 16 and the lower panel 13, there is arranged a hinge portion 17 which is made of an integral hinge.

This door portion 16 is so opened when the airbag 26 is expanded and inflated that its upper edge 16a is turned on the hinge portion 17 toward the vehicular rear side by the push of the airbag 26. In short, the door portion 16 is opened downward. Moreover, this door portion 16 is formed such that the hinge portion 17 is curved along the peripheral edge portion 14. Therefore, the door portion 16 is opened not fully to the vehicular rear side but at a small angle. Thus, the door portion 16 plays a role of a guide plate for guiding the airbag 26 to inflate and expand easily along the column cover lower surface 9a. Here, the column cover 9 is covered on its upper face side with an upper panel 12 of the dashboard 11.

Figure 7:
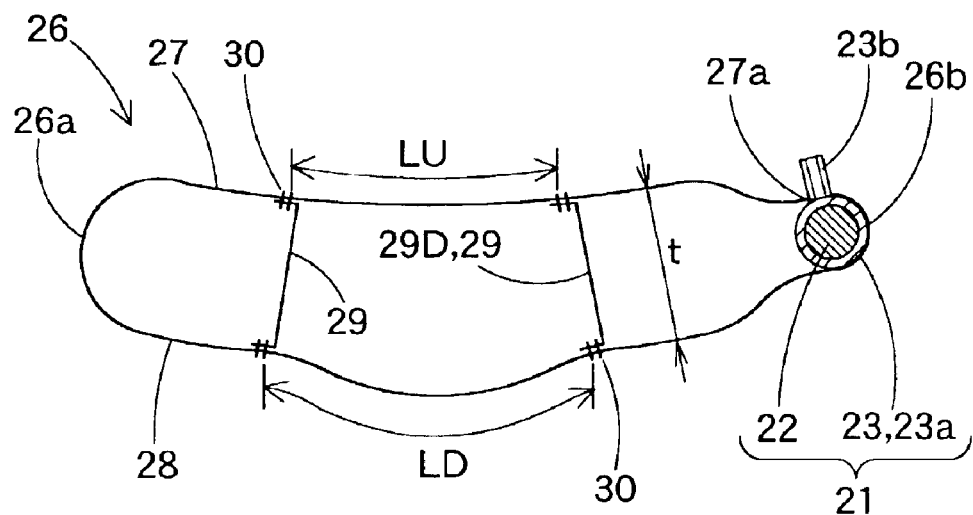
FIG. 7 is a sectional view of a portion VII—VII of FIG. 6.

The airbag 26 is formed of a flexible woven fabric of polyester, polyamide or the like. The airbag 26 takes such a generally rectangular plate shape when it completes the expansion and inflation as to cover only the side of the substantial lower surface 9a of the column cover 9. In the case of the embodiment, the airbag 26 has a peripheral wall constructed, as shown in FIGS. 6 and 7, to include an upper side cloth 27 on the upper face side and a lower side cloth 28 on the lower face side, and these cloths 27 and 28 are opposed in the thickness direction to each other. Here, the upper side cloth 27 forms the wall portion 27 on the side of the column cover 9, and the lower side cloth 28 forms the wall portion 28 on the side of the driver.

Figure 4:
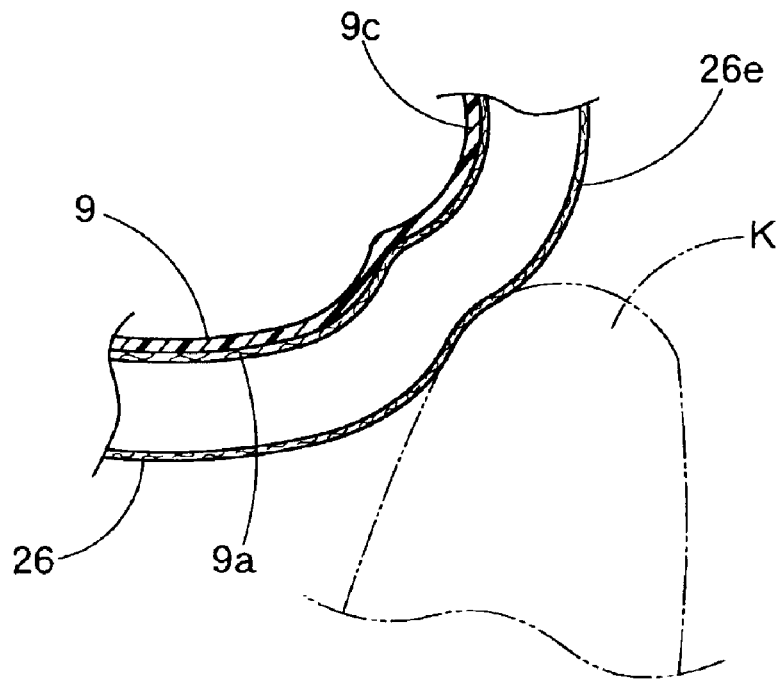
FIG. 4 is a sectional view of a portion IV—IV of FIG. 3.
Figure 5:
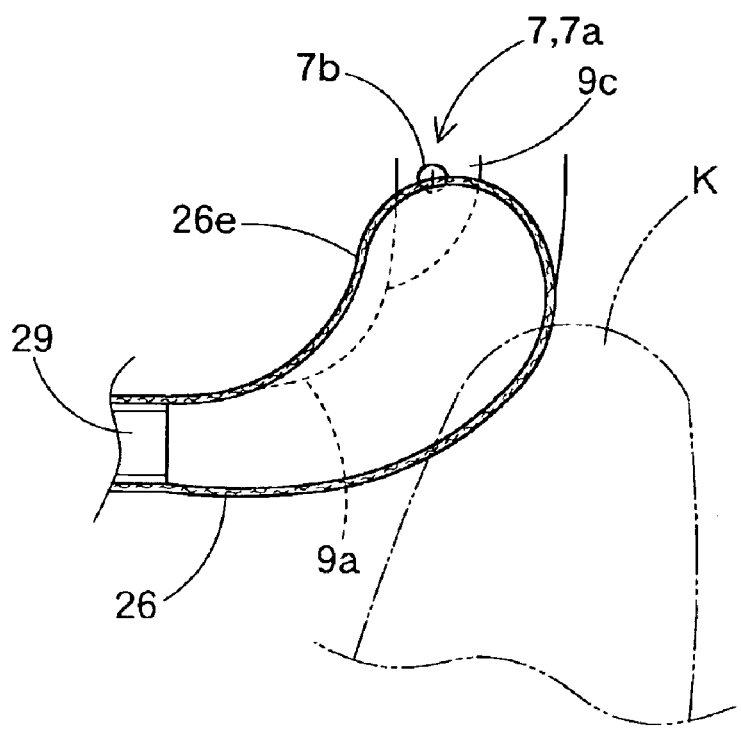
FIG. 5 is a sectional view of a portion V—V of FIG. 3.

At the rear end portion of a right edge 26d of the airbag 26 having completed the inflation, there is arranged a cover portion 26e. This cover portion 26e covers the portion 9b of the key cylinder 7a as the hard portion 7 on the side of the column cover lower surface 9a. The cover portion 26e of the embodiment is constructed, as shown in FIGS. 4 and 5, to cover, when expanded and inflated, not only the lower surface 9a and the right side face of the cover portion 9c of the column cover 9 but also the side of a rear face 7b of the key cylinder 7a (as referred to FIG. 2). The airbag 26 is further provided with a body portion 26g for covering the vicinity of the center of the column cover lower surface 9a including the lower portion of the telescopic control lever 7d when the airbag 26 is expanded and inflated. The airbag 26 is further provided on the left edge side with a cover portion 26f which is not so large as the cover portion 26e. The cover portion 26f covers the lower portion of the side of the tilt mechanism control lever 7c. This tilt mechanism control lever 7c is arranged at such a position as is symmetric to the key cylinder portion 9c with respect to the steering column 3.

In the airbag 26, as shown in FIGS. 6 and 7, there are arranged a plurality of (or two in the embodiment) tethers 29 which act as connection means for connecting the column cover side wall portion 27 and the driver side wall portion 28 to each other. The tethers 29 help keep the generally plate shape of the airbag 26 making the thickness t of the airbag 26 substantially constant. In short, the tethers 29 have a function as thickness regulating means for the airbag 26. Moreover, the longitudinal length LU between the tethers 29 in the vicinity of the longitudinal center of the column cover side wall portion 27 is set shorter than the corresponding longitudinal length LD of the lower side cloth 28. With this construction, the column cover sidewall portion 27 of the airbag 26 expanded and inflated easily extends closely along the backward rising curved face of the column cover lower surface 9a. In the column cover side wall portion 27 on the side of the front end (or lower end) 26b of the airbag 26, there are formed through holes 27a. Into these through holes 27a, there are inserted the individual bolts 23b of the inflator 21.

Here will be described how to mount the airbag device M1 on the vehicle. First of all, the airbag 26 is folded up while having the inflator 21 packaged therein. Here, the individual bolts 23b of the inflator 21 are protruded from the through holes 27a. Not-shown action signal inputting lead wires extending from the inflator body 22 are led out from predetermined not-shown through holes of the airbag 26.

Moreover, the airbag 26 is wrapped, after folded up, with not-shown breakable wrapping film, and the individual bolts 23b are protruded out from the case 19 through the wrapping film. Then, the individual bolts 23b thus protruded are assembled with not-shown spring nuts of a thin metal, and the folded airbag 26 and the inflator 21 are housed in the case 19. Thus, there is formed an airbag assembly SA.

Here, the folding of the airbag 26 is started from the state in which the column cover side wall portion 27 and the driver side wall portion 28 are overlapped and expanded flat. Both left and right edges 26c and 26d are folded back to the center on the side of the column cover side wall portion 27. Then, the airbag 26 is folded, as shown in FIG. 1, to roll up the side of its rear end (or upper end) 26a to the upper face side or the column cover side wall portion 27. With this folding, even if the airbag 26 comes into contact with the upper face side of the knee of the driver when expanded and inflated, it is easily unrolled to expand and inflate the side of its rear end 26a along the column cover lower surface 9a. Moreover, when the folded portion in the rolled state is unfolded by introducing the inflating gas, the folded portion is not only unfolded but also unrolled. Specifically, the unfolded portion is pulled to the rolled side of the column cover side wall portion 27, not to the side of the driver side wall portion 28 by the inertial force of the turning unfolded portion. In this state, the folded portion is unfolded. Therefore, the rolled portion is unfolded in a curving manner, when unfolded, to the side of the column cover side wall portion 27. As a result, the folded portion is expanded and inflated smoothly along the column cover lower surface 9a.

Without considering this point, the airbag 26 can also be so folded up that the side of its rear end 26a is rolled to the lower face side or the side of the driver side wall portion 28. Alternatively, the airbag 26 may also be folded up in such a cactus shape that the side of its rear end 26a is sequentially inserted into the airbag 26 and brought closer to the side of the front end 26b. Moreover, the airbag 26 may further be folded up in such a bellows shape that the side of the rear end 26a comes closer to the side of the front end 26b.

On the other hand, the not-shown lead wires extending from the inflator body 22 are led out from the wrapping film and the not-shown through holes of the case 19.

Then, the airbag assembly SA (or the airbag device M1) having the airbag 26 and the inflator 21 housed in the case 19 is fixed on the bracket 6 by means of the nuts 24. Moreover, the not-shown lead wires are connected with the control circuit, and the dashboard 11 is mounted on the vehicle. Thus, the airbag device M1 can be mounted on the vehicle.

If a predetermined electric signal is inputted to the inflator body 22 after the airbag device M1 was mounted on the vehicle, the inflating gas is discharged from the gas discharge ports 22a. Therefore, the airbag 26 is inflated to break the not-shown wrapping film and to push and open the door portion 16 of the lower panel 13. Then, the airbag 26 is expanded and inflated while rising along the column cover lower surface 9a. The airbag 26 has its rear end 26a arranged near the rear end 9d of the column cover lower surface 9a after completion of the expansion and inflation.

In the knee protecting airbag device M1 of the first embodiment, the airbag 26 is constructed to cover the column cover 9 protruded to the driver side exclusively on the side of substantial lower surface 9a of the column cover 9. Therefore, the airbag 26 can minimize its capacity without deteriorating the protection performance of the knee of the driver. As a result, the airbag 26 is able to shorten the time period required for completing the expansion and inflation.

Moreover, the airbag 26 takes such a generally plate shape when completed the inflation as covers only the lower surface 9a of the column cover 9. Even if the knee of the driver is close to the column cover 9 when the driver depresses a brake pedal, therefore, the expanded and inflated airbag 26 is smoothly arranged in a narrow space between the knee of the driver and the column cover lower surface 9a without interfering with the knee of the driver. Especially at the expanding and inflating time, the airbag 26 rises along the column cover lower surface 9a so that it goes more smoothly into the clearance between the knee of the driver and the column cover lower surface.

Therefore, in the knee protecting airbag device M1 of the first embodiment, the airbag 26 can be rapidly expanded and inflated in the narrow clearance between the column cover 9 and the knee of the driver thereby to protect the knee of the driver properly.

In the airbag device M1 of the first embodiment, moreover, the capacity of the airbag 26 can be minimized so that the airbag device M1 including the inflator 21 for feeding the inflating gas to the airbag 26 can be made compact. As a result, the airbag device M1 is easily mounted on the vehicle without interfering with the surrounding parts even if it is housed within the lower panel 13 of the dashboard 11 below the steering column 3.

Figure 3:
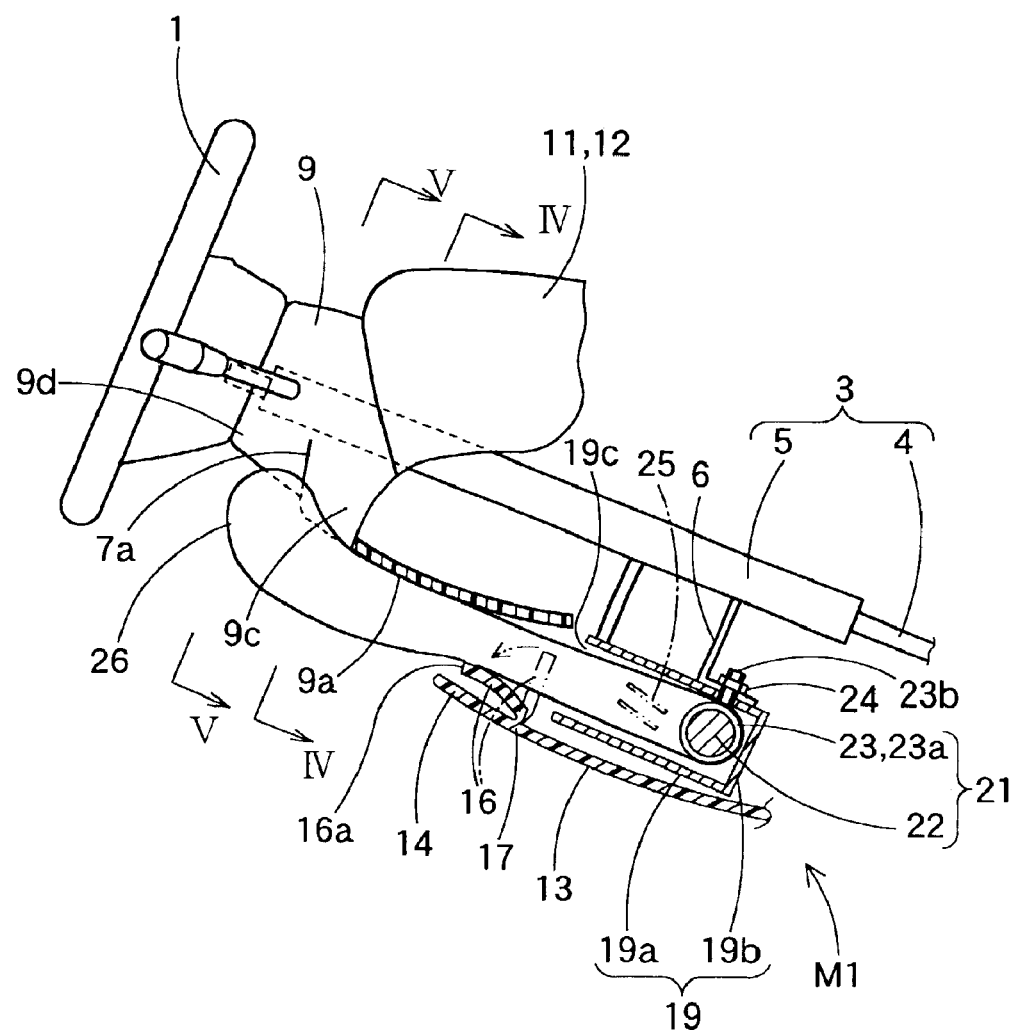
FIG. 3 is a diagram showing the airbag of the first embodiment being expanded and inflated.

In the case of the first embodiment, moreover, the airbag 26 having completed the expansion and inflation is provided with the cover portion 26e to cover the key cylinder 7a in the cover portion 9b on the side of the column cover lower surface 9a. Therefore, as shown in FIG. 4, the airbag cover portion 26e properly protects the knee K of the driver, which would otherwise crash with the key cylinder 7a as the hard portion 7 protruded from the column cover 9 with the cover portion 9c in between. Especially in the case of the embodiment, as shown in FIGS. 3 and 5, the expanded and inflated cover portion 26e covers the side of the rear face 7b of the key cylinder 7a, too. Therefore, the cover portion 26e better prevents the interference between the key cylinder 7a as the hard portion 7 made of a metal block and the knee K.

In the case of the first embodiment, moreover, the airbag 26 having completed the expansion and inflation covers not only the key cylinder 7a, but also covers the lower face side of the hard portion 7 such as the tilt mechanism control lever 7c or the telescopic mechanism control lever 7d arranged at the steering column 3 by the body portion 26g or the cover portion 26f. Therefore, the body portion 26g or the cover portion 26f of the airbag 26 properly protects the knee K of the driver which would otherwise interfere with those control levers 7c and 7d.

Here, the airbag 26 may be constructed to cover not only the hard portions 7a, 7c and 7d exposed on or protruded from the column cover 9, as in the embodiment, but also the portions under which rigid accessories covered completely with the column cover 9 are arranged. Specifically, the airbag 26 may be constructed to cover not only the hard portion 7 seen from the outside but also the hard area having the hard portion arranged in the column cover 9.

In the airbag 26 of the first embodiment, on the other hand, the tether 29 partially connects the peripheral walls of the airbag 26 opposed in the thickness direction, that is, the column cover side wall portion 27 and the driver side wall portion 28 to each other. Therefore, the airbag 26 having completed the inflation can easily keep the generally plate shape. As a result, the airbag 26 is easily arranged in the narrow space between the column cover lower surface 9a and the knee K of the driver.

Moreover, the airbag 26 is provided by a plurality of tethers 29 with a plurality of connection portions for connecting the peripheral walls to each other so that its entirety can be expanded and inflated more easily into the plate shape.

Figure 8:
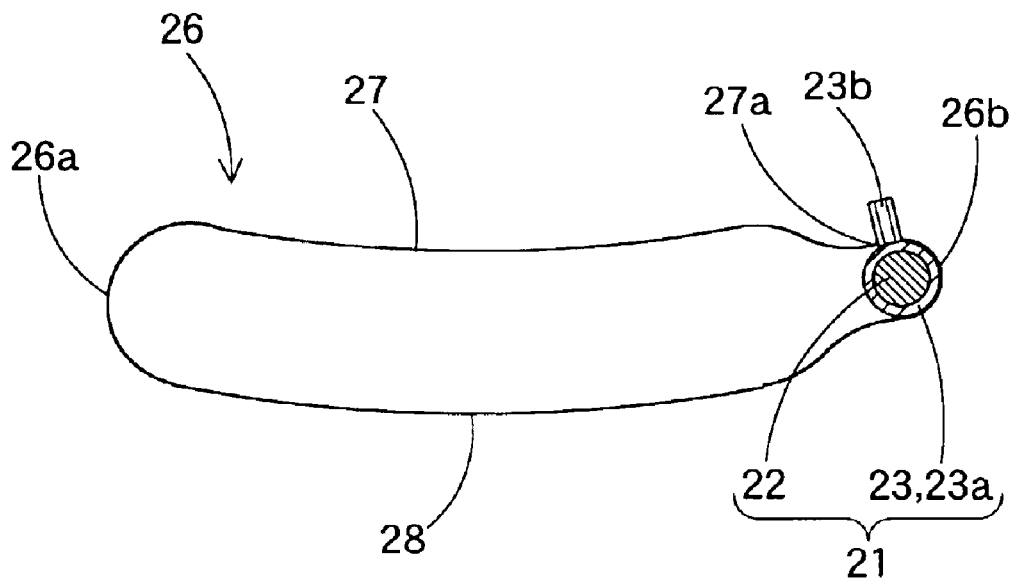
FIG. 8 is a sectional view showing a modification of the airbag.

Without considering this point, the airbag 26 may naturally be constructed not by providing a connection means such as the tether 29 but by connecting the outer peripheral edges of the column cover side wall portion 27 and the driver side wall portion 28, as shown in FIG. 8.

Figure 9:
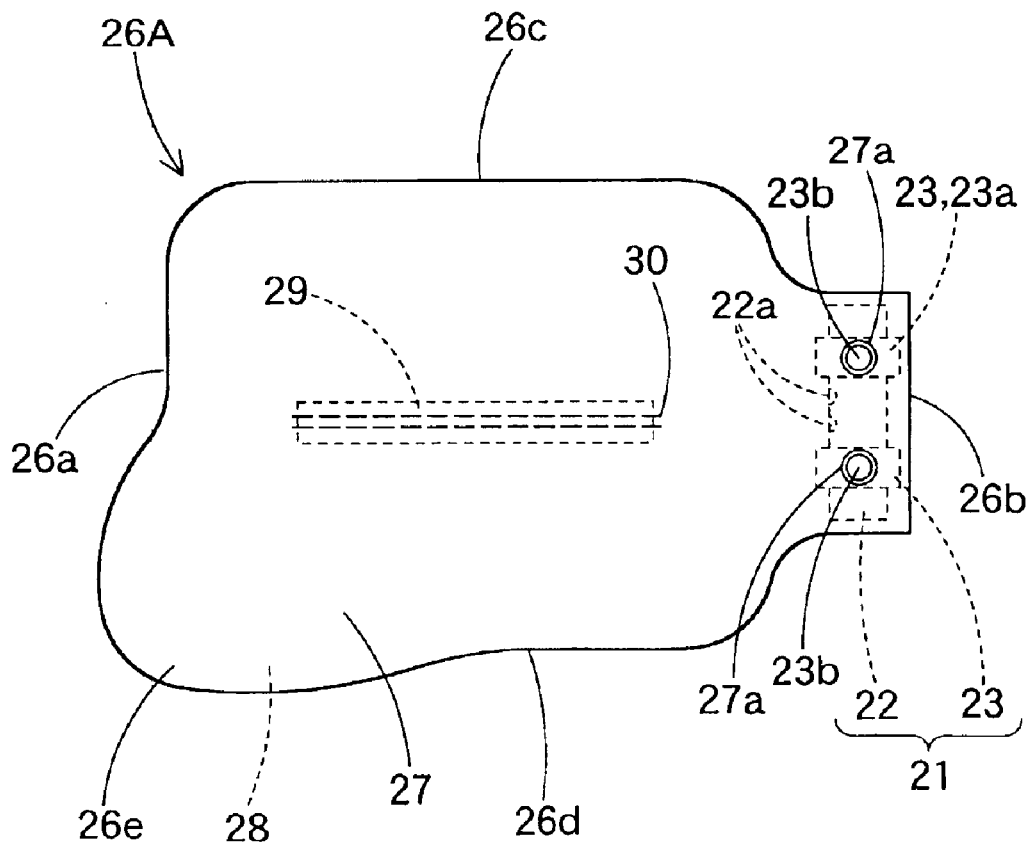
FIG. 9 is a top plan view showing another modification of the airbag.

Here in the first embodiment, the tether 29 is arranged to extend in a band shape transversely of the vehicle. In an airbag 26A of FIG. 9, however, the tether 29 may be so arranged as to extend in a band shape longitudinally of the vehicle. Moreover, the number of tethers 29 to be arranged may be adequately set to one or more.

However, the following working-effects are obtained when a tether 29D (as referred to FIG. 6) is arranged transversely to the vehicle in the vicinity of the inflator 21 as in the airbag 26 of the first embodiment. Specifically, the tether 29D plays a role of the gas flow regulating member. Moreover, the tether 29D partitions the inner space of the airbag 26 into the portion (or the lower portion) closer to the inflator 21 from the tether 29D as an upstream side portion 31 of the inflating gas, and the portion (or the upper portion) closer to the rear end (or the upper end) 26a from the tether 29D in the airbag 26 as a downstream side portion 32 of the inflating gas. Then, the inflating gas flows transversely in the upstream side portion 31 and flows through gas communication holes 33 and 33 to the downstream side portion 32. Therefore, the tether 29D causes the airbag 26 being expanded and inflated to rise, while being transversely extended, along the column cover lower surface 9a. Here, the gas communication holes 33 are the clearances which are arranged between the left and right ends of the tether 29D and the left and right edges 26c and 26d of the airbag 26.

Figure 10:
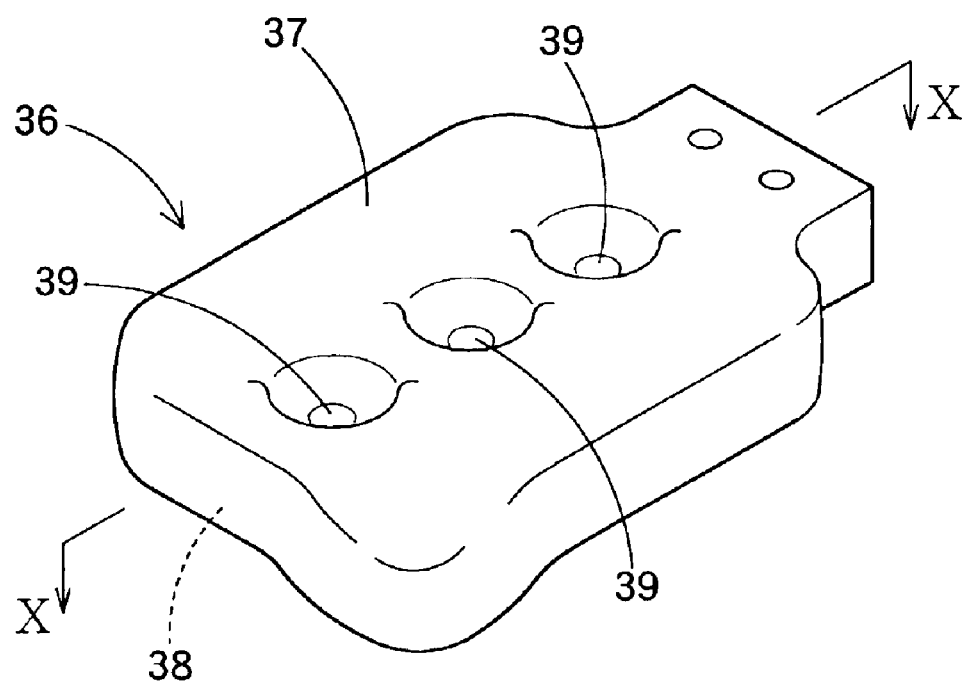
FIG. 10 is a perspective view showing still another modification of the airbag.
Figure 10:
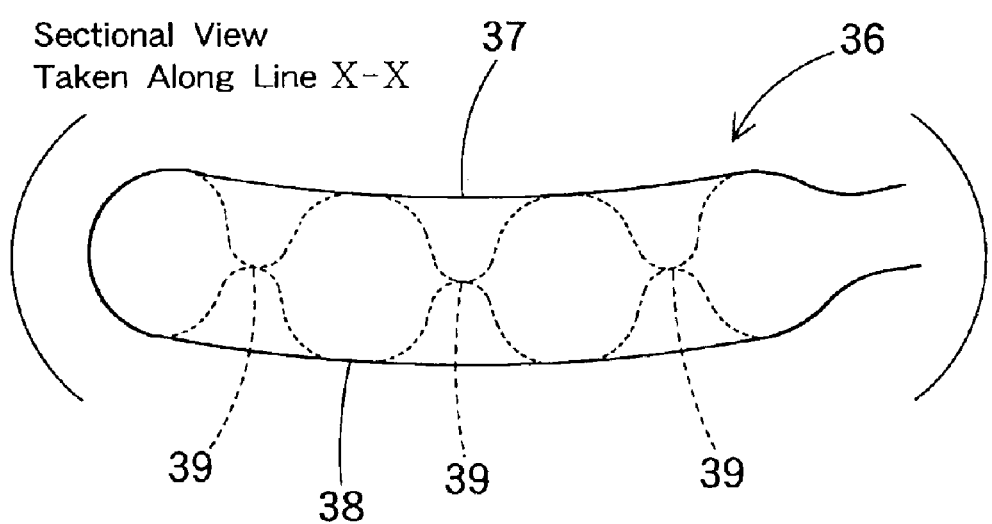

In order to retain the generally plate shape of the airbag, tethers for partially connecting the peripheral walls opposed to each other in the thickness direction of the airbag may be formed by sewing or adhering. As in an airbag 36 shown in FIG. 10, joint portions 39 may be formed as the connection means by adhering a column cover side wall portion 37 and a driver side wall portion 38 partially to each other. Moreover, the connection means may also be constructed by hollow-weaving the airbag and by jointing the peripheral walls opposed in the thickness direction to each other.

In the airbag 26 of the embodiment, moreover, the longitudinal length LU of the upper side cloth 27 of the airbag 26 is set shorter than the longitudinal length LD of the lower side cloth 28 opposed in the thickness direction to the upper side cloth 27. Therefore, the airbag 26 being expanded and inflated is curved upward at its upper end (or rear end) 26a, so that it easily extends close to the side of the column cover lower surface 9a. As a result, the airbag 26 goes more smoothly into the narrow clearance between the column cover lower surface 9a and the knee of the driver.

Figure 11:
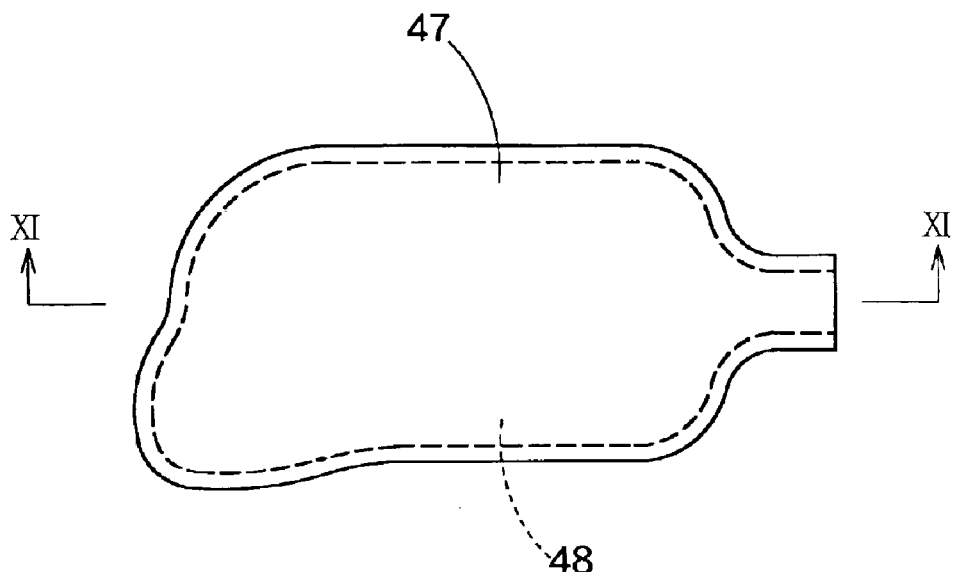
FIG. 11 presents diagrams showing manufacturing steps of still another modification of the airbag.
Figure 11:
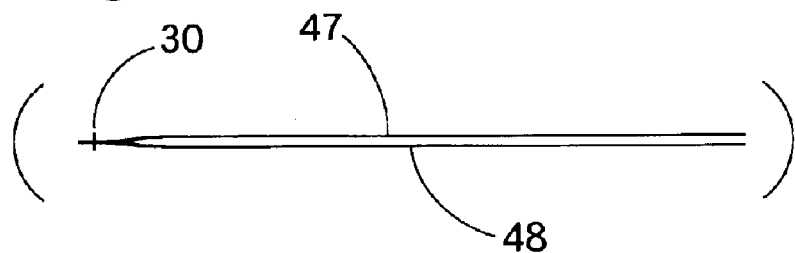
Figure 11:
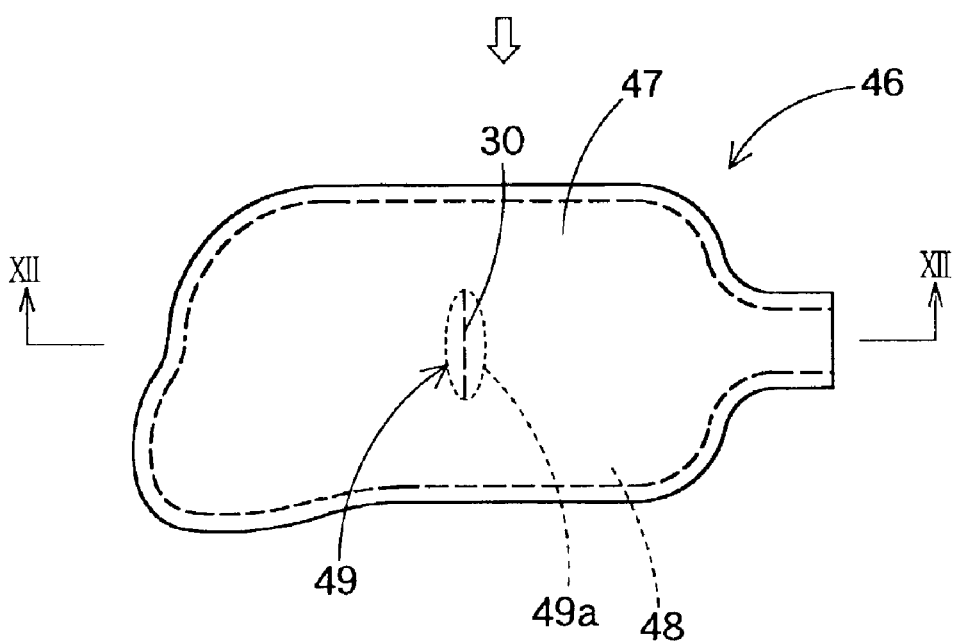
Figure 12:
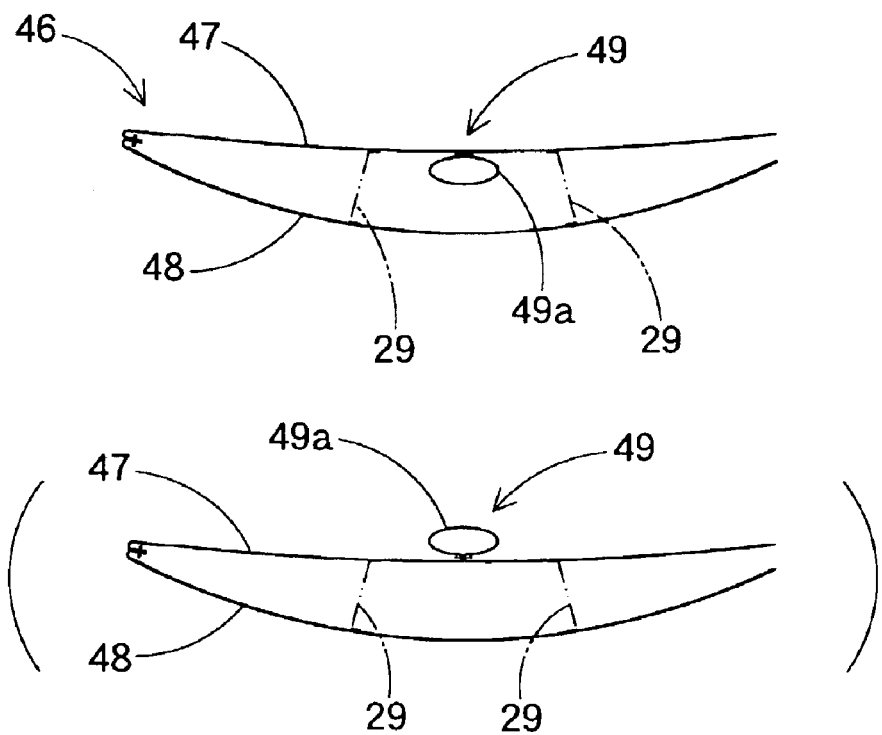
FIG. 12 is a sectional view of a portion XII—XII of FIG. 11.
Figure 13:
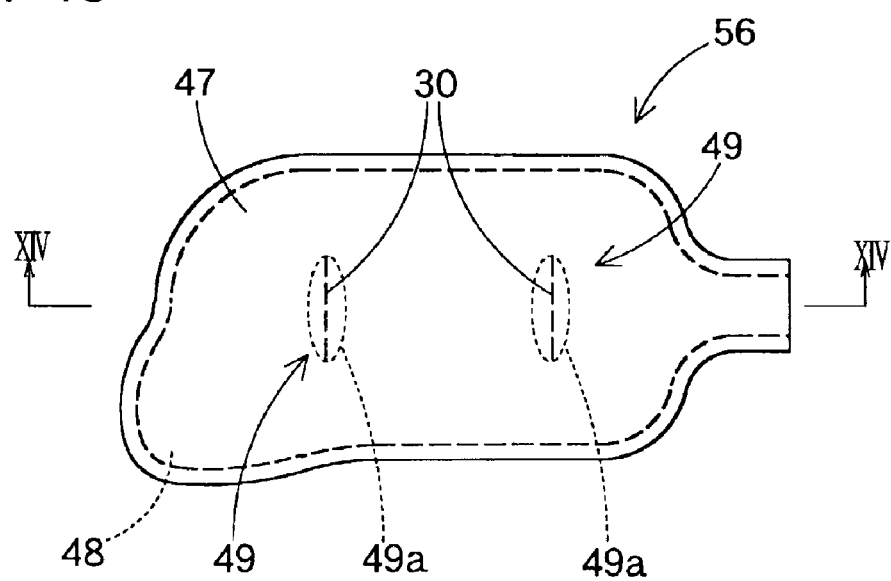
FIG. 13 is a top plan view showing still another modification of the airbag.
Figure 14:
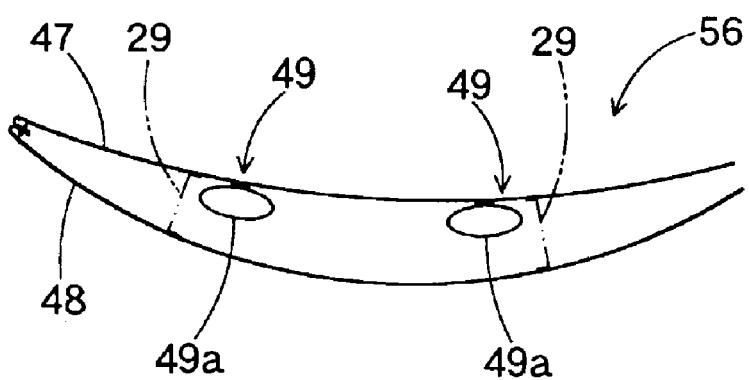
FIG. 14 is a sectional view of a portion XIV—XIV of FIG. 13.

Here, the construction may be modified as an airbag 46 shown in FIGS. 11 and 12, in case the longitudinal length of the upper side peripheral wall is set shorter than the longitudinal length of the lower side counterpart opposed to the former in the thickness direction in order for the airbag to expand and inflate closely along the column cover lower surface 9a. In this airbag 46, a column cover side wall portion 47 and a driver side wall portion 48 of an identical shape are sewn at their peripheral edges by using a sewing thread 30, and a tuck 49 is then formed at a part of the column cover side wall portion 47 by using the sewing thread 30. The tucked portion 49a of the tuck 49 may be formed either on the inner peripheral side of the airbag 46 or on the outer peripheral side of the airbag 46, as parenthesized. Here, the number of tucks 49 to be arranged should not be limited to one, but two tucks may be arranged in the longitudinal direction, as in an airbag 56 shown in FIGS. 13 and 14. Moreover, three or more tucks 49 may be arranged. If the number of tucks 49 to be arranged is thus increased, the longitudinal length of the peripheral wall (or the upper side cloth/column cover side wall portion) 47 on the upper side after completion of the inflation can be easily made shorter than that of the peripheral wall (or the lower side cloth/driver side wall portion) 48 on the lower side. If a plurality of tucks 49 are arranged in the longitudinal direction, moreover, the length of the peripheral wall 47 on the upper side can be shortened evenly.

Figure 15:
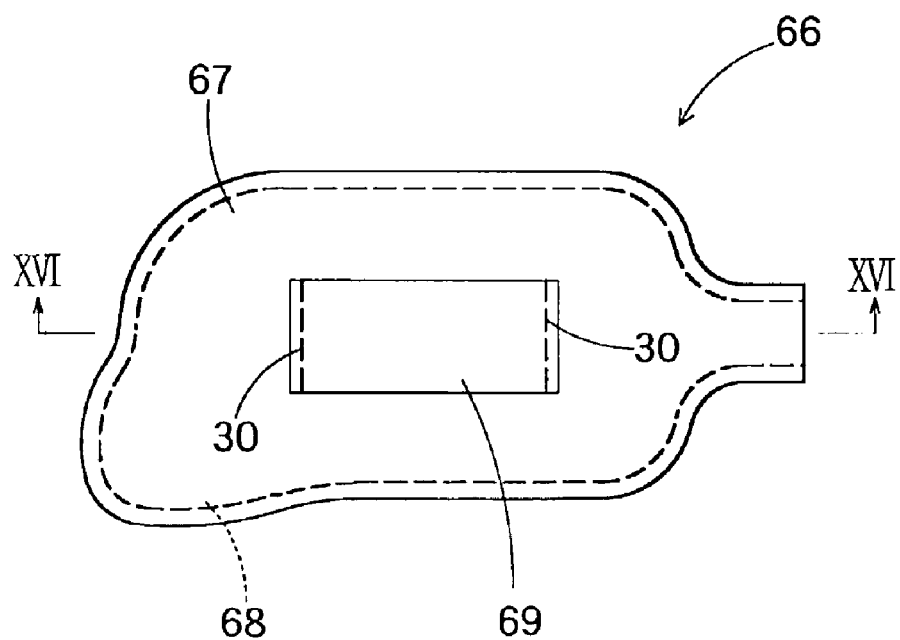
FIG. 15 is a top plan view showing still another modification of the airbag.
Figure 16:
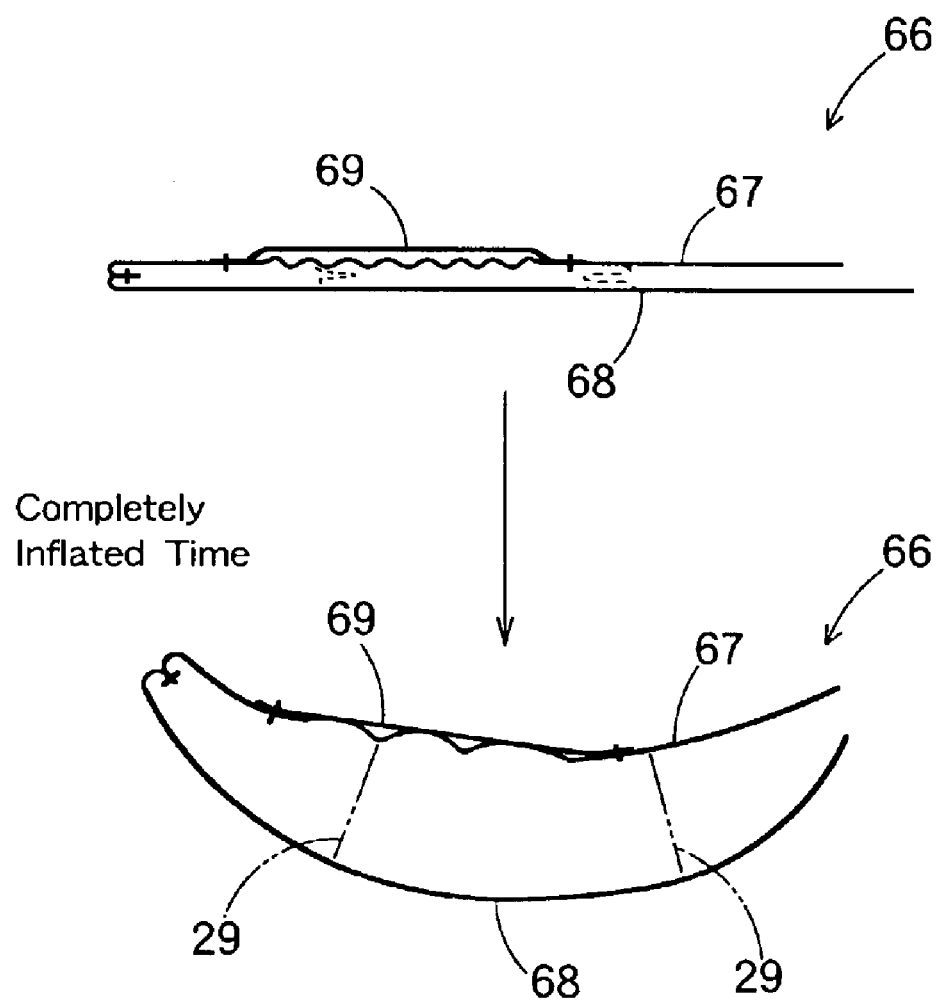
FIG. 16 presents sectional views of a portion XVI—XVI of FIG. 15.

The construction may also be modified into an airbag 66, as shown in FIGS. 15 and 16. In this airbag 66, a length adjusting cloth 69 is so jointed at the front and rear end portions to the outer peripheral side of the column cover side wall portion 67 by using the sewing thread 30 or the like as to shorten the longitudinal length of the wall portion 67. In the airbag 66, therefore, the wall portion 67 is pulled when completing the inflation by the adjusting cloth 69 so that the longitudinal length of the wall portion 67 is made shorter than a driver side wall portion 68. In this airbag 66, the longitudinal length of the column cover side wall portion 67 can be easily made shorter as compared with the aforementioned airbag 56 having a plurality of tucks 49.

Figure 17:
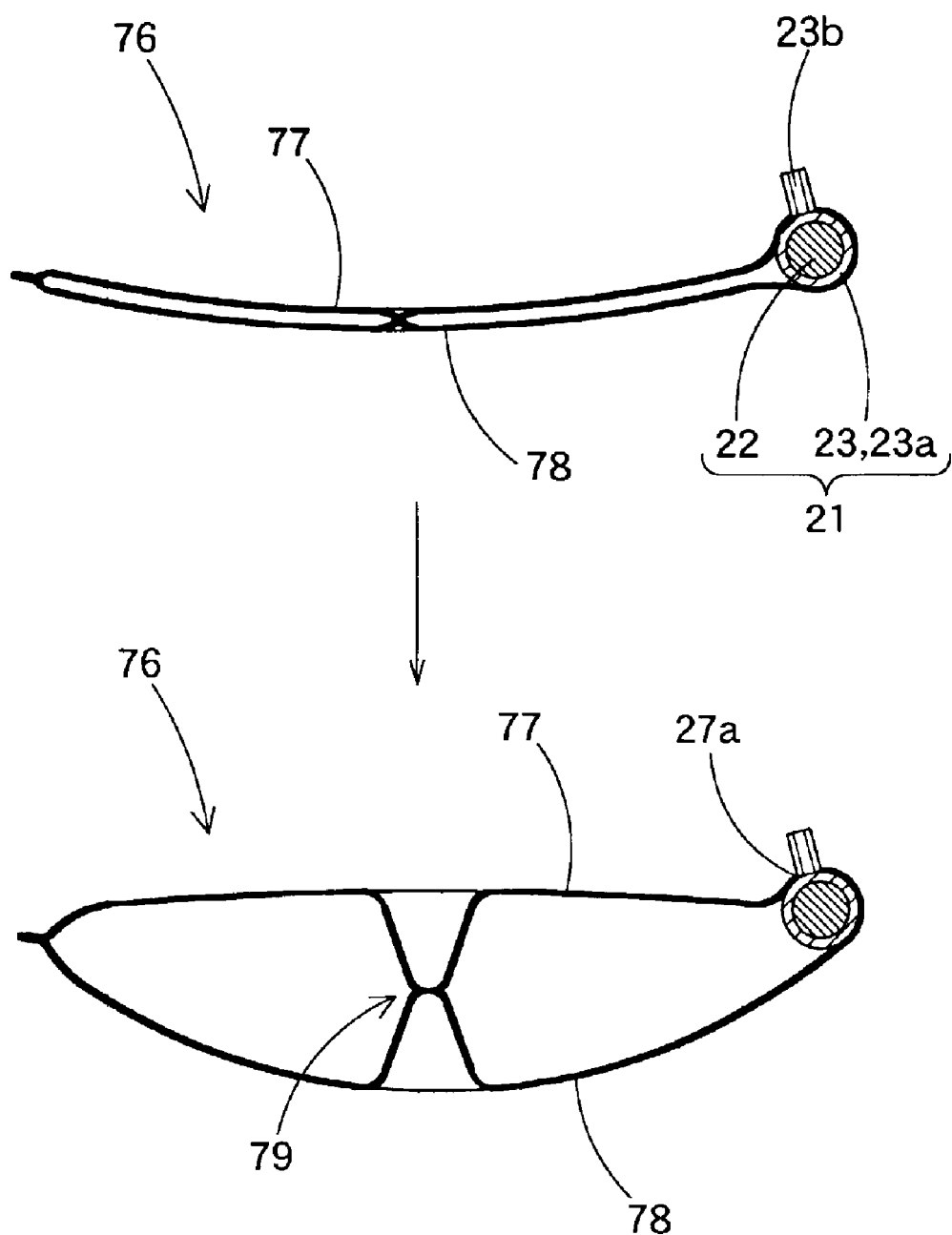
FIG. 17 presents sectional views showing still another modification of the airbag.

Alternatively, the construction may also be modified into an airbag 76, as shown in FIG. 17. This airbag 76 is hollow-woven so that the number of weaving yarns (warps and wefts) may be larger in a column cover side wall portion 77 than in a driver side wall portion 78. In this airbag 76 being expanded and inflated, the column cover side wall portion 77 is harder to extend. After completion of the inflation, therefore, the longitudinal length of the wall portion 77 is shorter than the driver side wall portion 78. Here in this airbag 76, there is arranged a joint portion 79 for jointing the peripheral walls to each other. This joint portion 79 is formed integrally with the airbag 76 when this airbag 76 is woven.

Figure 18:
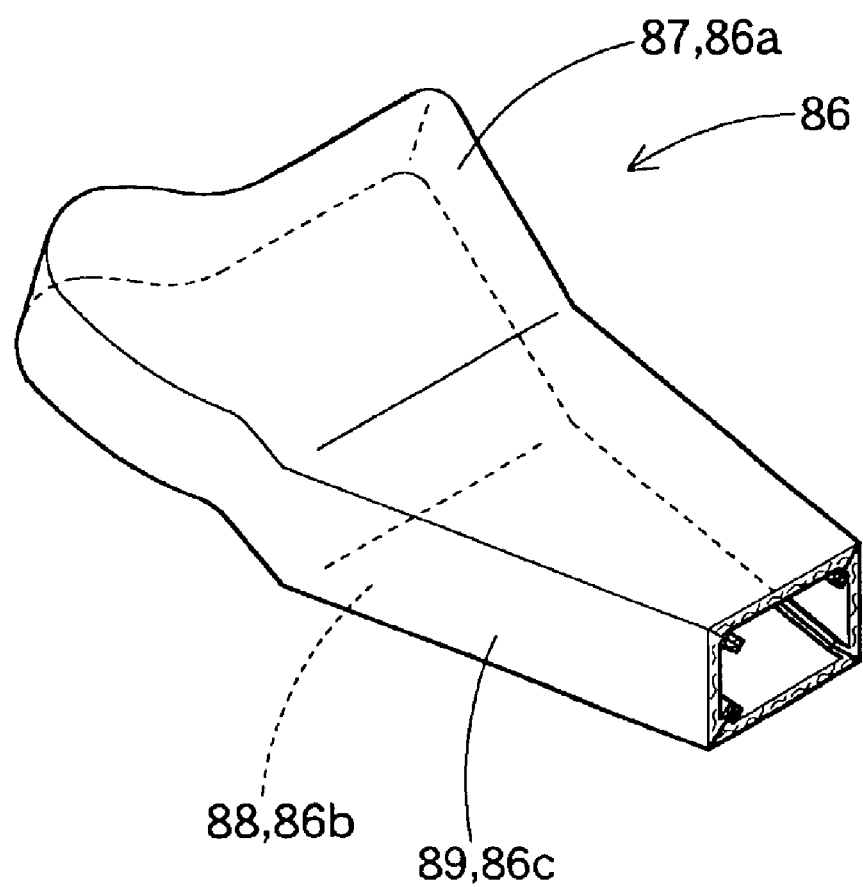
FIG. 18 is a perspective view showing still another modification of the airbag.

In the first embodiment, still moreover, there has been disclosed the airbag 26 which has a flat plane shape formed by sewing the column cover side wall portion 27 and the driver side wall portion 28 in the flatly expanded state. As shown in FIG. 18, however, an airbag 86 may be formed solid by jointing a predetermined number of such airbag elements as have been cut solid to match the inflation completed shape. In the shown example, the airbag 86 is formed of three airbag elements 86a, 86b and 86c: an airbag element 86a to form a column cover side wall portion 87; an airbag element 86b to form a driver side wall portion 88; and a band-shaped airbag element 86c to form a connection wall portion 89 connecting the peripheral edges of the wall portions 87 and 88 to each other. The airbag 86 is manufactured by jointing those airbag elements 86a, 86b and 86c adequately by sewing, adhering or welding. In this airbag 86, the inflation completed shape can be formed solid along the column cover lower surface 9a. Therefore, the airbag 86 having completed the expansion and inflation comes properly close to the side of the lower surface 9a of the column cover 9. It is naturally desired that this airbag 86 is also provided with a tether or the like as the connection means for connecting the column cover side wall portion 87 and the driver side wall portion 88.

Figure 19:
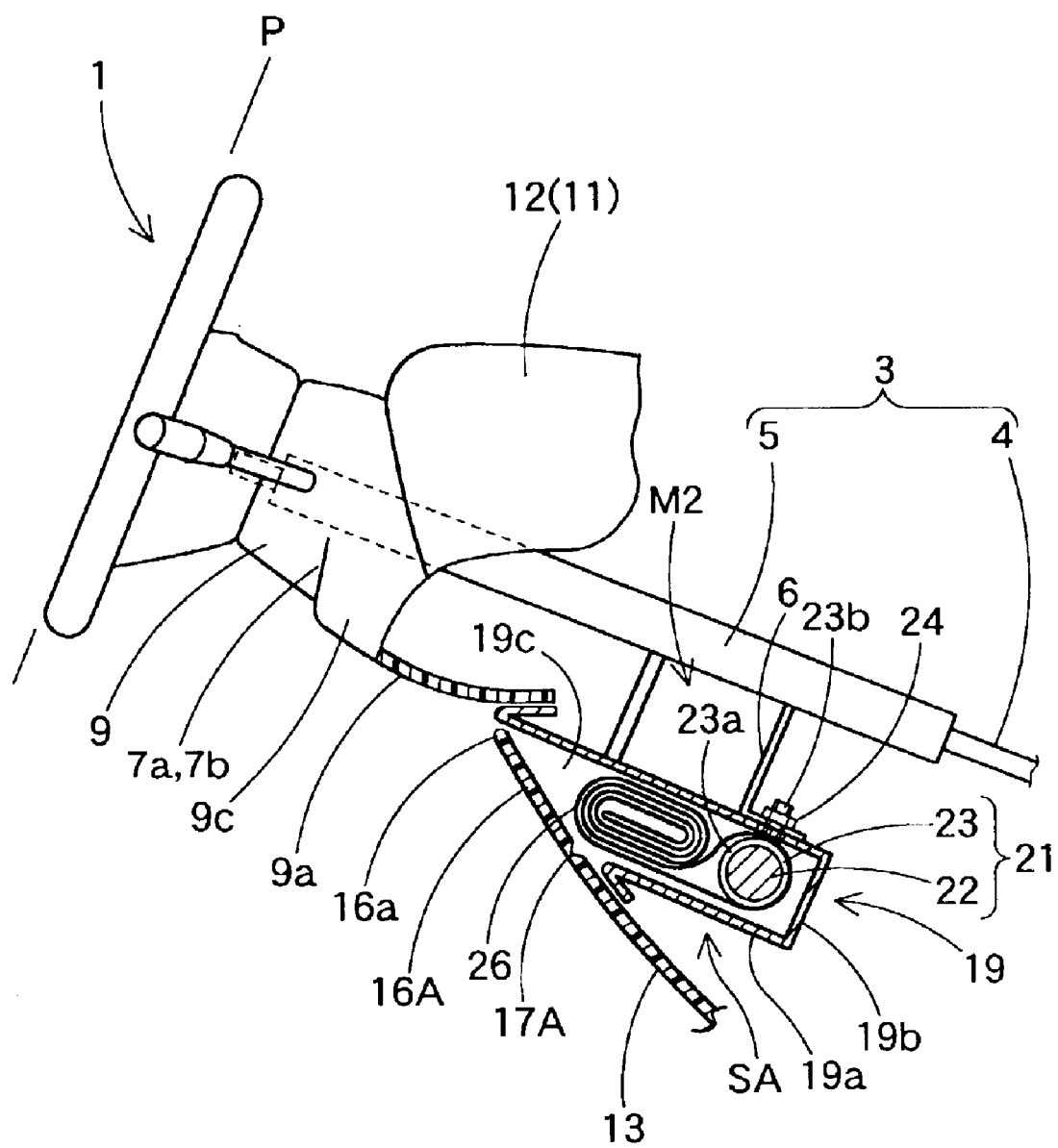
FIG. 19 is a sectional view showing an airbag device of a second embodiment in use.
Figure 20:
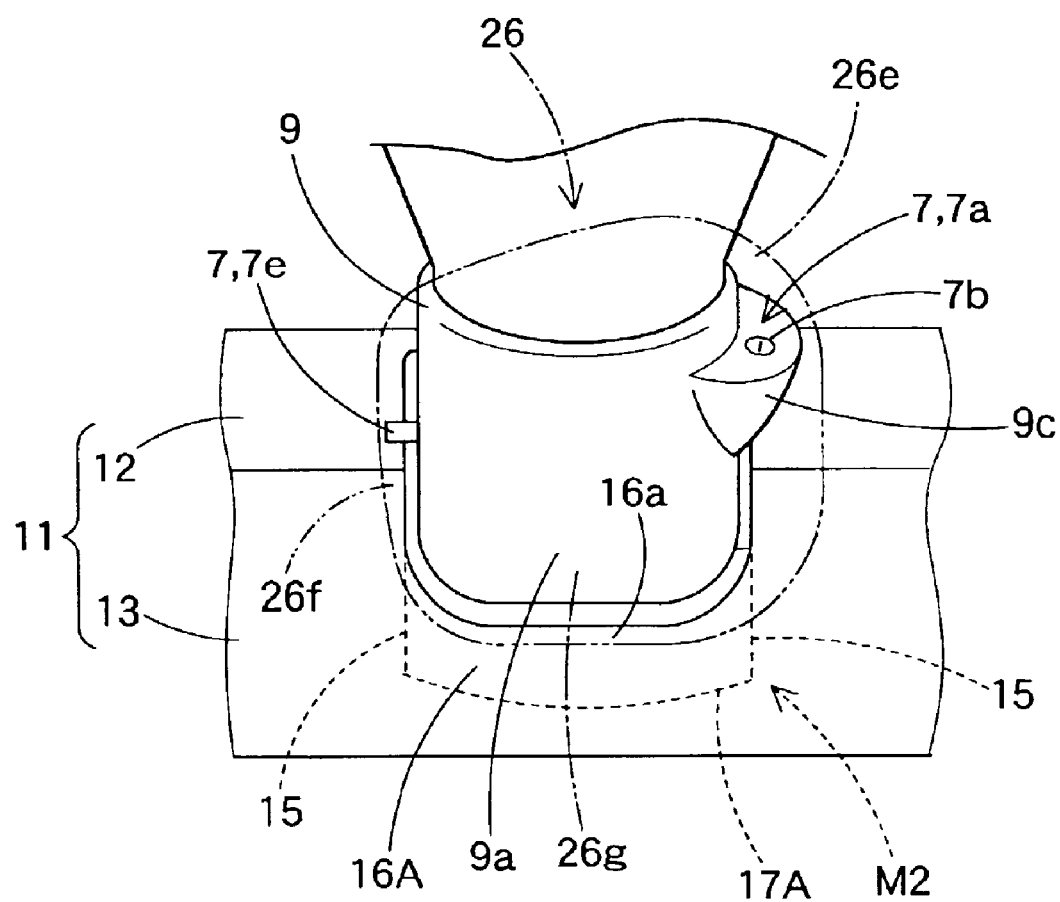
FIG. 20 is a front elevation of the vicinity of a column cover of the second embodiment.
Figure 21:
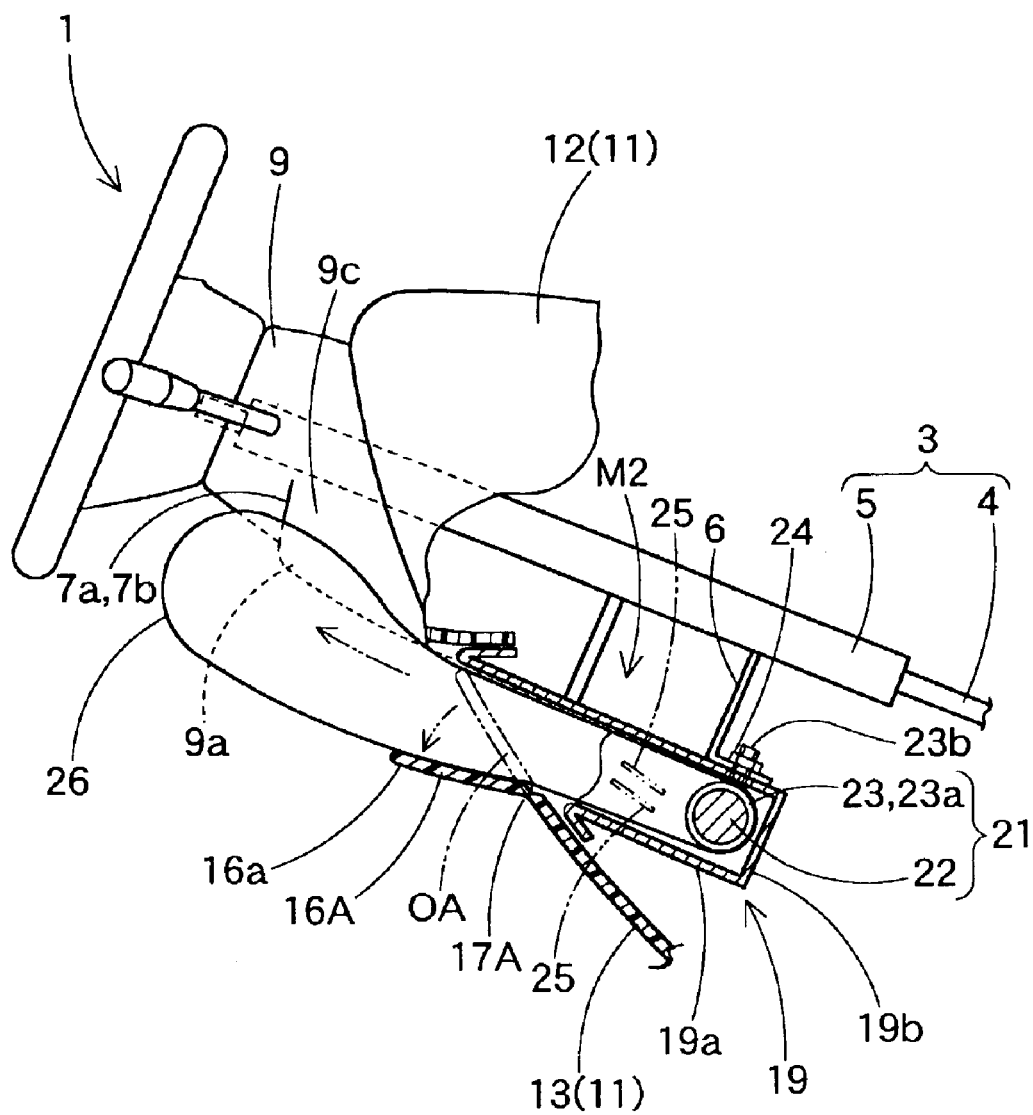
FIG. 21 is a diagram showing an airbag of the second embodiment being expanded and inflated.

On the other hand, the first embodiment has been described on the case in which the door portion 16 to be opened at the expanding and inflating time of the airbag 26 is arranged on the inner side of the lower panel 13 of the dashboard 11. However, the construction may be modified into an airbag device M2 of a second embodiment, as shown in FIGS. 19 to 21. In this airbag device M2, a door portion 16A is disposed at the rear end side of the lower panel 13 at the back of the airbag 26 folded up and housed. This door portion 16A is provided with a hinge portion 17A arranged on the lower edge side, and a breakable portion 15. The hinge portion 17A is arranged generally in a semi-arcuate shape and is constructed of an integral hinge. The portion 15 to be broken is breakably thinned and are extended linearly upward from the left and right ends of the hinge portion 17A. This door portion 16A is opened at the expanding and inflating time of the airbag 26 to break the portions 15 and 15 by the push of the airbag 26 while turning the side of the upper edge 16a backward of the vehicle on the hinge portion 17A. In this door portion 16A, the hinge portion 17A is formed generally into a semi-arcuate shape. Therefore, the door portion 16A does not open fully to the rear side of the vehicle but opens at a small angle. In other words, the door portion 16A plays a role of a guide plate portion for guiding the airbag 26 being expanded and inflated, easily along the column cover lower surface 9a.

Moreover, this airbag device M2 is different from the first embodiment in that a control unit (or a control lever) 7e as the hard portion 7 for both the tilt mechanism and the telescopic mechanism is arranged on the left side face of the column cover 9. However, the remaining members are similar to those of the first embodiment so that their description will be omitted by designating them the common reference numerals.

In this airbag device M2, too, the airbag 26 pushes and opens the door portion 16A and is expanded and inflated while rising from the lower side below the column cover 9 along the column cover lower surface 9a. Moreover, the airbag 26 is formed into such a generally rectangular plate shape as to cover only the substantial lower surface 9a of the column cover 9 when it completes the expansion and inflation. Even if the knee of the driver is close to the column cover 9 when the driver depresses the brake pedal, therefore, the airbag 26 being expanded and inflated goes smoothly into the clearance between the knee of the driver and the column cover lower surface 9a. As a result, the airbag 26 can protect the knee of the driver properly without interfering with the knee as in the first embodiment.

In the second embodiment, moreover, the hinge portion 17A at the opening time is so arranged at the lower end side of the door portion 16A that the door portion 16A covering the folded airbag 26 may be opened downward. In this construction, the door portion 16A is opened from the side of its upper end 16a by the push of the airbag 26 being expanded and inflated. At the beginning of opening of the door portion 16A, therefore, the airbag 26 being expanded and inflated is protruded from the upper side of an open area OA of the door portion 16A. Specifically, the airbag 26 being expanded and inflated is easily protruded upward. As a result, the airbag 26 is smoothly expanded and inflated while rising along the side of the column cover lower surface 9a.

Figure 22:
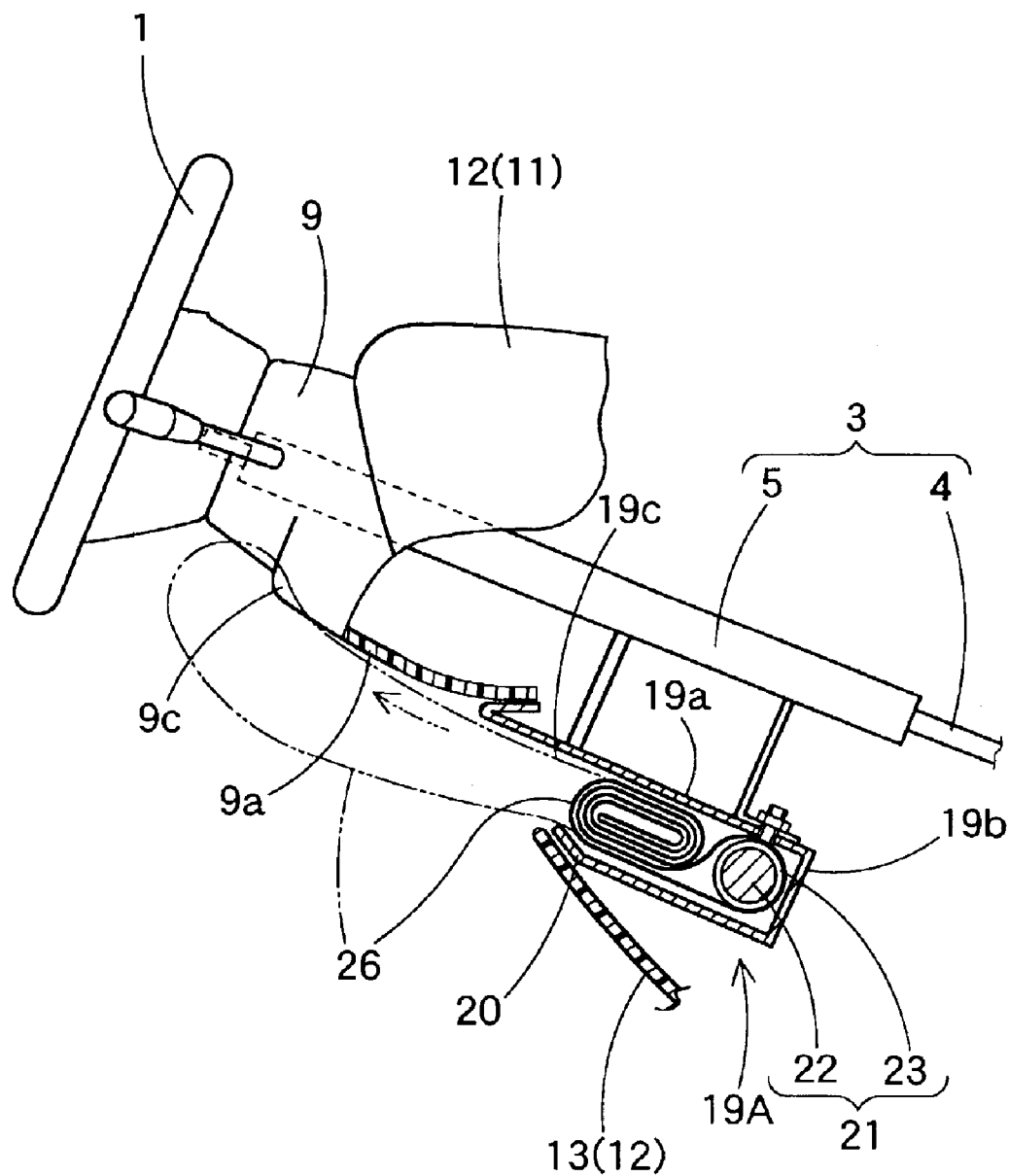
FIG. 22 is a sectional view showing a modification of the airbag device of the second embodiment.

On the other hand, in the first and second embodiments, the door portions 16 and 16A are constructed to play a role of the guide plate portion to guide the airbag 26 to expand and inflate along the column cover lower surface 9a. However, as shown in FIG. 22, there may be disposed a guide plate portion 20 on the lower peripheral edge of the opening 19b on the vehicle's rear side of the peripheral wall portion 19a of a case 19A for guiding the airbag 26 to expand and inflate along the column cover lower surface 9a. In the vicinity of the inflator body 22, moreover, there may also be disposed diffusers 25 (as referred to double-dotted lines of FIGS. 3 and 21) for regulating the flow of the inflating gas discharged from the inflator body 22, so that the inflating gas may flow along the column cover lower surface 9a.

The first and second embodiments are constructed such that the airbag 26 expanded and inflated covers only the side of the substantial lower surface 9a of the column cover 9. However, the airbag may be constructed as in a knee protecting airbag device M3 of a third embodiment.

Figure 23:
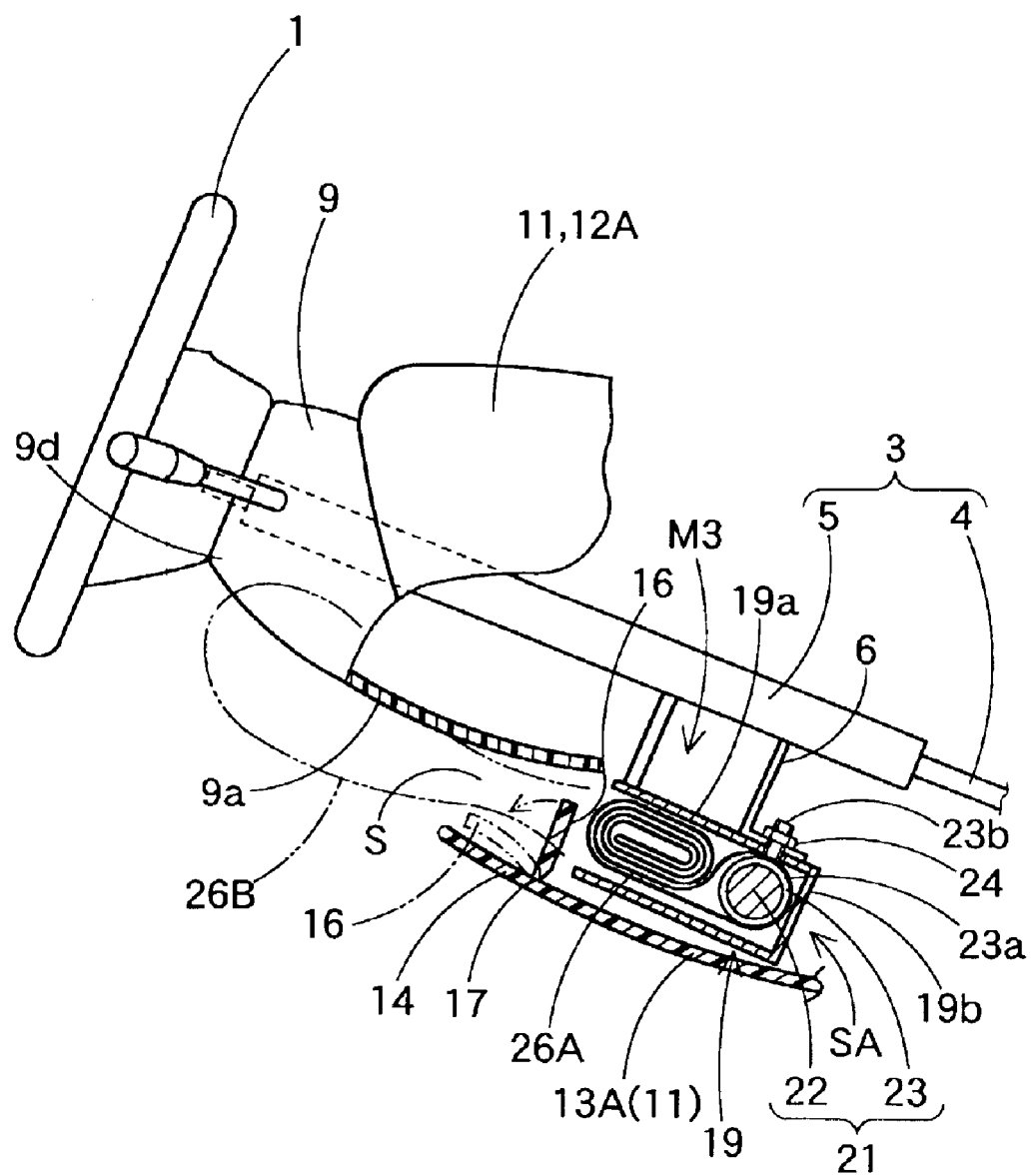
FIG. 23 is a sectional view showing an airbag device of a third embodiment in use.
Figure 24:
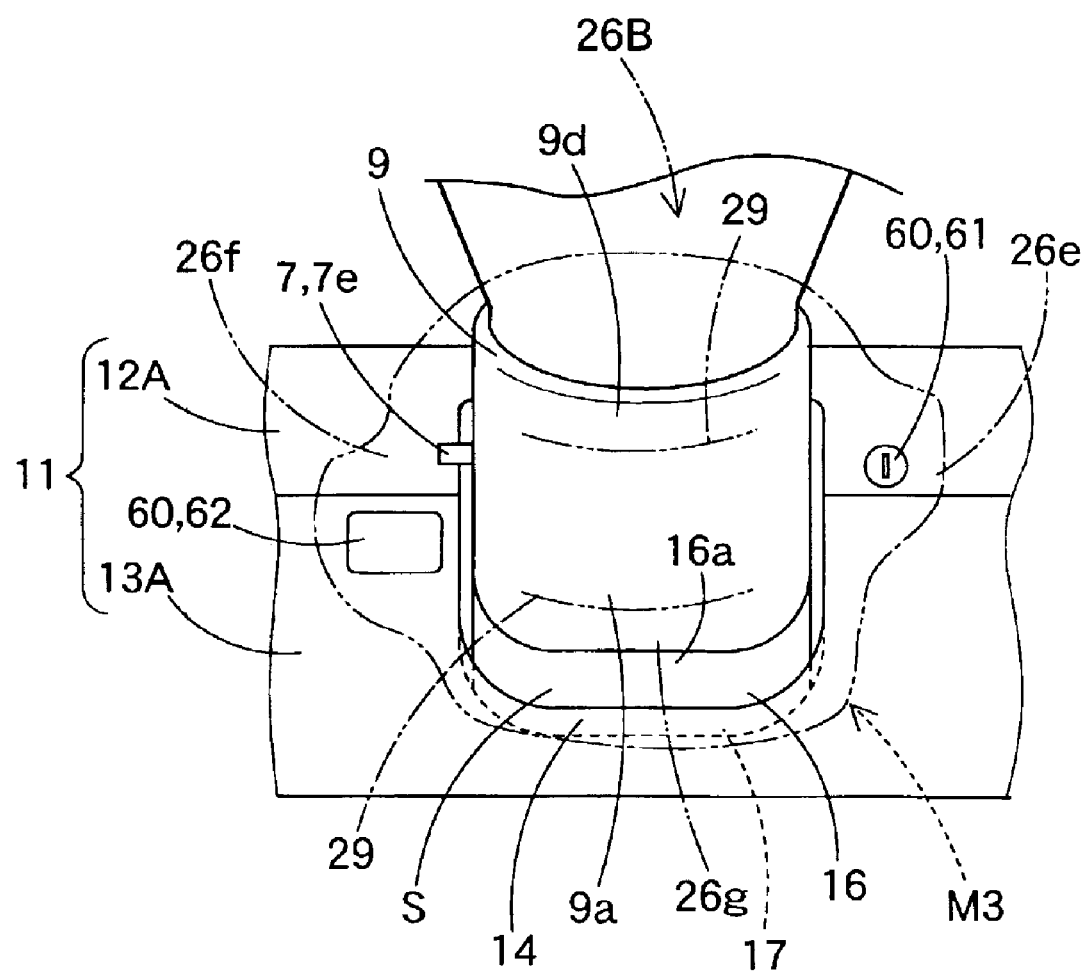
FIG. 24 is a front elevation of the vicinity of a column cover of the third embodiment.

This knee protecting airbag device M3 is constructed, as shown in FIGS. 23 and 24, such that an airbag 26B expanded and inflated may cover the side of the column cover lower surface 9a and the dashboard 11 near the column cover 9. At an upper panel 12A of the dashboard 11 to be covered with the airbag 26B, moreover, there is arranged a key cylinder 61 which is located on the right side of the column cover 9. At a portion of a lower panel 13A of the dashboard 11 to be covered with the airbag 26B, on the other hand, there is arranged a parking brake release lever 62 which is located on the left side of the column cover 9. These portions form a hard portion 60 of the dashboard 11. Moreover, the airbag 26B to be expanded and inflated is provided like the airbag 26 with the body portion 26g and the cover portions 26e and 26f. The body portion 26g covers the side of the lower surface 9a of the column cover 9. The cover portion 26e covers the area from the lower face side to the vicinity of the rear face side of the key cylinder 61. The cover portion 26f covers the area from the lower face side to the rear face side of the release lever 62. The key cylinder 61 is also made hard of a metal block.

Here, the airbag 26B is formed as in the first embodiment into a generally rectangular plate shape by arranging a plurality of tethers 29 similar to those of the first embodiment therein. Moreover, the remaining portions of the upper panel 12A and the lower panel 13A or the constructions of the case 19 and the inflator 21 are similar to those of the first embodiment. Therefore, the description of those portions will be omitted by designating them the same reference numerals as those of the first embodiment. On the left side face of the column cover 9, on the other hand, the control unit (or the control lever) 7e for both the tilt mechanism and the telescopic mechanism forming the hard portion 7 is arranged as an accessory of the steering column 3. Moreover, the mounting process of this airbag device M3 on the vehicle is similar to that of the first embodiment.

In this airbag device M3 of the third embodiment, the airbag 26B is expanded and inflated while rising upward from the lower side below the column cover 9 along the column cover lower surface 9a to the vicinity of the rear end 9d.

The airbag 26B having completed the expansion and inflation covers not only the column cover lower surface 9a but also a part of the dashboard 11 near the column cover 9. In short, the airbag 26B covers the side of the column cover lower surface 9a over a wide range. Therefore, the airbag 26B protects a wider range than the airbag 26. In other words, the airbag 26B protects the knee of the driver effectively over a wide range. Especially in the third embodiment, the key cylinder 61 and the release lever 62 to form the hard portion 60 are covered with the cover portions 26e and 26f even if they are arranged in the upper panel 12A and the lower panel 13A. Therefore, the airbag 26B can protect the knee of the driver properly from the members 61 and 62 forming the hard portion 60.

Moreover, the airbag 26B takes such a generally rectangular plate shape after completing the inflation as covers the lower surface 9a of the column cover 9. Even if the knee of the driver is close to the column cover 9 in the state where the driver depresses the brake pedal, therefore, the airbag 26B being expanded and inflated goes smoothly between the knee of the driver and the column cover lower surface 9a. Moreover, the airbag 26B having completed the expansion and inflation protects the knee of the driver properly preventing the knee from interfering with the column cover 9. In this case, too, at the expanding and inflating time, the airbag 26B rises along the column cover lower surface 9a so that it goes more smoothly into the clearance between the knee of the driver and the column cover lower surface.

In this airbag 26B, too, of course, the tethers 29 are used to connect the peripheral walls opposed in the thickness direction of the airbag 26B to each other. Therefore, the airbag 26B having completed the inflation can easily keep the generally plate shape and is easily arranged in the narrow space between the column cover lower surface 9a and the knee of the driver. Moreover, this airbag 26B is also provided, by the tethers 29, with a plurality of connection portions for connecting the peripheral walls to each other. Therefore, the airbag 26B to be expanded and inflated is formed more easily in its entirety into the plate shape.

Here, this airbag 26B may also be constructed to cover not only the key cylinder 61 and the release lever 62 and the hard portion 60 exposed or protruded from the dashboard 11, but also the portions near the column cover 9 where the rigid parts are arranged in the dashboard 11. Specifically, the airbag 26B may be constructed to cover not only the hard portion 7 of the column cover 9 or the hard portion 60 of the dashboard 11, as seen from the outside, but also the hard area including the hard portions arranged within the column cover 9 or the dashboard 11.

Moreover, this airbag 26B may also be so constructed by using the joint portions 39 or 79, the tuck 49 or the length adjusting cloth 69, or by jointing solid cut materials as to extend along the column cover lower surface 9a.

Figure 25:
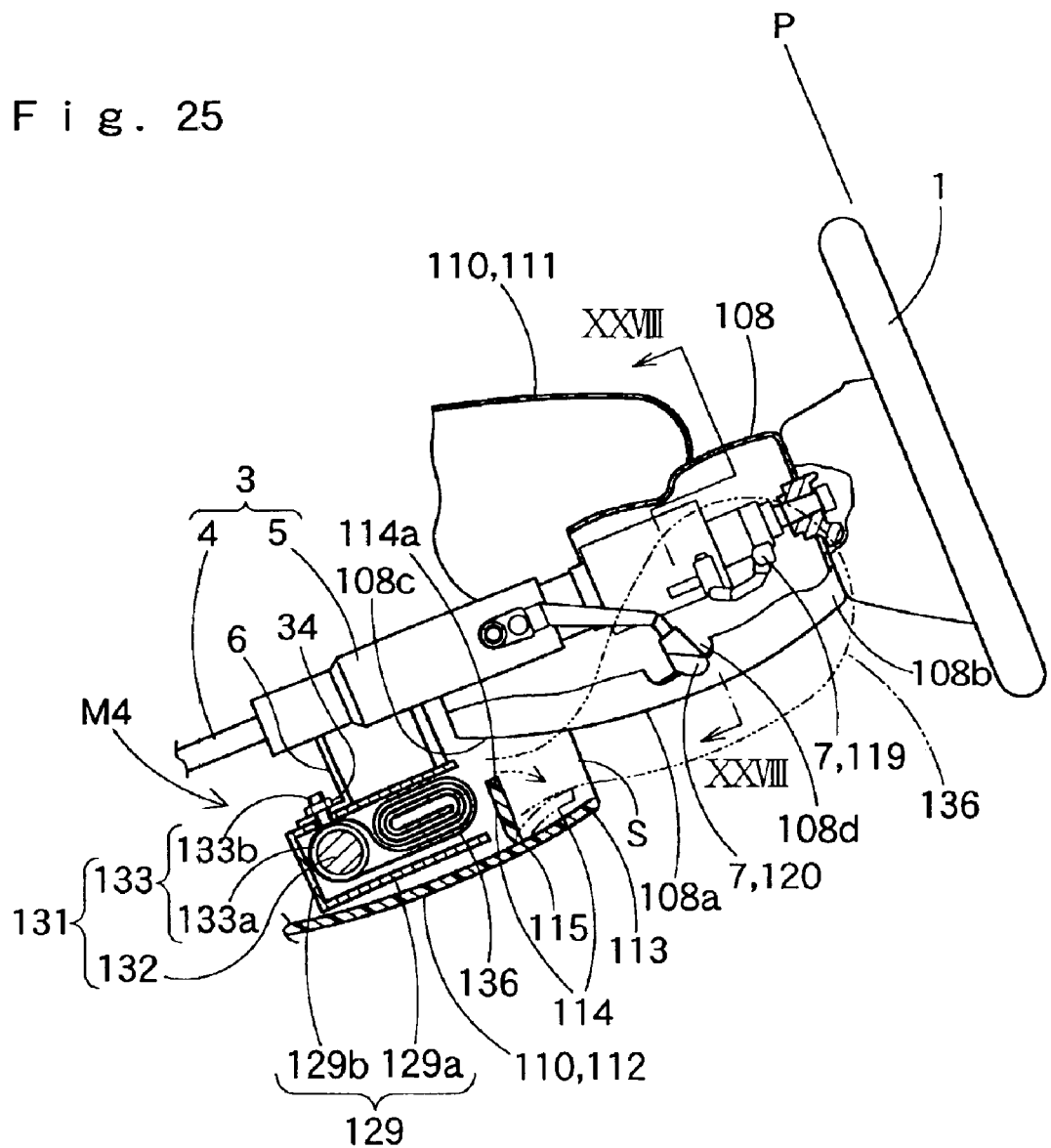
FIG. 25 is a sectional view showing a knee protecting airbag device of a fourth embodiment in use, as taken from the lefthand side of a steering column.
Figure 26:
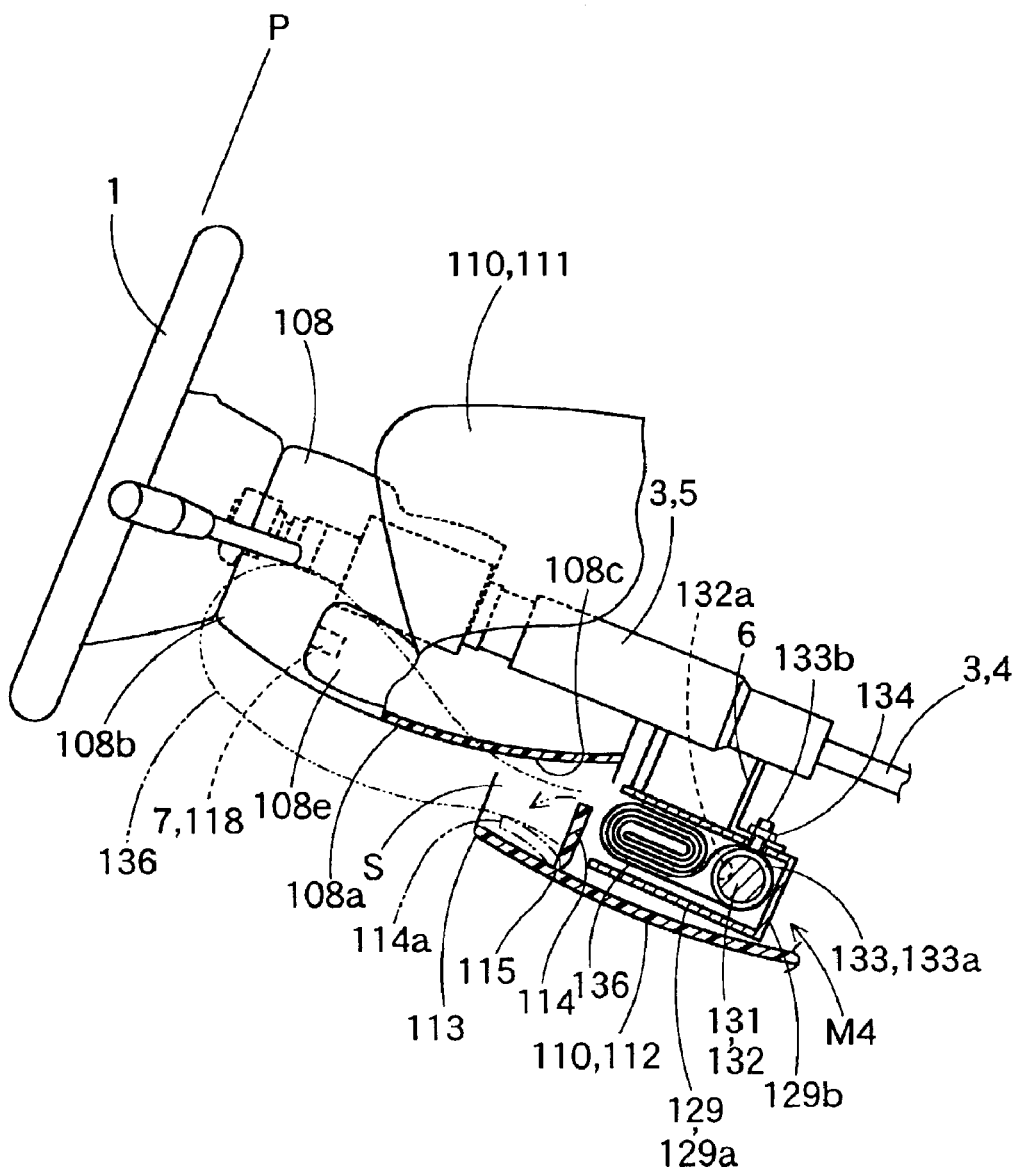
FIG. 26 is a sectional view showing the fourth embodiment in use, as taken from the righthand side of the steering column.
Figure 27:
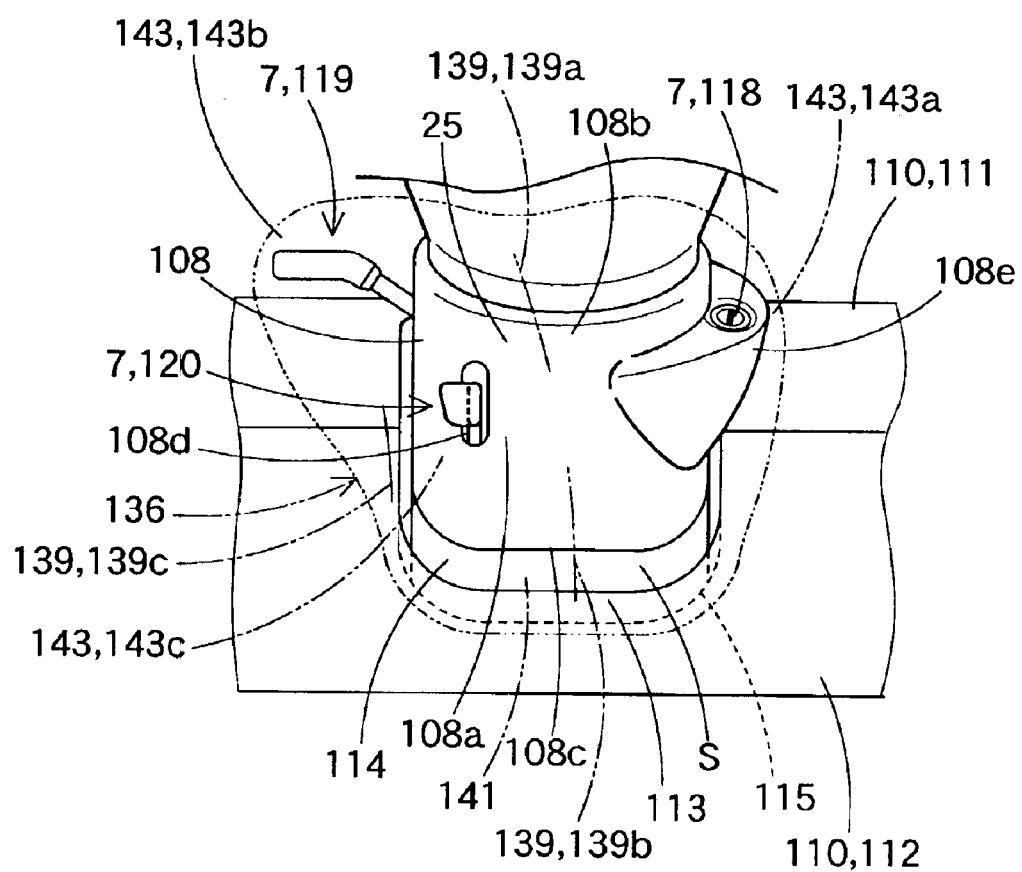
FIG. 27 is a front elevation of the vicinity of a column cover of the fourth embodiment.

Here will be described a knee protecting airbag device M4 of a fourth embodiment, as shown in FIGS. 25 to 27. This airbag device M4 is arranged below the steering column 3 and below the side of the lower surface 108a of a column cover 108. This airbag device M4 is constructed to include: a folded airbag 136; an inflator 131 for feeding the inflating gas to the airbag 136; and a case 129 housing the airbag 136 and the inflator 131.

The column cover 108 is made of a synthetic resin generally into a shape of a square cylinder, and covers the steering column 3 below a steering wheel 1. And the column cover 108 is arranged along the axial direction of the steering column 3. Like the column cover 9 of the first to third embodiment, the column cover 108 is arranged at such a backward rising inclination as to have its upper end 108b on the side of the lower surface 108a arranged on the vehicle's rear side and its lower end 108c on the side of the lower surface 108a arranged on the vehicle's front side. Moreover, the lower surface 108a of the column cover 108 is formed like the column cover lower surface 9a to have a generally rectangular shape and is curved to rise backward in the longitudinal direction of the vehicle.

The steering column 3 is provided as its accessories with: a key cylinder 118 for locking the steering of the steering wheel 1; a tilt mechanism control unit (or a control lever) 119; and a telescopic mechanism control unit (or a control lever) 120. These parts 118, 119 and 120 are exposed or protruded from the column cover 108. The key cylinder 118 made of a metal block is arranged on the righthand side face of the column cover 108, and a cover portion 108e is protruded in a generally halved frusto-conical shape from the column cover 108 to cover the key cylinder 118. The tilt mechanism control lever 119 is arranged on the lefthand side of the column cover 108, and the telescopic mechanism control lever 120 is so arranged as is protruded from a through hole 108d on the left edge side of the column cover lower surface 108a.

In the case of the fourth embodiment, those key cylinder 118, tilt mechanism control lever 119 and telescopic mechanism control lever 120 construct the hard portion 7 on the side of the column cover 108. This hard portion 7 is covered thick with the airbag 136. The portion of the column cover 108 other than the hard portion 7 constructs a non-hard portion 25. This non-hard portion 25 is covered less thick with a general portion 141 of the airbag 136 than the hard portion 7.

The steering column 3 is constructed, as in the first to third embodiments, to include the main shaft 4 connected to the steering wheel 1, and the column tube 5 covering the main shaft 4.

The case 129 is made of a sheet metal and constructed, like the cases 19 and 19A of the first to third embodiments, to include a peripheral wall portion 129a of a generally perpendicular cylinder shape, and a bottom wall portion 129b having a generally rectangular shape and closing the bottom of the peripheral wall portion 129a. Like the individual embodiments, moreover, the case 129 is connected and fixed to an immovable portion of the column tube 5 by means of the bracket 6 and is arranged such that the axial direction of the peripheral wall portion 129a extends along the column cover lower surface 108a (or along the axial direction of the steering column 3).

The inflator 131 is constructed to include a cylinder type body 132 and two bracket portions 133. The body 132 is provided with gas discharge ports 132a (as referred to FIG. 26) for discharging the inflating gas therefrom. Like the individual embodiments, moreover, the body 132 acts in response to an electric signal coming from the predetermined control unit simultaneously with the airbag device for the steering wheels. The bracket portions 133 are constructed, like the bracket portions 23 of the first embodiment, to include retaining rings 133a made of a sheet metal and capable of clamping the body 132, and bolts 133b protruded from the retaining rings 133a. This inflator 131 is also enveloped in the airbag 136 after assembling the bracket portions 133 with the body 132. Then, the bolts 133b protruded from the airbag 136 are inserted into the case 129 and is fastened to the bracket 6 by using nuts 134, so that the inflator 131 is mounted and fixed on the bracket 6 together with the airbag 136 and the case 129.

The airbag 136 housed in the case 129 is housed below the steering column 3 and within a lower panel 112. This lower panel 112 is arranged on the lower side of an dashboard 110 covering the column cover 108. On the side of the column cover lower surface 108a of the lower panel 112, there is arranged a peripheral edge portion 113 which has a generally halved square cylinder shape. A clearance S is formed between the peripheral edge portion 113 and the peripheral edge of the column cover lower surface 108a. In the interior side of the peripheral edge portion 113 on the vehicle's front side, there is arranged a flat-shaped door portion 114 to cover the rear side of the airbag 136 folded up and housed. At the boundary portion between the lower edge side of the door portion 114 and the lower panel 112, there is arranged a hinge portion 115 which is made of an integral hinge.

Like the door portion 16 of the first embodiment, this door portion 114 is so opened when the airbag 136 is expanded and inflated that its upper edge 114a is turned on the hinge portion 115 to the vehicular rear side by the push of the airbag 136. The hinge portion 115 is curved along the peripheral edge portion 113. Therefore, the door portion 114 does not open fully to the vehicular rear side but opens at a small angle. As a result, this door portion 114 plays a role of a guide plate portion for guiding the airbag 136 to inflate and expand easily along the column cover lower surface 108a. Here, the column cover 108 is covered on its upper face side with an upper panel 111 of the dashboard 110.

Figure 29:
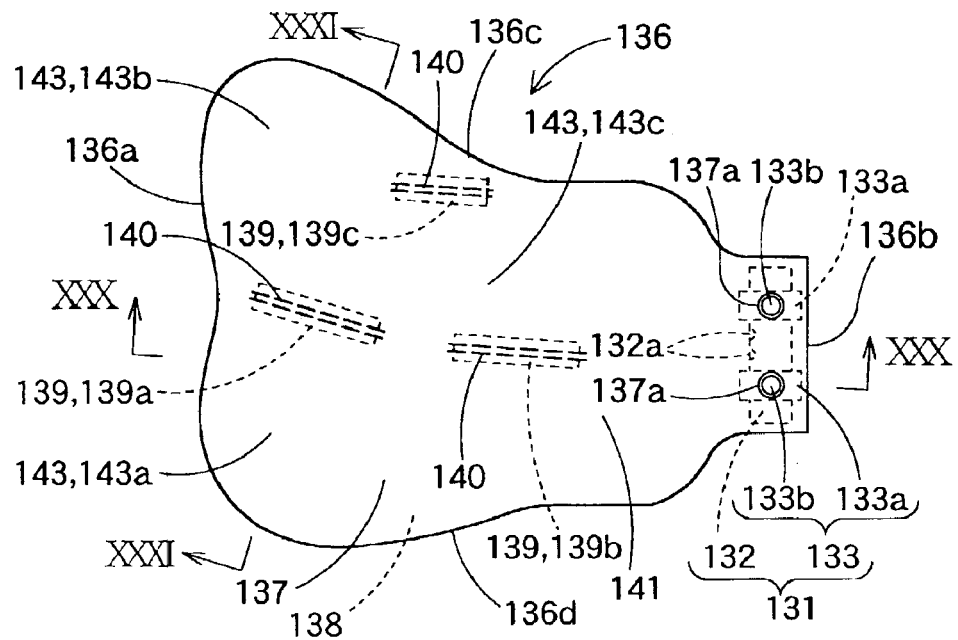
FIG. 29 is a top plan view of an airbag used in the fourth embodiment.
Figure 30:
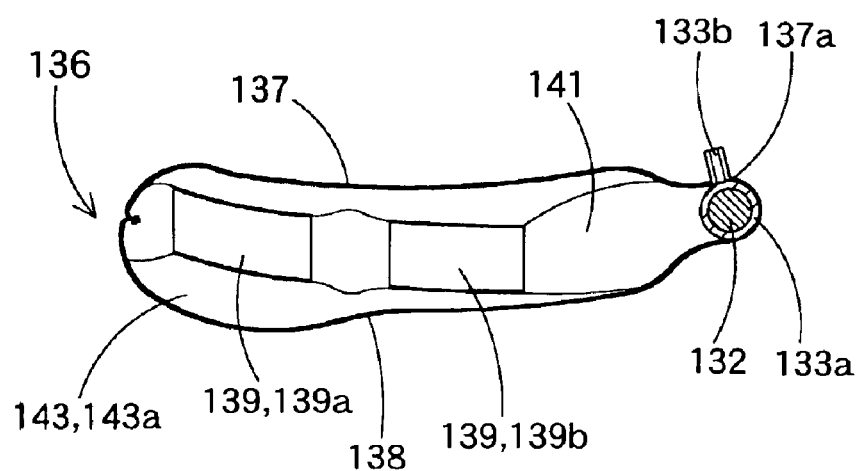
FIG. 30 is a sectional view of a portion XXX—XXX of FIG. 29.
Figure 31:
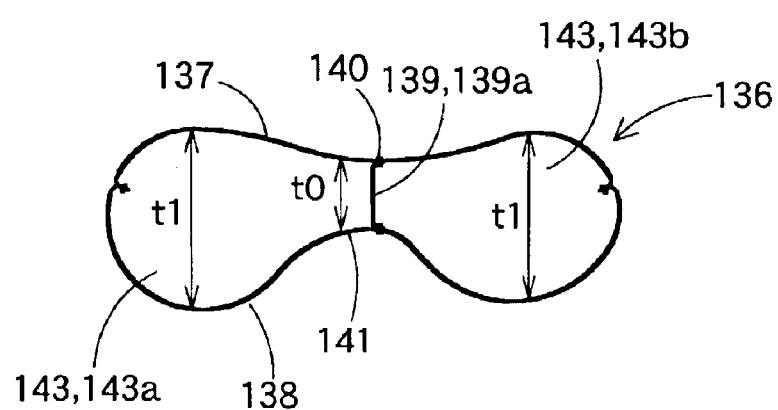
FIG. 31 is a sectional view of a portion XXXI—XXXI of FIG. 29.

The airbag 136 is formed of a flexible woven fabric of polyester, polyamide or the like, and takes such a generally rectangular plate shape when it completes the expansion and inflation as to cover the side of the lower surface 108a of the column cover 108. In the case of the embodiment, the airbag 136 has a peripheral wall constructed, as shown in FIGS. 29 to 31, to include a column cover side wall 137 on the upper face side and a driver's side wall 138 on the lower face side, and these walls 137 and 138 are opposed in the thickness direction to each other.

As shown in FIG. 27, moreover, the airbag 136 having completed the expansion and inflation covers almost the whole area of only the side of the substantial column cover lower surface 108a from the upper end 108b including the portion of the through hole 108d to the lower end 108c. The airbag 136 is formed in such a transverse width that the side of its upper end 108b covers a wider range than the column cover 108 itself. Therefore, the airbag 136 covers the area from the portion 108e of the key cylinder 118 as the hard portion 7 to the tilt mechanism control lever 119 as the hard portion 7.

As shown in FIGS. 27 to 31, moreover, the airbag 136 is made thicker in a portion 143 (including thick portions 143a, 143b and 143c) for covering the key cylinder 118, the tilt mechanism control lever 119 and the telescopic mechanism control lever 120, that is, the hard portion 7 on the side of the column cover 108. Specifically, the thick portion 143 has a larger vertical thickness t1 (as referred to FIG. 31) than the thickness t0 of the general portion 141 for covering the remaining non-hard portion 25.

In the case of the embodiment, these thickness sizes are set by a plurality of (or three in the embodiment) tethers 139 (i.e., 139a, 139b and 139c). These tethers 139 (139a, 139b and 139c) connect the column cover side wall portion 137 and the driver side wall portion 138 partially to each other by using a sewing thread 140. These tethers 139 (139a, 139b and 139c) positively provide the airbag 136 with the thin portions with reduced thickness. On the contrary, the tethers 139 (139a, 139b and 139c) provide the thick portions 143 with larger thickness by leaving the remaining portion thick. The tethers 139a and 139b are arranged in tandem in the longitudinal direction of the vehicle at the transverse center of the airbag 136 and closer to the right side face of the column cover 108. The tether 139c is arranged in the longitudinal direction at the side of the lower end 108c closer to the left side face of the column cover 108. These tethers 139 arrange the thick portion 143a for covering the portion of the key cylinder 118 on the side of a right edge 136d on the side of the rear end 136a of the airbag 136, the thick portion 143b for covering the portion of the tilt mechanism control lever 119 on the side of a left edge 136c on the side of the rear end 136a of the airbag 136, and the thick portion 143c for covering the portion of the telescopic mechanism control lever 120 in the intermediate portion of the front and rear ends 136b and 136a closer to the left side.

In the airbag 136 of the fourth embodiment, like the airbag 26 of the first embodiment, the longitudinal length in the vicinity of the transverse center of the column cover side wall portion 137 is set shorter than the longitudinal length of the corresponding driver side wall portion 138. By this construction, the column cover side wall portion 137 of the airbag 136 being expanded and inflated extends closely along the backward rising curve of the column cover lower surface 108a. In the column cover side wall portion 137 on the side of the front end (or lower end) 136b of the air bag 136, there are formed through holes 137a for inserting the individual bolts 133b of the inflator 131 thereinto.

Here will be described how to mount the airbag device M4 on the vehicle. Like the first embodiment, first of all, the airbag 136 is folded up while having the inflator 131 packaged therein. Here, the individual bolts 133b of the inflator 131 are protruded from the through holes 137a. Not-shown action signal inputting lead wires extending from the inflator body 132 are led out from predetermined not-shown holes of the airbag 136.

Moreover, the airbag 136 is wrapped, after being folded up, with not-shown breakable wrapping film, and the individual bolts 133b are protruded out from the case 129 through the wrapping film. Then, the individual bolts 133b thus protruded are assembled with not-shown spring nuts of a thin plate, and the folded airbag 136 and the inflator 131 are housed in the case 129.

Here, the folding method of the airbag 136 is similar to that of the airbag 26 of the first embodiment. Specifically, from the state in which the column cover side wall portion 137 and the driver side wall portion 138 are overlapped and expanded flat, both the left and right edges 136c and 136d are folded back to the center on the side of the column cover side wall portion 137. Then, the airbag 136 is folded, as shown in FIG. 25, to roll up the side of its rear end (or upper end) 136a to the upper face side or the column cover side wall portion 137.

The not-shown lead wires extending from the inflator body 132 are led out from the wrapping film and the not-shown through holes of the case.

Subsequently, the airbag device M4 housed in the case 129 is mounted on the vehicle by fixing itself on the bracket 6 by means of the nuts 134, connecting the not-shown lead wires with the control circuit, and by mounting the dashboard 110 on the vehicle.

If a predetermined electric signal is inputted to the inflator body 132 after the airbag device M4 was mounted on the vehicle, the inflating gas is discharged from the gas discharge ports 132a. The airbag 136 is then inflated to break the not-shown wrapping film to push and open the door portion 114 of the lower panel 112, so that it is expanded and inflated while rising along the column cover lower surface 108a.

Figure 28:
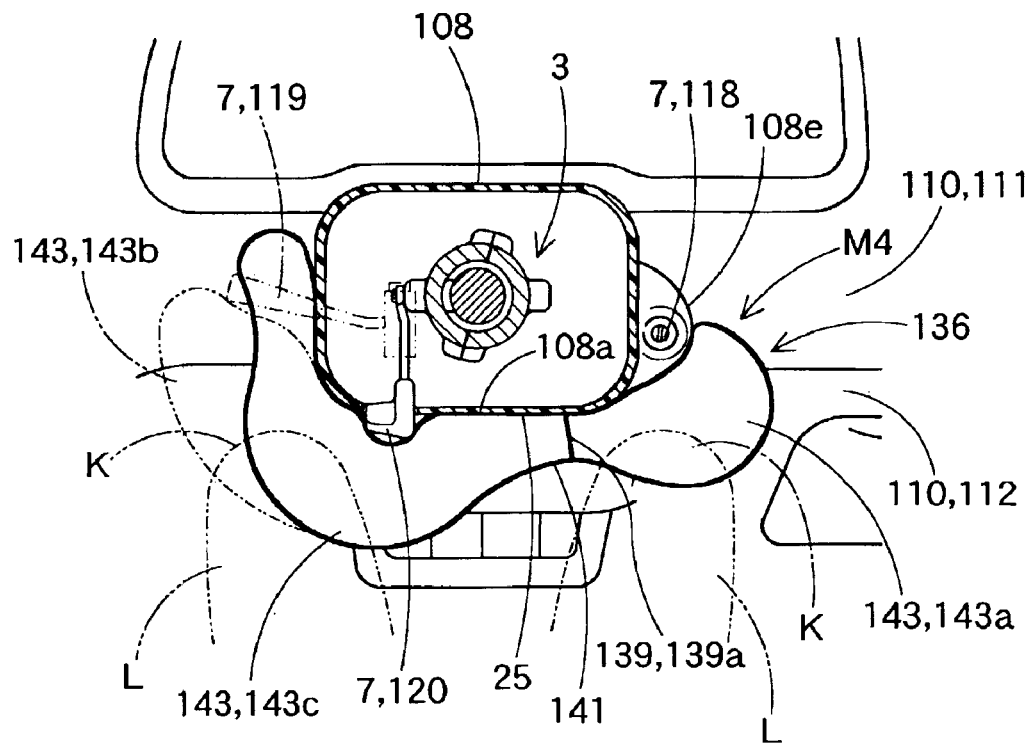
FIG. 28 is a schematic section showing the airbag of the fourth embodiment having completed the expansion and inflation and corresponds to a portion XXVIII—XXVIII of FIG. 25.

Moreover, the airbag 136 having completed the expansion and inflation is formed into a generally plate shape, as shown in FIGS. 27 and 28, to cover only the side of the substantial column cover lower surface 108a. Like the first embodiment, therefore, the airbag 136 can minimize its capacity without deteriorating the protection performance of the knee K of the driver, so that the time period required for completing the expansion and inflation is shortened. Moreover, since the airbag 136 takes such a generally plate shape when completing the inflation as covers only the lower surface 108a of the column cover 108, the expanded and inflated airbag 136 is smoothly arranged in the narrow space between the knee K of the driver and the column cover lower surface 108a. In this case, too, at the expanding and inflating time, the airbag 136 rises along the column cover lower surface 108a so that it goes more smoothly into the clearance between the knee K of the driver and the column cover lower surface 108a. Moreover, the minimum capacity of the airbag 136 helps downsize the airbag device M4 including the inflator 131 for feeding the inflating gas to the airbag 136, thereby to mount the airbag device M4 easily on the vehicle without interference with the surrounding parts.

In the fourth embodiment, moreover, the airbag 136 covers the key cylinder 118, the tilt mechanism control lever 119 and the telescopic mechanism control lever 120 with its thick portions 143 (i.e., 143a, 143b and 143c) which has large thickness. Therefore, even if the knee K including the leg L of the driver, which would otherwise interfere with the hard portion 7 (i.e., 118, 119 and 120), is retrained by the thick portion 143 (i.e., 143a, 143b and 143c) of the airbag 136 having high cushionability so that the knee K of the driver is properly protected.

Especially, the airbag 136 is not thickened as a whole, but only the portion 143 to cover the hard portion 7 is set thicker than the remaining general portion 141 to cover the non-hard portion 25. In other words, the remaining general portion 141 can be thinned as much as possible. Therefore, the airbag 136 can minimize the capacity when completing the inflation and can shorten the time period from the action start to the completion of the expansion and inflation. Moreover, the airbag 136 can be made compact when housed. Because of this compactness, the airbag 136 is naturally and easily expanded and inflated and arranged in the narrow space between the column cover 108 and the knee K.

In the fourth embodiment, moreover, the setting of the thickness of the airbag 136 is adjusted by the tethers 139 which connect the peripheral walls opposed in the thickness direction, i.e., the column cover side wall portion 137 and the driver side wall portion 138 to each other. With this construction, the portions 141 and 143 having different thickness are easily formed in the airbag 136 by connecting the column cover side wall portion 137 and the driver side wall portion 138 partially to each other. Moreover, it is easy to position the thick portions 143 in the airbag 136 as well.

When connecting the peripheral walls mutually, moreover, a plurality of connection portions may be arranged in the airbag 136. Then, the airbag 136 to be expanded and inflated is more easily formed in its entirety into a plate shape, and the thick portions 143 is easily provided at the predetermined positions.

Here, the airbag 136 should not be limited only to covering thickly the hard portion 7 (e.g., 118, 119 and 120) exposed or protruded from the column cover 108, as in the embodiment. If such rigid accessories (e.g., a tilt motor to be used in an electric tilt mechanism) are arranged in the column cover 108 while being completely covered with the column cover 108, the arranged portion may be covered as the hard area together with the hard portion 7 with the thick portions 143 of the airbag 136.

Figure 32:
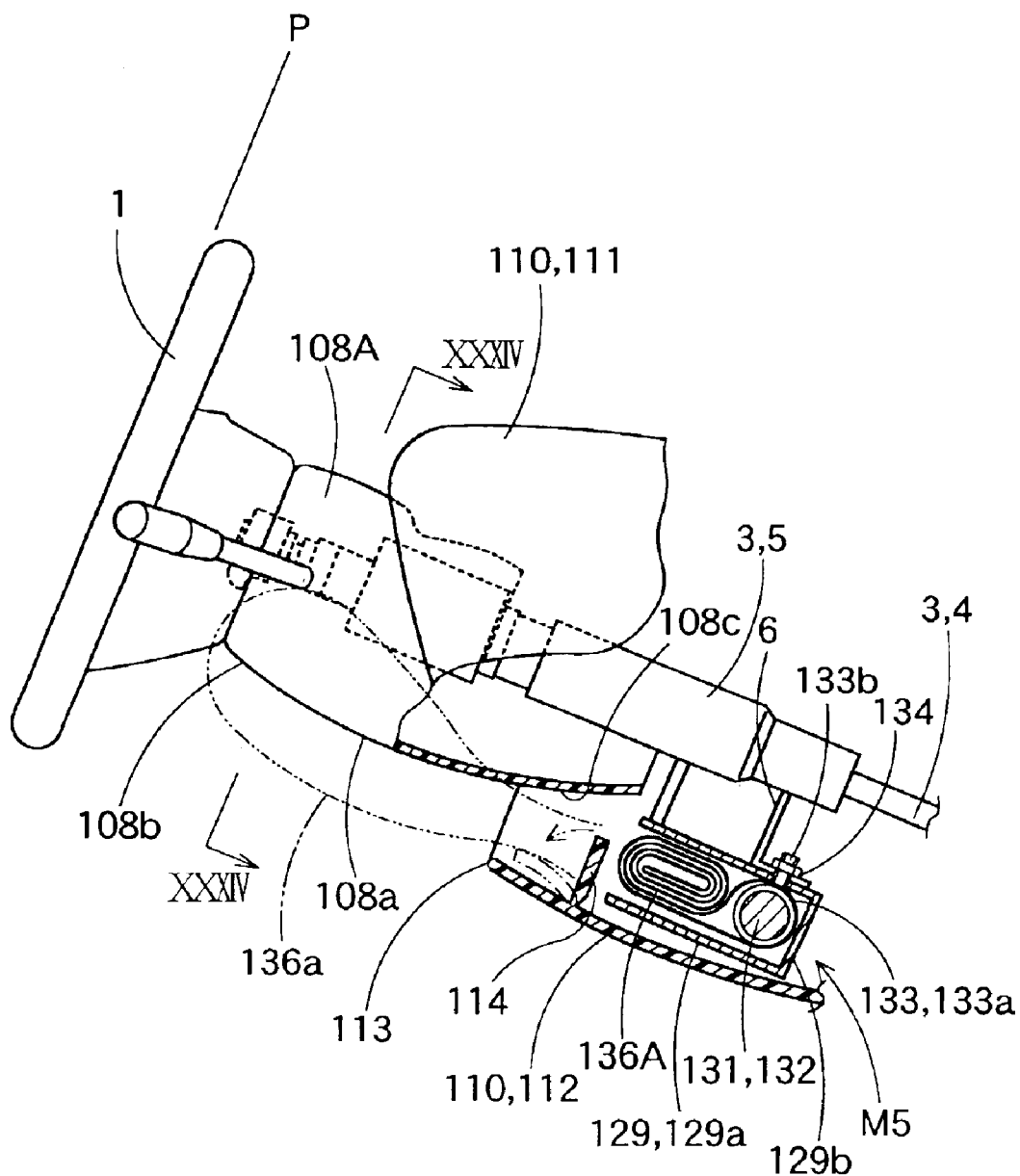
FIG. 32 is a sectional view showing an airbag device of a fifth embodiment in use.
Figure 33:
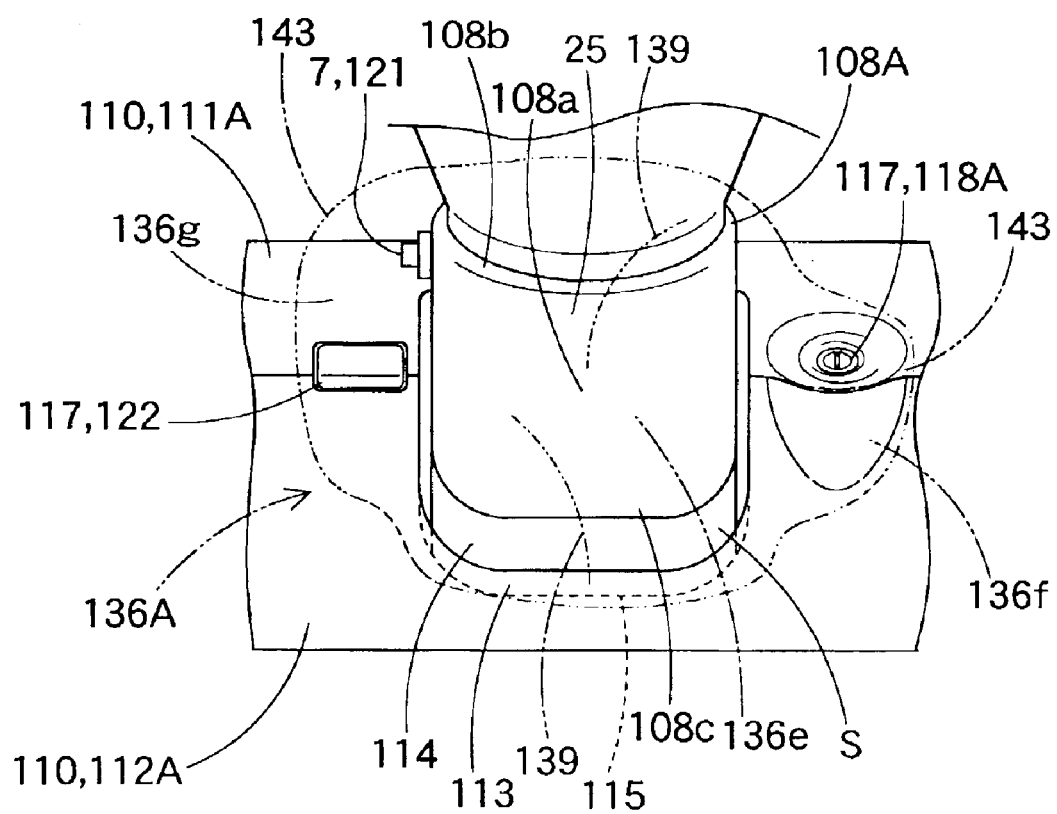
FIG. 33 is a front elevation of the vicinity of a column cover of the fifth embodiment.
Figure 34:
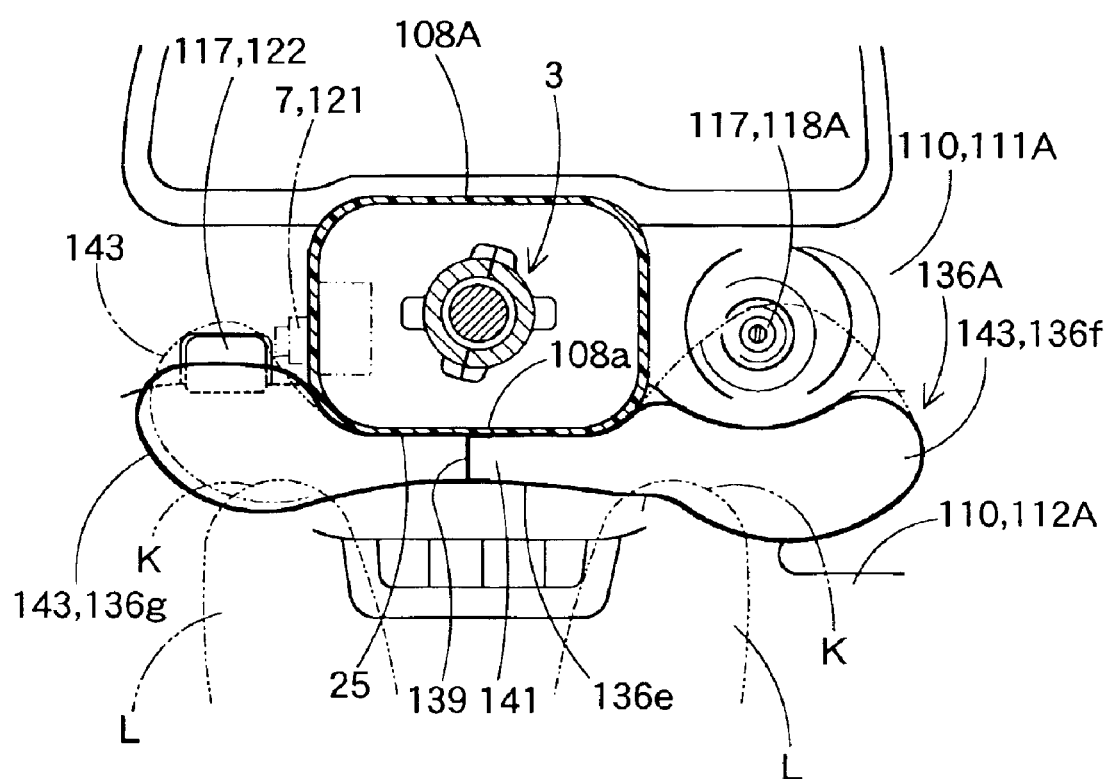
FIG. 34 is a schematic section showing the airbag of the fifth embodiment having completed the expansion and inflation and corresponds to a portion XXXIV—XXXIV of FIG. 32.

The fourth embodiment is constructed such that the airbag 136 expanded and inflated covers the lower side of the hard portion 7 (e.g., 118, 120 and 119) on the side of the substantial lower surface 108a of the column cover 108. As shown in FIGS. 32 to 34, however, the construction may be modified into a knee protecting airbag device M5 of a fifth embodiment.

This knee protecting airbag device M5 is constructed such that an airbag 136A expanded and inflated covers a hard portion 117 arranged in the dashboard 110 near a column cover 108A. In a portion of an upper panel 111A of the dashboard 110 to be covered with the airbag 136A, there is arranged a key cylinder 118A belonging to the hard portion 117. This key cylinder 118A is arranged at a portion of the upper panel 111A on the right side of the column cover 108A. At the boundary portion between the upper panel 111A and a lower panel 112A of the dashboard 110 to be covered with the airbag 136A, there is arranged a parking brake release lever 122 belonging to the hard portion 117. This release lever 122 is arranged on the left side of the column cover 108A. On the left side face of the column cover 108A, there is arranged a control lever 121 for the electric tilt/telescopic mechanism as belongs to the hard portion 7.

Moreover, the airbag 136A to be expanded and inflated is constructed to include a body portion 136e and cover portions 136f and 136g. The body portion 136e covers the side of the lower surface 108a of the column cover 108A. The cover portion 136f covers the key cylinder 118A from the lower face side to the rear face side. The cover portion 136g covers the release lever 122 from the lower face side to the rear face side. A part of the body portion 136e to cover the control lever 121 and the cover portions 136f and 136g are constructed as the thick portion 143. The thick portion 143 is made thicker than the remaining general portion 141.

As in the fourth embodiment, this airbag 136A is constructed into a generally rectangular plate shape and has a plurality of tethers 139 arranged therein for connecting the column cover side wall portion 137 and the driver side wall portion 138 partially to each other. The thick portion 143 is formed by these tethers 139. The constructions of the remaining portions of the upper panel 111A and the lower panel 112A, or the case 129 and the inflator 131 are similar to those of the fourth embodiment. The description of those portions will be omitted by designating them the same reference numerals as those of the fourth embodiment. Moreover, the mounting process of this airbag device M5 on the vehicle is similar to that of the fourth embodiment.

In this airbag device M5 of the fifth embodiment, too, at the action time, the airbag 136A is expanded and inflated while rising along the column cover lower surface 108a from the lower side below the column cover 108A. Like the third embodiment, the airbag 136A having completed the expansion and inflation covers not only the column cover lower surface 108a but also a part of the dashboard 110 near the column cover 108A. In other words, the airbag 136A covers the side of the column cover lower surface 108a over a wide range. Therefore, the airbag 136A protects a wider area than the airbag 136. In other words, the airbag 136A protects the knee of the driver effectively over the wide range. In the fifth embodiment, moreover, even if the key cylinder 118A and the release lever 122 forming the hard portion 117 are arranged in the upper panel 111A and the lower panel 112A, this hard portion 117 is covered with the cover portions 136f and 136g. Therefore, the airbag 136A protects the knee of the driver properly from the members 118A and 122 forming the hard portion 117.

As in the third and fourth embodiments, moreover, the airbag 136A takes, when completing the inflation, a generally rectangular plate shape capable of covering the side of the lower surface 108a of the column cover 108A. Even if the driver depresses the brake pedal to bring the knee close to the column cover 108A, therefore, the airbag 136A to be expanded and inflated goes smoothly into the clearance between the knee of the driver and the column cover lower surface 108a. In this case, too, the airbag 136A to be expanded and inflated rises along the column cover lower surface 108a so that it goes more smoothly into the clearance between the knee of the driver and the column cover lower surface 108a. Therefore, the airbag 136A having completed the expansion and inflation protects the knee properly while keeping the knee of the driver away from the column cover 108A.

It is natural that this airbag 136A also connects the peripheral walls opposed in the thickness direction of the airbag 136A partially to each other, by using the tethers 139. Therefore, the airbag 136A having completed the inflation easily keeps a generally plate shape and thus is arranged in the narrow space between the column cover lower surface 108a and the knee of the driver. In this airbag 136A, moreover, the connection portions for connecting the peripheral walls mutually are arranged at a plurality of positions by the tethers 139. Therefore, the airbag 136A to be expanded and inflated is more easily formed in its entirety into the plate shape.

Especially in the airbag 136A of the fifth embodiment, unlike the third embodiment, the hard portion 7 (121) arranged in the column cover 108A and the hard portion 117 (118A and 122) arranged in the dashboard 110 are covered with the thick portions 143 of the airbag 136A, which has large thickness. Therefore, the knee K of the driver including the leg L, which would interfere with the hard portion 117 and the hard portion 7, is restrained by the thick portions 143 having high cushioning action of the airbag 136A so that the knee K of the driver is properly protected.

Like the airbag 136 of the fourth embodiment, of course, the airbag 136A is not thickened in its entirety but is made thicker only at the portions 143 to cover the hard portions 117 than at the remaining general portion 141 to cover the non-hard portion 25. In other words, the remaining general portion 141 can be thinned as much as possible. Therefore, this airbag 136A can make the capacity as small and compact as possible on completing the inflation so as to shorten the time period from the action start to the completion of the expansion and inflation. Moreover, the airbag 136A takes a compact shape also when housed. Because of this compact shape, the airbag 136A is easily expanded and inflated and arranged in the narrow space between the column cover 108A and the knee K.

In this airbag 136A, too, the thick portions 143 may cover not only the key cylinder 118A and the release lever 122 and the hard portions 117 exposed or protruded from the dashboard 110 but also the portions where the rigid parts are arranged in the dashboard 110 near the column cover 108A. Specifically, the airbag 136A may be constructed to cover not only the hard portion 7 of the column cover 108A or the hard portions 117 of the dashboard 110, as seen from the outside, but also the externally invisible hard area including the hard portions arranged inside of the column cover 108A and the dashboard 110, with the thick portions.

Here in the fourth and fifth embodiments, the tethers 139 for forming the thick portions 143 are arranged in the band shape in the longitudinal direction of the vehicle, but may also be arranged in the band shape in the transverse direction of the vehicle considering the flow of the inflating gas. As long as the thick portions 143 are formed, moreover, the number of tethers 139 may be adequately set to one or more.

In the fourth and fifth embodiments, on the other hand, the connection means for connecting the mutual peripheral walls partially to construct the thick portions 143 in the airbag 136 and 136A is exemplified by the tether 139 formed by sewing or adhering. However, a connection portion formed by adhering the column cover side wall portion 137 and the driver side wall portion 138 partially to connect the peripheral walls themselves of the airbags 136 and 136A may also be employed. Moreover, the airbags 136 and 136A may be hollow-woven to partially joint the peripheral walls opposed in the thickness direction.

Moreover, the airbags 136 and 136A of the fourth and fifth embodiments may also be so formed by using the joint portion 39 and 79, the tuck 49 or the length adjusting cloth 69, as shown in FIGS. 10 to 17, or by jointing solid cut materials as to extend along the column cover lower surface 108*a*.

Figure 35:
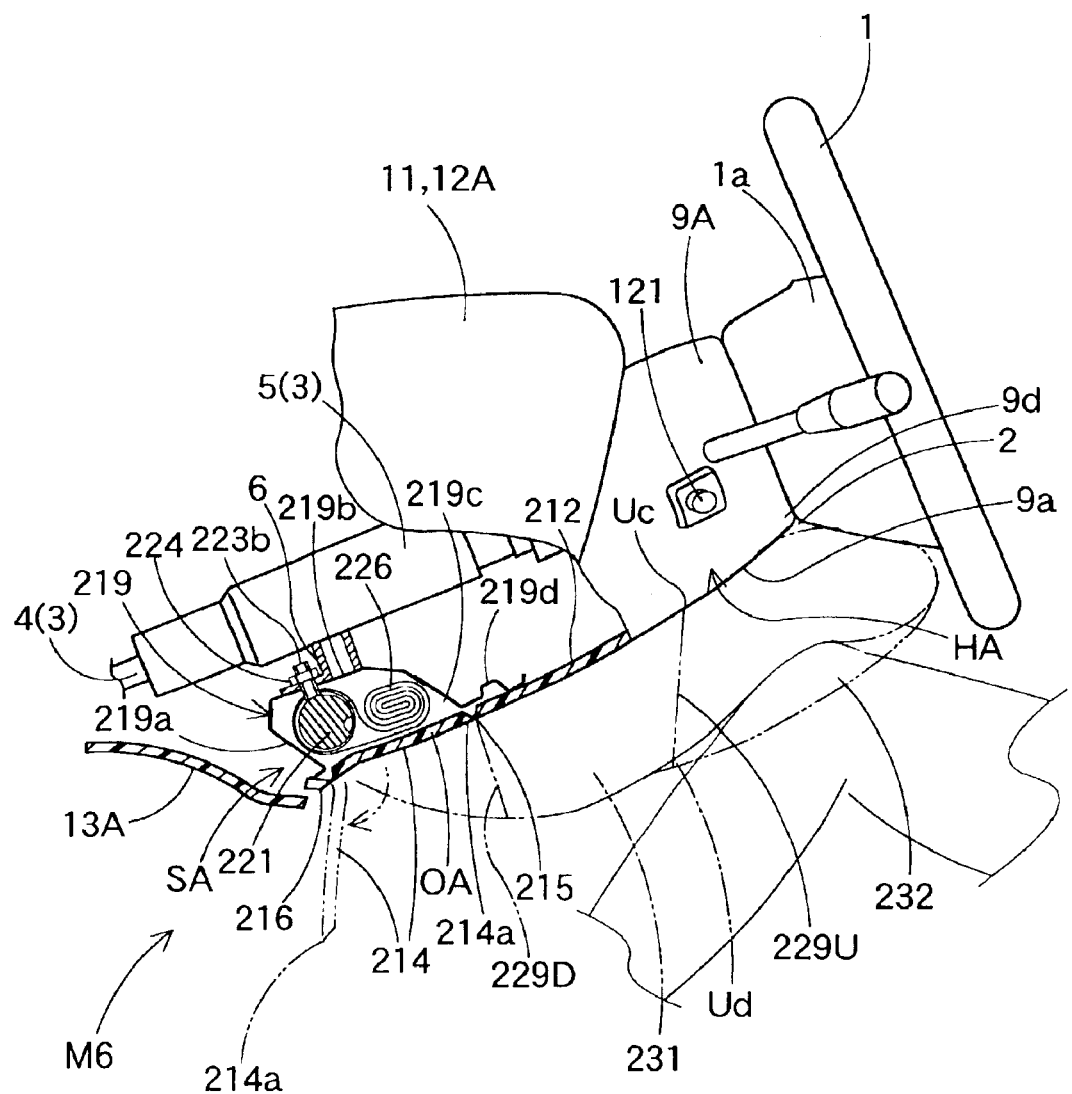
FIG. 35 is a sectional view showing an airbag device of a sixth embodiment in use.
Figure 36:
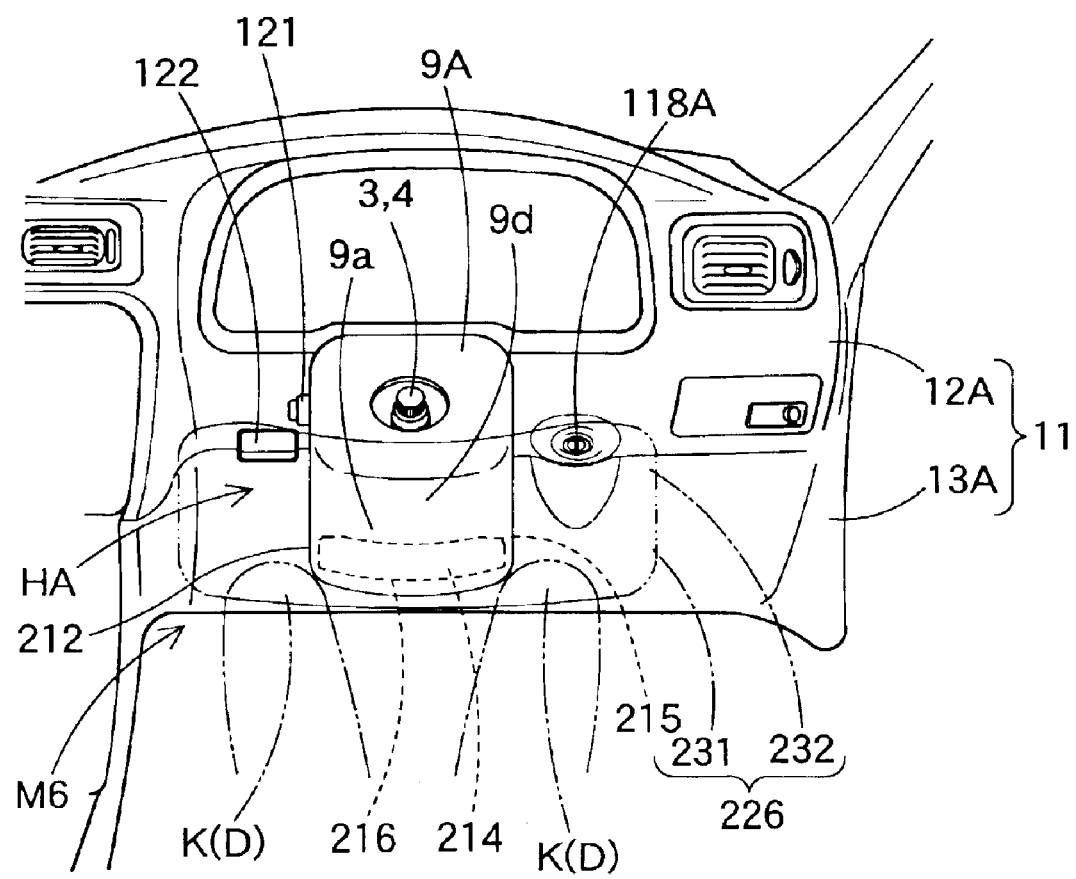
FIG. 36 is a front elevation of the vicinity of a column cover of the sixth embodiment.

Here will be described a knee protecting airbag device M6 of a sixth embodiment, as shown in FIGS. 35 and 36. Unlike the first to fifth embodiments in which the airbag device is arranged within the lower panel, the airbag device M6 is arranged within a column cover 9A below the steering column 3. The airbag device M6 is constructed to include: an airbag 226; an inflator 221; a case 219 for housing the airbag 226 and the inflator 221 therein; and an airbag cover 212.

The airbag cover 212 is formed integrally with the column cover 9A on the lower end side of the column cover 9A. In the airbag cover 212, there is arranged a door portion 214. This door portion 214 has such a breakable portion 215 therearound as has an inverted U-shape, as viewed from the inner side, and has a hinge portion 216 of an integral hinge on the lower end side thereof. Therefore, the door portion 214 is broken at the portion 215 and opened to turn its upper end 214*a* downward by the push of the airbag 226.

As in the first to fifth embodiments, moreover, the case 219 is connected and fixed to an immovable portion of the column tube 5 in the steering column 3 by using the bracket 6, the bolts 223*b* of the inflator 221, and nuts 224.

The case 219 is made of a sheet metal and is provided with a peripheral wall portion 219*a* of a generally rectangular cylinder shape, and a bottom wall portion 219*b* of a generally rectangular shape for closing the peripheral wall portion 219*a* at the upper front side of the vehicle. The peripheral wall portion 219*a* has an opening 219*c* on the lower rear side of the vehicle.

Figure 37:
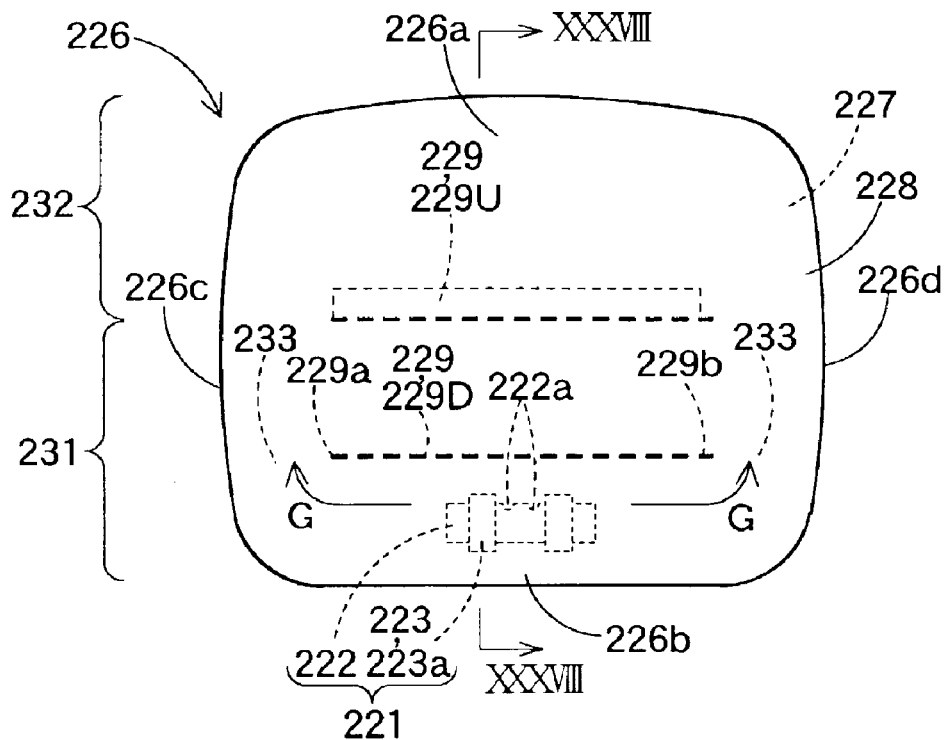
FIG. 37 is a top plan view of an airbag used in the sixth embodiment.
Figure 38:
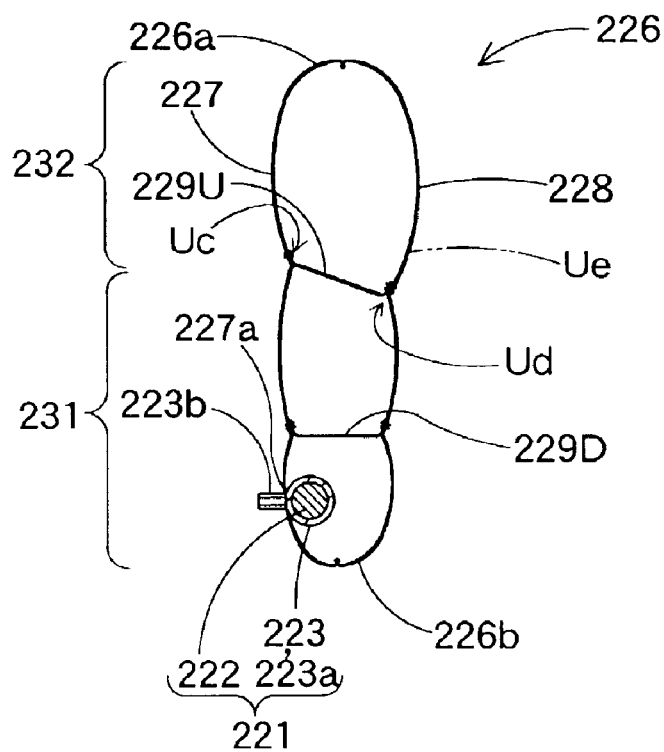
FIG. 38 is a sectional view of a portion XXXVIII—XXXVIII of FIG. 37.

As in the foregoing embodiments, the inflator 221 includes a cylinder type body 222 and two bracket portions 223 and 223, as shown in FIGS. 35, 37 and 38. The body 222 is provided with gas discharge ports 222*a* for discharging the inflating gas. Moreover, the body 222 acts simultaneously with a not-shown airbag device mounted on the steering wheel 1. Each bracket portion 223 is composed of a retaining ring 223*a* of a metal sheet capable of clamping the body 222, and the bolt 223*b* protruded from the retaining ring 223*a*. The inflator 221 is formed by assembling the bracket portions 223 and 223 with the body 222 and is housed in the case 219 while being enveloped in the airbag 226. Moreover, the inflator 221 is fastened and fixed to the case 219 by fastening the nuts 224 on to the individual bolts 223*b* protruded from the case 219. The not-shown lead wires are connected with the body 222.

The airbag 226 is formed of a flexible cloth of polyester, polyamide or the like. The airbag 226 takes, when completing the expansion and inflation, a generally rectangular plate shape capable of covering the lower surface 9*a* of the column cover 9A, as shown in FIGS. 35 to 38. Moreover, the airbag 226 is extended to both the left and right sides of the column cover 9A thereby to cover the lower surface side of the area from the vicinity of the lower portion of the upper panel 12A to the lower panel 13A.

In this airbag 226, moreover, the upper side is made thicker into a thick portion 232 for covering a hard area HA than the remaining general portion 231. In this hard area HA, there are arranged the key cylinder 118A, the tilt/telescopic control lever 121 and the parking brake release lever 122, all of which have hard parts or portions. The control lever 121 is arranged on the left side face of the column cover 9A. The key cylinder 118A is arranged in the vicinity of the boundary between the upper panel 12A and the lower panel 13A on the right side of the column cover 9A. The release lever 122 is arranged in the vicinity of the boundary between the upper panel 12A and the lower panel 13A on the left side of the column cover 9A.

On the other hand, the airbag 226 is constructed such that the peripheral wall includes an upper face side column cover side wall portion 227 and a lower face side driver side wall portion 228 opposed in the thickness direction to each other. On the side of the lower end 226*b* of the column cover side wall portion 227, there are formed through holes 227*a* for inserting the individual bolts 223*b* of the inflator 221 thereinto.

In the airbag 226, as shown in FIG. 38, there are arranged a plurality of (or two in the embodiment) tethers 229 which act as a connection means for connecting the column cover side wall portion 227 and the driver side wall portion 228 to each other so as to keep the thickness generally constant to retain the generally plate shape. The tethers 229 (229U and 229D) are formed of a flexible material like the airbag 226, of a band shape whose width is arranged in the thickness direction of the airbag 226. These tethers 229U and 229D are vertically arranged generally in parallel with the transverse direction of the vehicle.

Moreover, the connection portion Ud of the tether 229U of the upper side (or the rear side of the vehicle) to the driver side wall portion 228 is arranged on the lower side of the thick portion 232, as shown in FIG. 38. This connection portion Ud of the tether 229U with the driver side wall portion 228 is located on the lower side (or the upstream side of the inflating gas G, i.e., the side closer to the inflator 221) than a connection portion Uc of the tether 229U to the column cover side wall portion 227. Specifically, the connection portion Ud is arranged at a position to the inflator 221 and distant from the thick portion 232 with respect to such a position Ue on the side of the driver side wall portion 228 as is opposed to the connection portion Uc in the thickness direction of the airbag 226.

Figure 40:
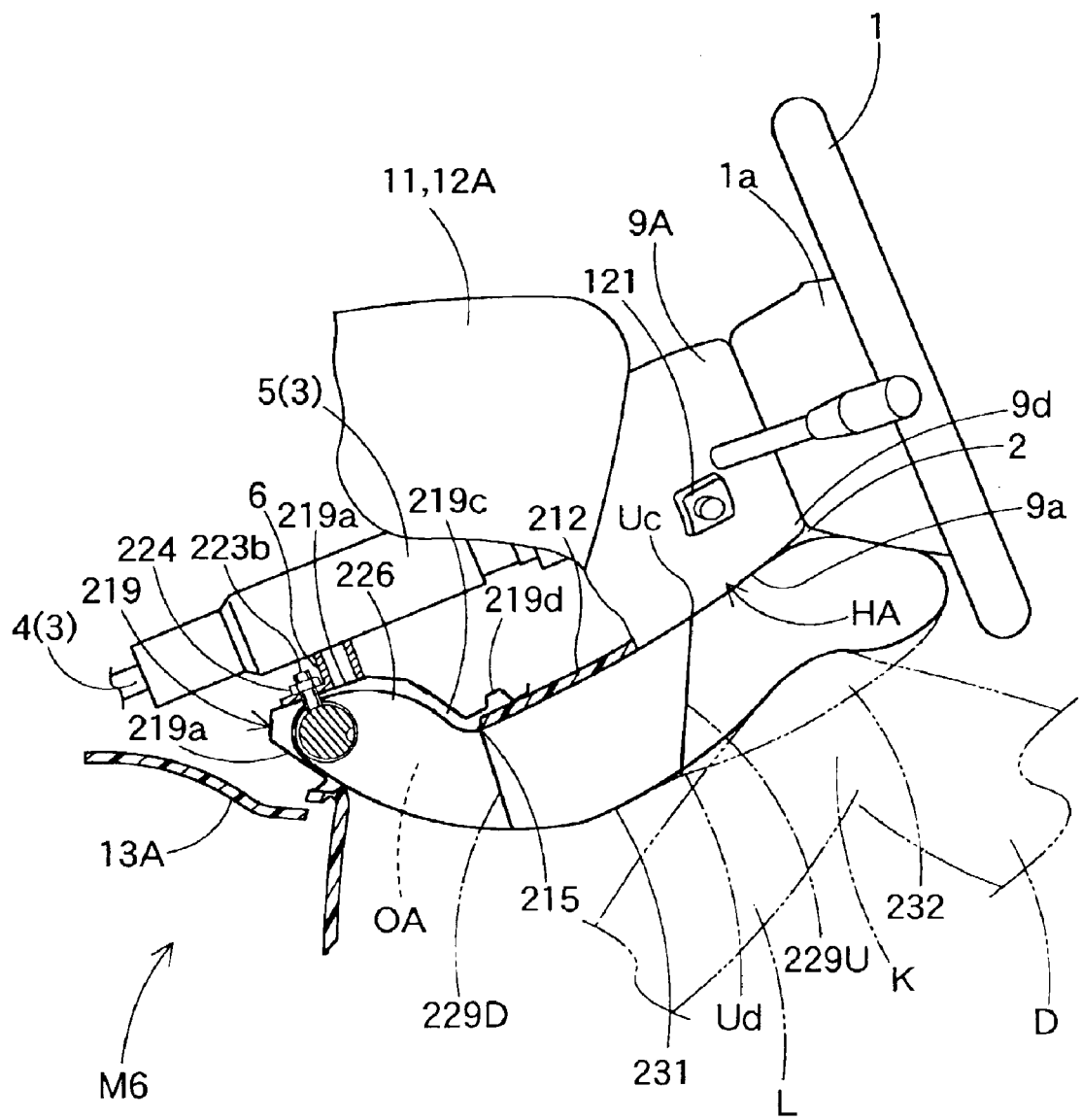
FIG. 40 is a schematic diagram showing the airbag of the sixth embodiment having completed the inflation.

At the expanding and inflating time of the airbag 226, therefore, the thick portion 232 arranged on the upper side of the tether 229U is set as thick as possible compared with the general portion 231 (as referred to FIG. 40). In the case of the embodiment, the general portion 231 is located below the tether 229U, and is constructed of the portion of the airbag 226 between the tethers 229U and 229D and the portion of the airbag 226 on the side of the inflator 221 below the tether 229D. Specifically, in the case of the embodiment, the general portion 231 is located in the upperstream side of the inflating gas G than the thick portion 232.

Here in the case of the embodiment, the capacity of the thick portion 232 is set such that the driver side wall portion 228 of the thick portion 232 may be arranged as a smooth curve from the lower side with no undulation before it interferes with the knee K even if the thick portion 232 come into a recess 2. Here, this recess 2 is formed upward from the vicinity of the rear end 9d of the column cover lower surface 9a to a lower cover 1a at the center of the steering wheel 1.

On the other hand, the tether 229D on the lower side is arranged in the airbag 226, as shown in FIG. 40, at a position where the airbag 226 releases at the expanding and inflating time from the airbag housing portion (or the case 219) to a free space on the inner side of the vehicle and at a position near the housing position.

Here, the tether 229D plays a role of the gas flow regulating member, too. Specifically, the tether 229D has its left and right end portions 229a and 229b arranged apart from the left and right edges 226c and 226d of the airbag 226. Therefore, gas communication holes 233 and 233 are arranged individually between the end portions 229a and 229b and the edges 226c and 226d. Thus, the inflating gas G flows leftward and rightward while being regulated by the tether 229D, and then flows to the upper side through the gas communication holes 233 and 233.

Here will be described how to mount the airbag device M6 of the sixth embodiment on the vehicle. First of all, the airbag 226 is folded up while housing the inflator 221 therein. Here, the individual bolts 223b of the inflator 221 are protruded from the through holes 227a. Moreover, the not-shown lead wires extending from the inflator body 222 are led out from the predetermined not-shown insertion holes of the airbag 226.

Figure 39:
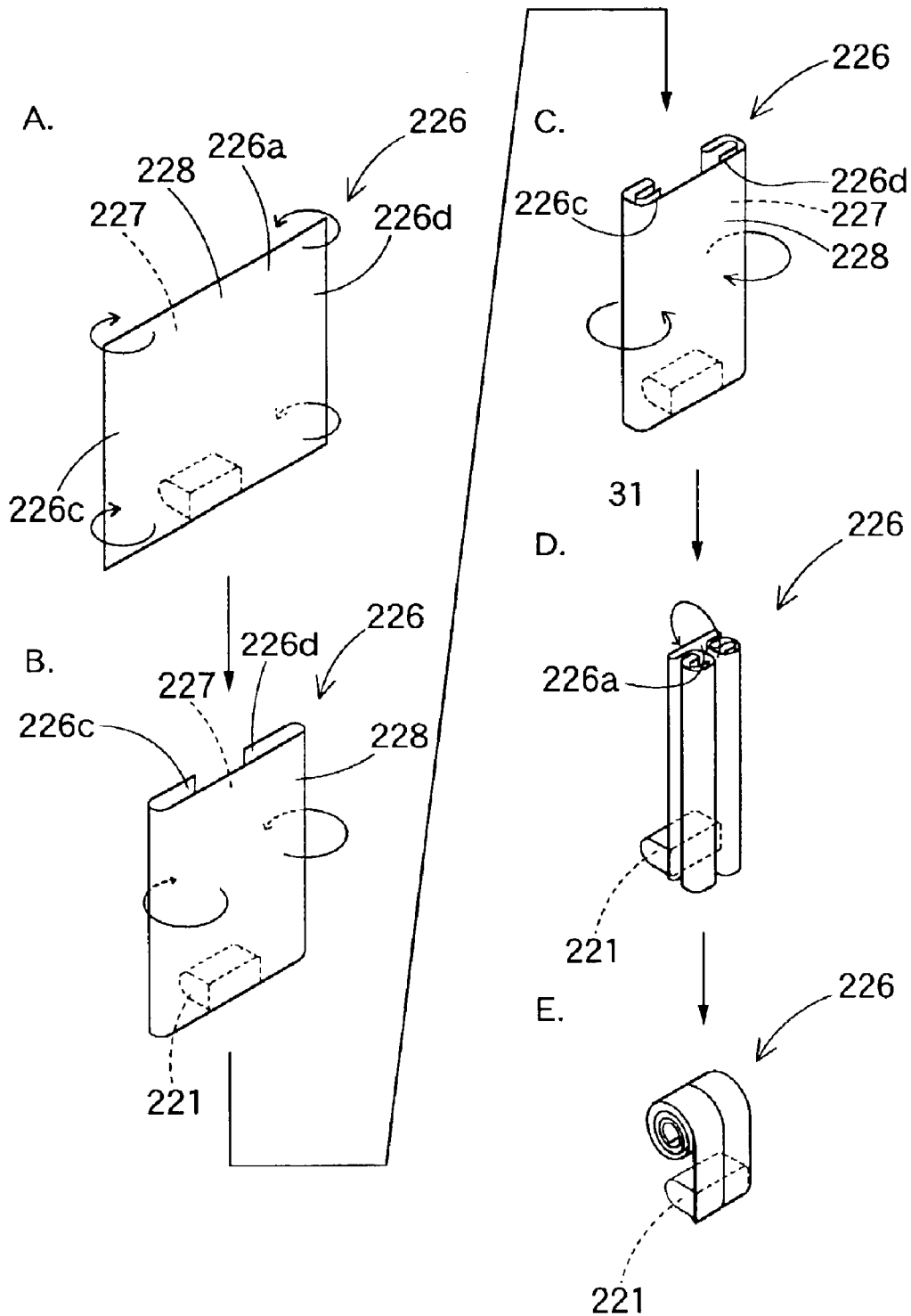
FIG. 39 presents schematic diagrams showing how to fold the airbag of the sixth embodiment.

Moreover, the airbag 226 is folded up, as in the foregoing embodiments, through a longitudinal folding step and a subsequent transverse folding step, as will be described hereinafter. In the longitudinal folding step, the column cover side wall portion 227 and the driver side wall portion 228 are expanded flat at first while being overlapped, as shown in FIG. 39A. Then, both left and right edges 226c and 226d are folded in a bellows shape to the side of the column cover side wall portion 227, as shown in FIGS. 39B and 39C. After this, the folded portions are folded back and placed on the driver side wall portion 228 on the rear side of the vehicle so that the width may become substantially equal to the transverse width of the case 219, as shown in FIG. 39D. Thus, the longitudinal folding step is completed.

In the transverse folding step, as shown in FIG. 39E, the airbag 226 is folded by rolling from an upper end 226a and rolled on the side of the column cover side wall portion 227. Thus, the transverse folding step is completed.

After folded, the airbag 226 is wrapped in a not-shown breakable wrapping film, and the individual bolts 223b are protruded from the wrapping film. Then, the airbag 226 and the inflator 221 are housed in the case 219, and the individual bolts 223b are protruded from the case 219 so that not-shown spring nuts are attached to the individual bolts 223b protruded. As a result, there is formed the airbag assembly SA which is made by assembling the airbag 226, the inflator 221 and the case 219 integrally.

Here, the not-shown lead wires extending from the inflator body 222 are led out from the wrapping film and the not-shown through holes of the case 219.

Moreover, the airbag assembly SA can be mounted on the vehicle if it is connected to the bracket 6 by using the nuts 224. Here, the not-shown lead wires are connected with the control circuit. Moreover, the airbag device M6 can be mounted on the vehicle if the column cover 9A is mounted on the vehicle.

If a predetermined electric signal is inputted to the inflator body 222 after the airbag device M6 was mounted on the vehicle, moreover, the inflating gas is discharged from the gas discharge ports 222a. Then, the airbag 226 is inflated to break the not-shown wrapping film and to push and open the door portion 214 of the airbag cover 212 so that it is expanded and inflated while rising along the column cover lower surface 9a. As shown in FIG. 40, moreover, the airbag 226 expanded and inflated protects the knee K of the driver D from the hard area HA.

In this airbag device M6 of the sixth embodiment, the airbag 226 having completed the expansion and inflation covers not only the side of the lower surface 9a of the column cover 9A but also the hard area HA with the thick portion 232. Therefore, the knee K of the driver D, which would otherwise interfere with the hard area HA, is retrained by the thick portion 232 of the airbag 226 having high cushioning action, so that the airbag 226 protects the knee K of the driver D properly. Naturally, the airbag 226 covers at least the side of the lower surface 9a of the column cover 9A protruded to the side of the driver D, so that it can also protect the knee K of the driver D from the column cover 9A.

Moreover, the airbag 226 is not made thick all over the area but is made thicker only at the thick portion 232 for covering the hard area HA than the remaining general portion 231. Therefore, the airbag 226 can make the capacity as small and compact as possible at the inflation completed time thereby to shorten the time period from the action start to the completion of the expansion and inflation. Moreover, the airbag 226 makes the housed shape compact. Therefore, the minimum capacity of the airbag 226 of this construction helps arrange the expanded and inflated airbag 226 easily in the narrow space between the column cover 9A and the knee K. At the expansion and inflation time, still moreover, since the airbag 226 rises along the column cover lower surface 9a, it goes more smoothly into the clearance between the knee K of the driver and the column cover lower surface 9a.

Moreover, this airbag 226 is also formed into a generally plate shape when it completes the inflation. Even if the knee K of the driver D is brought close to the column cover 9A when the driver D depresses the brake pedal, therefore, the airbag 226 being expanded and inflated is smoothly arranged in the narrow space between the knee K of the driver D and the column cover lower surface 9a. In this airbag 226, too, the column cover side wall portion 227 and the driver side wall portion 228, as opposed in the thickness direction, are partially connected to each other. Therefore, the airbag 226 can retain the generally plate shape easily when it completes the inflation. Moreover, the airbag 226 can be easily provided with the portions 231 and 232 of different thicknesses and can position the thick portion 232 easily.

In this airbag 226, too, the wall portions 227 and 228 are connected at more than one portions by the tethers 229 so that the generally plate shape of the entire airbag 226 having completed the expansion and inflation is easily retained.

In the airbag 226 of the sixth embodiment, still moreover, the tether 229U near the thick portion 232 arranges the connection portion Ud to the driver side wall portion 228 at a longer distance from the thick portion 232 than such a position Ue on the side of the driver side wall portion 228 as is opposed in the thickness direction of the airbag 226 to the connection portion Uc to the column cover side wall portion 228. In the expanded thick portion 232, therefore, the wall portion 228 on the driver's side is likely to inflate more than the wall portion 227 on the column cover. As a result, this airbag 226 can easily enlarge the capacity and thickness of the thick portion 232, even if the tether 229U is arranged near the thick portion 232.

In this airbag 226, moreover, the thick portion 232 is arranged closer to the side of the upper end 226a or the downstream side of the inflating gas G than the general portion 231. In the course of the expansion and inflation, therefore, the inflow of the inflating gas G to the thick portion 232 is low, although the thick portion 232 would result in becoming thicker than the general portion 231 when completing the inflation. In this airbag 226, therefore, the thick portion 232 is smoothly arranged, before it completes the expansion and inflation, between the knee K of the driver D and the hard area HA, and then is inflated.

Here in the airbag 226 having completed the expansion and inflation, the general portion 231 to be arranged in front of the leg L below the knee of the driver D is regulated in the thickness by the tethers 229U and 229D. Therefore, the airbag 226 having completed the expansion and inflation does not press the leg L more than necessary.

In the sixth embodiment, the axial direction of the peripheral wall portion 219a of the case 219 to the side of the opening 219c is oriented obliquely downward to the back, not along the steering column 3 or the column cover lower surface 9a. At the initial stage of the expansion and inflation of the airbag 226, therefore, the rolled portion is liable to protrude obliquely downward with respect to the generally horizontal direction to the rear side of the vehicle.

However, the door portion 214 of the airbag cover 212 is opened downward from the side of the upper end 214a when opened by the push of the airbag 226 being expanded and inflated. Therefore, the airbag 226 being expanded and inflated is protruded at the initial opening stage of the door portion 214 from the upper side (or the rear side of the vehicle) of the open area OA of the door portion 214. In other words, the airbag 226 being expanded and inflated is easily protruded upward. In the transverse folding step, moreover, the airbag 226 itself is folded to roll the upper end 226a to the side of the column cover side wall portion 227. Therefore, the airbag 226 rises smoothly along the column cover lower surface 9a as it is unrolled in the subsequent expanded and inflated course. In the subsequent expanded and inflated course, therefore, the airbag 226 goes smoothly into the narrow space between the knee K of the driver D and the column cover lower surface 9a.

Figure 41:
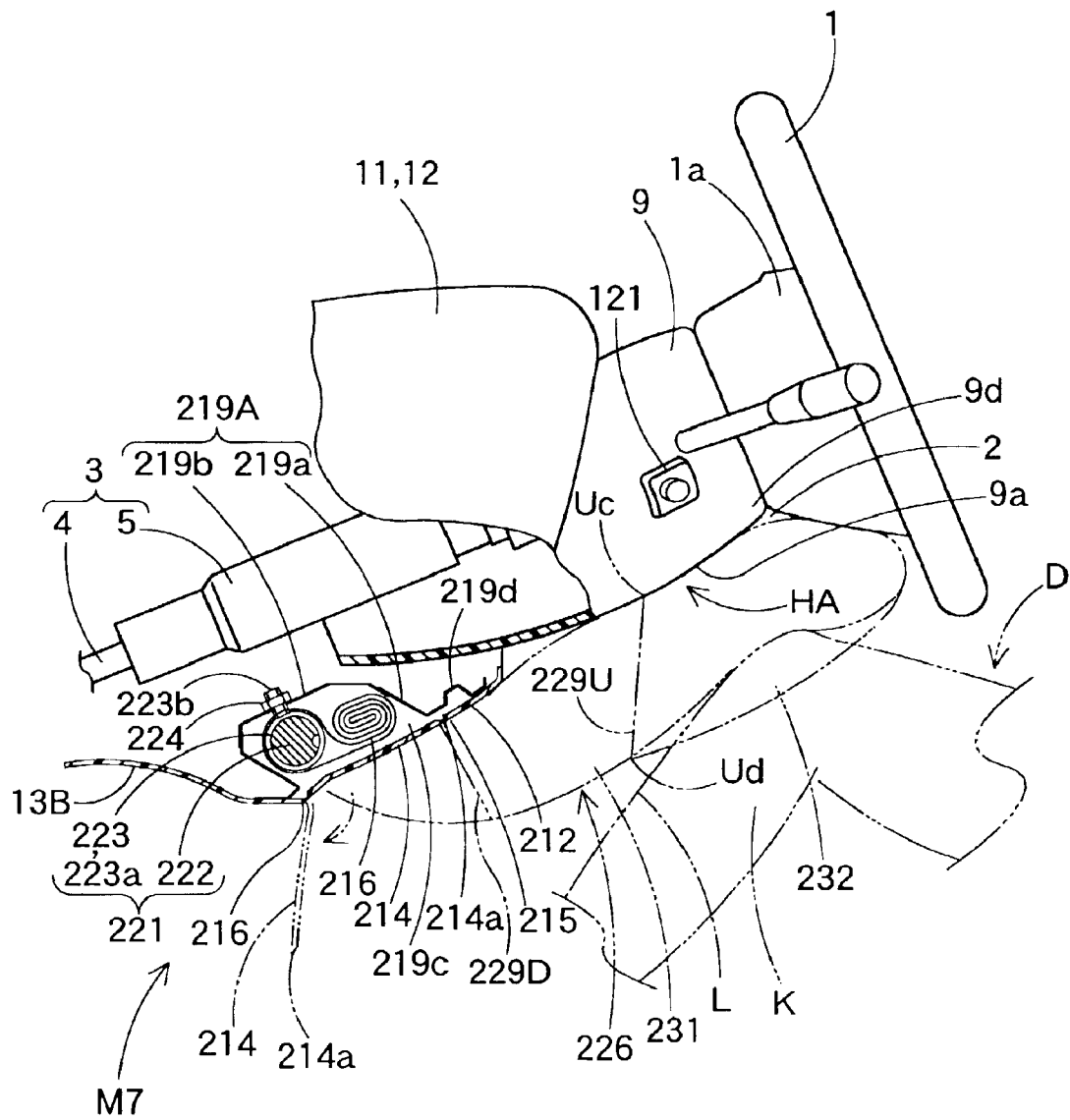
FIG. 41 is a sectional view showing an airbag device of a seventh embodiment in use.
Figure 42:
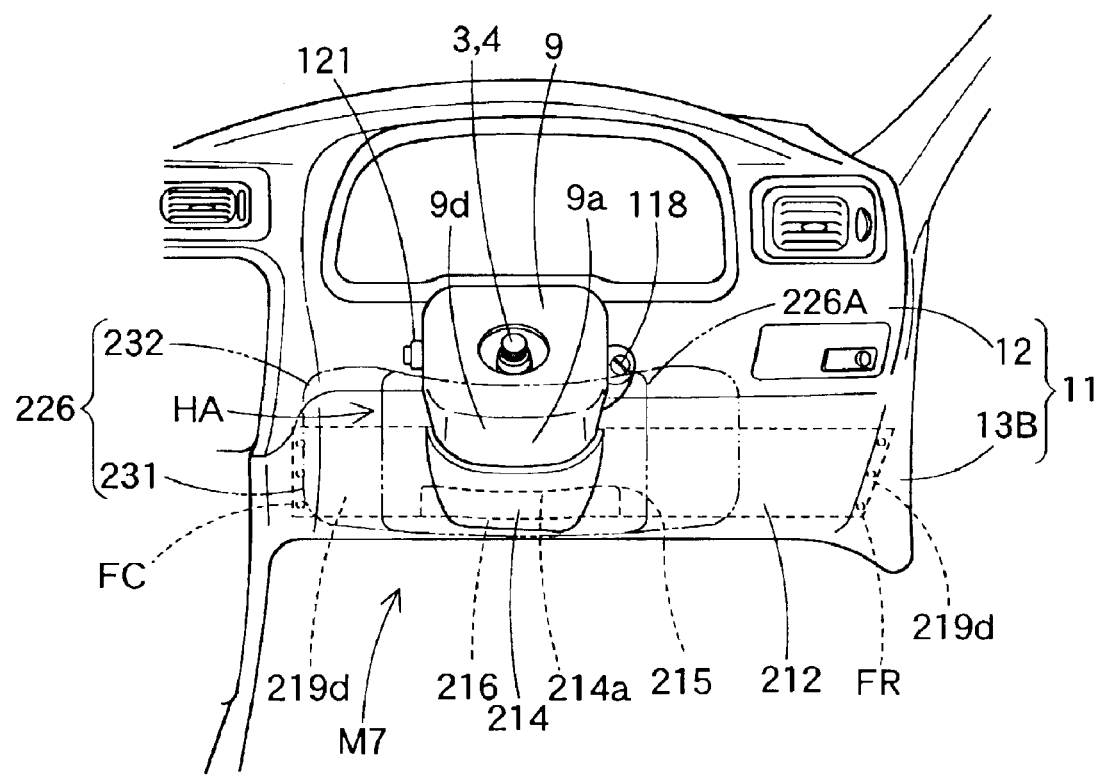
FIG. 42 is a front elevation of the vicinity of a column cover of the seventh embodiment.

The sixth embodiment has been described on the case in which the airbag device M6 is arranged within the column cover 9A. However, it may be arranged within a lower panel 13B, as a knee protecting airbag device M7 shown in FIGS. 41 and 42.

The knee protecting airbag device M7 of the seventh embodiment is different from the sixth embodiment in the following points. First of all, a case 219A is formed by extending a flange portion 219d arranged in the peripheral edge of the opening 219c, in the transverse direction. This flange portion 219d is fixed on the frame portions FC and FR of the vehicle by means of bolts. These frame portions FC and FR are arranged on both the left and right sides of the steering column 3.

In this airbag device M7, moreover, the airbag cover 212 to cover the case opening 219b is formed in the lower panel 13B itself.

In this airbag device M7, moreover, the hard area HA is arranged on the upper side of the column cover 9. In the hard area HA, more specifically, there are arranged the key cylinder 118 and tilt/telescopic mechanism control lever 121 which have hard parts and/or members. The key cylinder 118 is arranged on the right side face of the column cover 9, and the control lever 121 is arranged on the left side face of the column cover 9.

This airbag device M7 is different only in the aforementioned points and is similar in the remaining parts and structures to the sixth embodiment. The identical portions are designated by the common reference numerals. Moreover, this airbag device M7 makes actions similar to those of the sixth embodiment thereby to provide the working-effects similar to those of the sixth embodiment.

Here in the seventh embodiment, there may be employed an airbag 226A (as referred to triple-dotted lines of FIG. 42) with reduced transverse size from the airbag 226. What is done on this airbag 226A is to reduce the transverse size of the airbag 226, and the airbag 226A is provided therein with the tethers 229U and 229D as the airbag 226. The airbag 226A is constructed to cover the hard area HA arranged only in the column cover 9 with the thick portion 232 and to cover only the side of the column cover lower surface 9a. Naturally, this airbag 226A can be used in the case where the airbag device M6 of the sixth embodiment is arranged within the column cover 9 shown in FIG. 42. On the contrary, the airbag device M7 of the seventh embodiment may be mounted in the vehicle in which the key cylinder 118A or the like is arranged in the dashboard 11 shown in FIG. 36.

Figure 43:
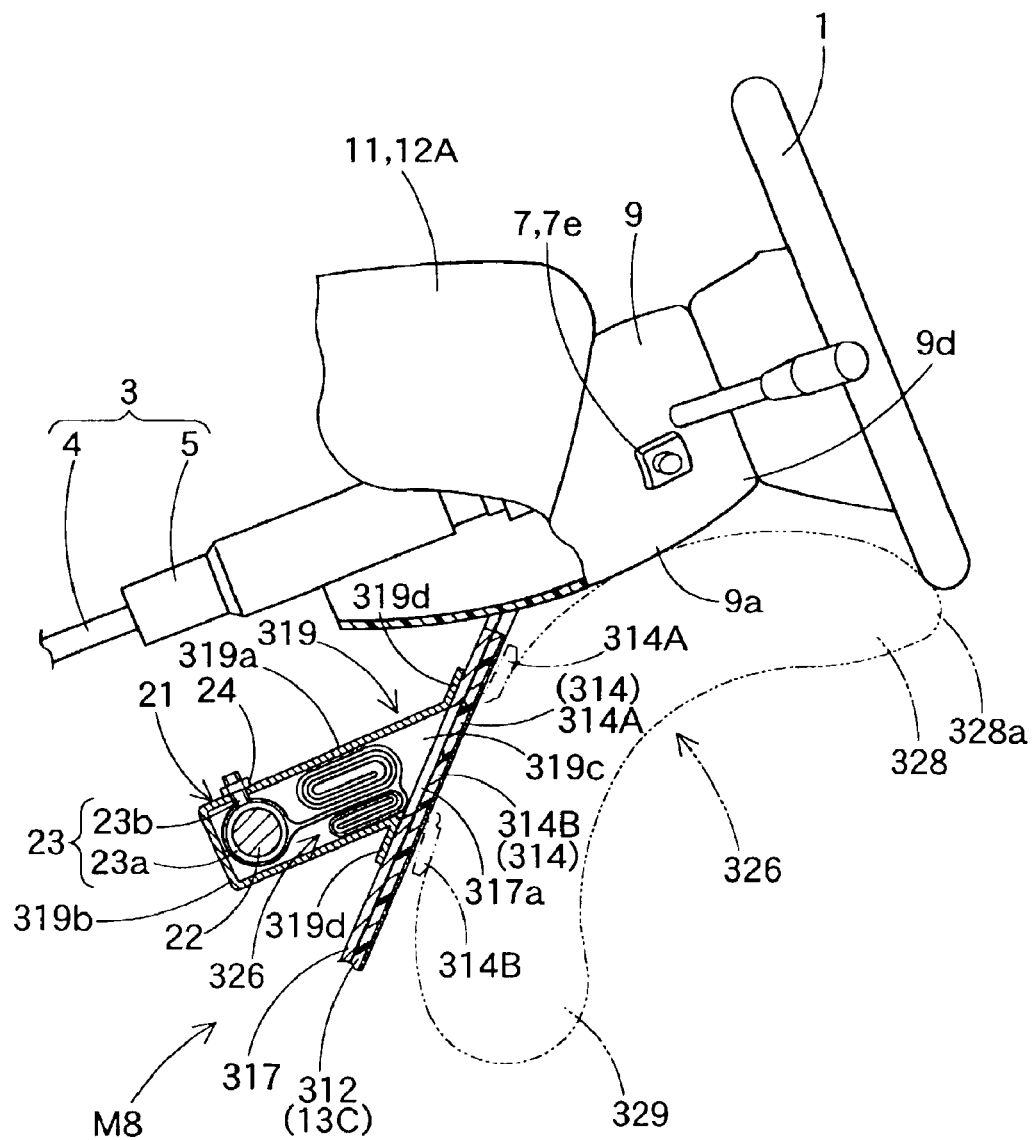
FIG. 43 is a sectional view showing an airbag device of an eighth embodiment in use.
Figure 44:
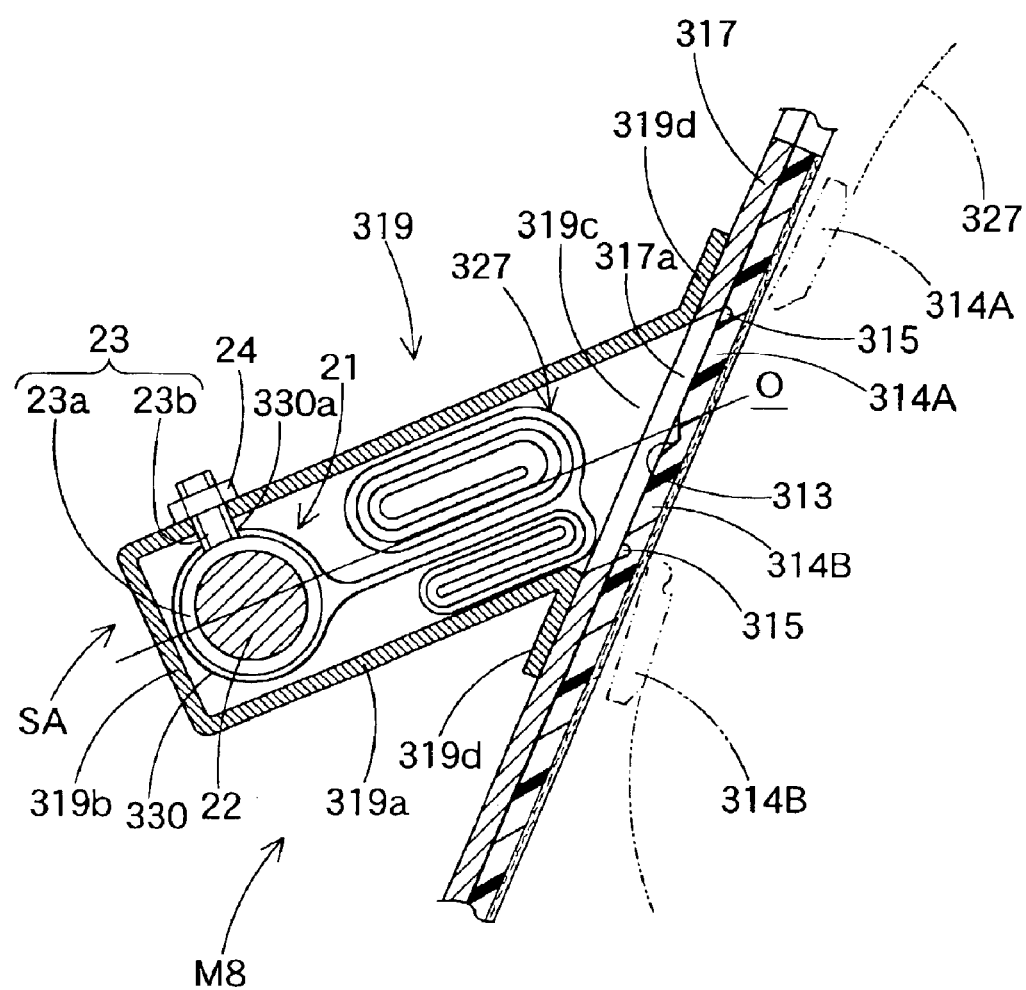
FIG. 44 is an enlarged sectional view of the airbag device of the eighth embodiment.

Here will be described a knee protecting airbag device M8 of an eighth embodiment shown in FIGS. 43 to 45. This airbag device M8 is held on a holding plate 317 which acts as a holding member arranged below the column cover 9. The airbag device M8 is constructed to include: an airbag 326 housed below the steering column 3; the inflator 21 for feeding the inflating gas to the airbag 326; and a case 319 for housing the airbag 326 and the inflator 21 therein. Moreover, the airbag device M8 is so mounted on the holding plate 317 as arranges the case 319 on the vehicle's front side of the holding plate 317.

The case 319 is made of a sheet metal and is provided with a peripheral wall portion 319a of a generally rectangular cylinder shape, and a bottom wall portion 319b of a generally rectangular shape for closing the peripheral wall portion 319a on the front side of the vehicle. In the case 319, moreover, a flange portion 319d formed on the peripheral edge of an opening 319c of the peripheral wall portion 319a is mounted and fixed on the holding plate 317 by means of bolts or the like.

Figure 45:
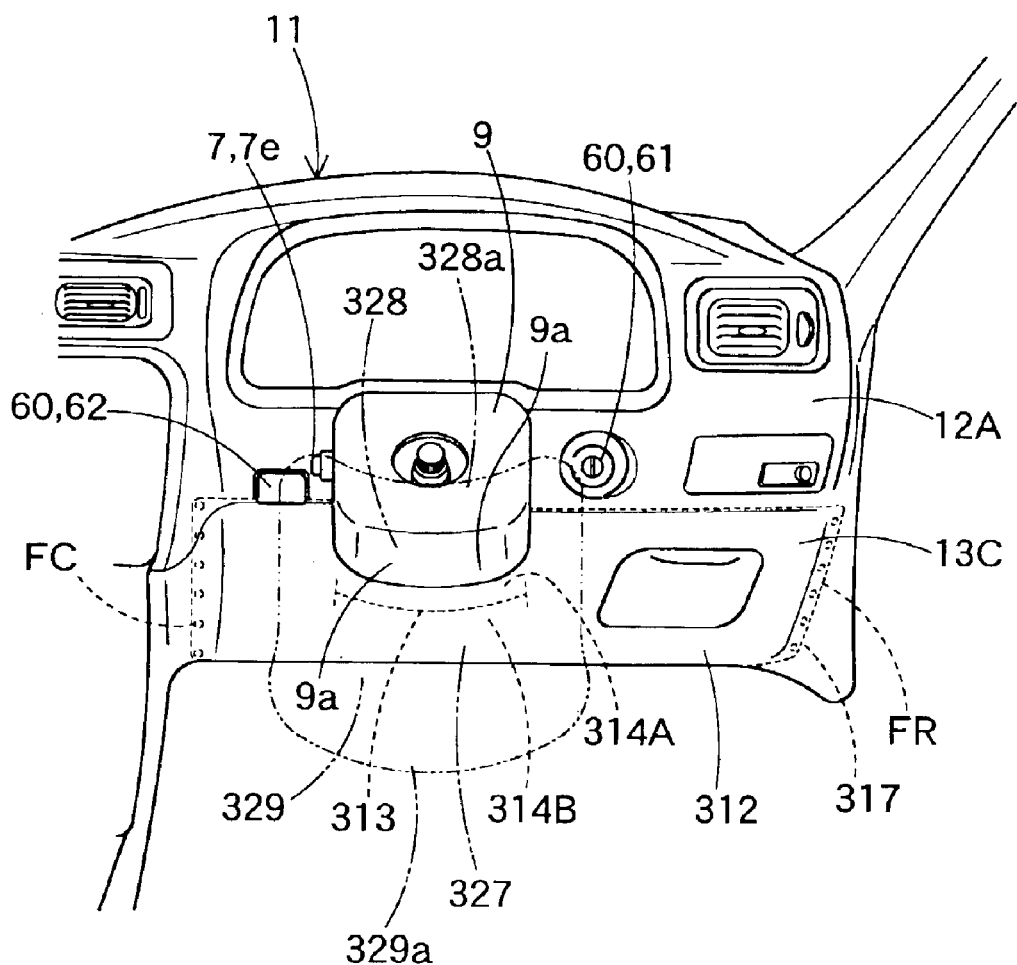
FIG. 45 is a front elevation of the vicinity of a column cover of the eighth embodiment.

The holding plate 317 is made of a sheet metal and is arranged below the column cover 9, as shown in FIG. 45. Moreover, the holding plate 317 is fixed on the individual frame portions FC and FR of the vehicle arranged on the left and right side thereof, by means of bolts. More specifically, the holding plate 317 is arranged on the lower side of the dashboard 11 for covering the column cover 9, as shown in FIGS. 43 to 45. Moreover, the holding plate 317 is covered on its vehicular inner side with a lower panel 13C on the lower side of the dashboard 11. The lower panel 13C plays a role of an airbag cover 312, too. In the holding plate 317, there is formed an opening 317a to communicate with the opening 319c of the case 319.

The airbag cover 312 is provided with door portions 314 (314A and 314B) of generally rectangular plate shape, which are opened into the vehicle compartment by the push of the airbag 326 being expanded and inflated. These door portions 314 are formed integrally with the airbag cover 312 and are provided therearound with a thinned portion 313 to be broken, as shown in FIGS. 44 and 45. This portion 313 is formed generally into an H-shape, as seen from the inner side of the vehicle. Of the door portions 314, the door portion 314A on the upper side of the vehicle has a hinge portion 315 arranged on the upper edge side, and the door portion 314B on the lower side of the vehicle has a hinge portion 315 arranged on the lower edge side. Moreover, the individual door portions 314A and 314B are opened upward and downward of the vehicle, respectively. Here, the door portions 314A and 314B are vertically opened in the embodiment but may be modified to be transversely opened. Alternatively, the door portion may be composed of a single piece by arranging the portion 315 in an inverted U-shape, as seen from the inner side of the vehicle.

Figure 46:
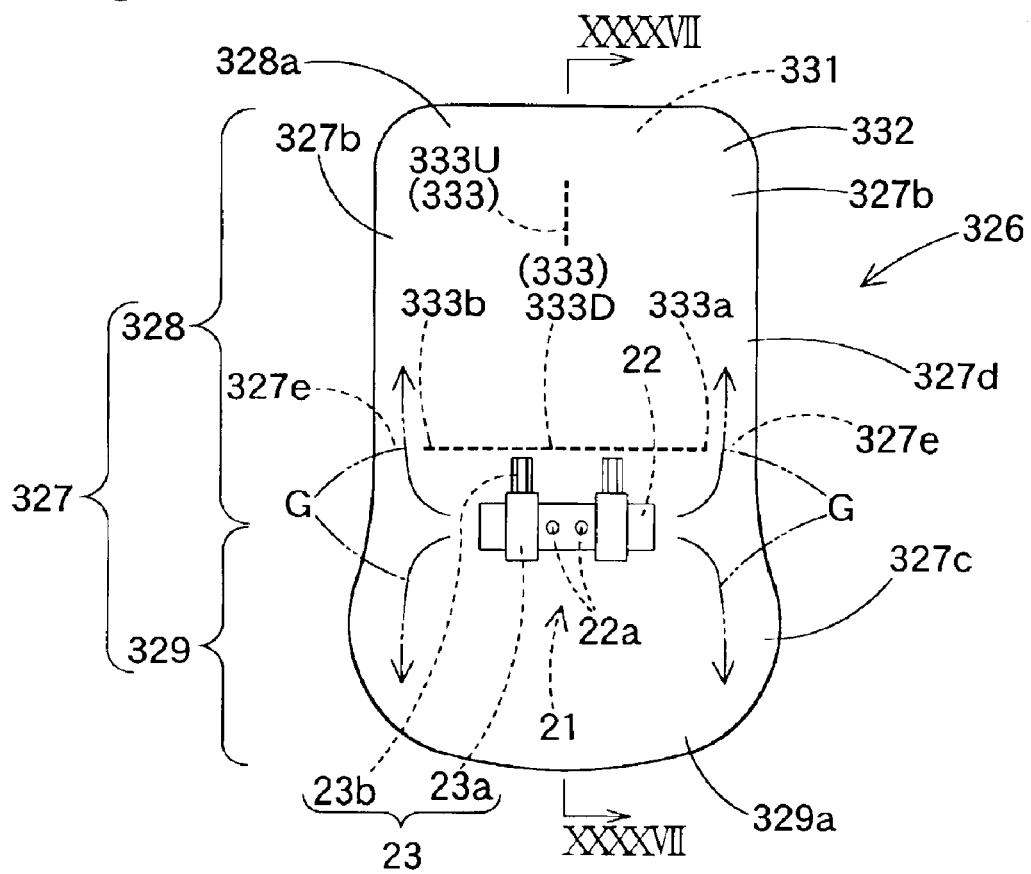
FIG. 46 is a top plan view of an airbag used in the eighth embodiment.
Figure 47:
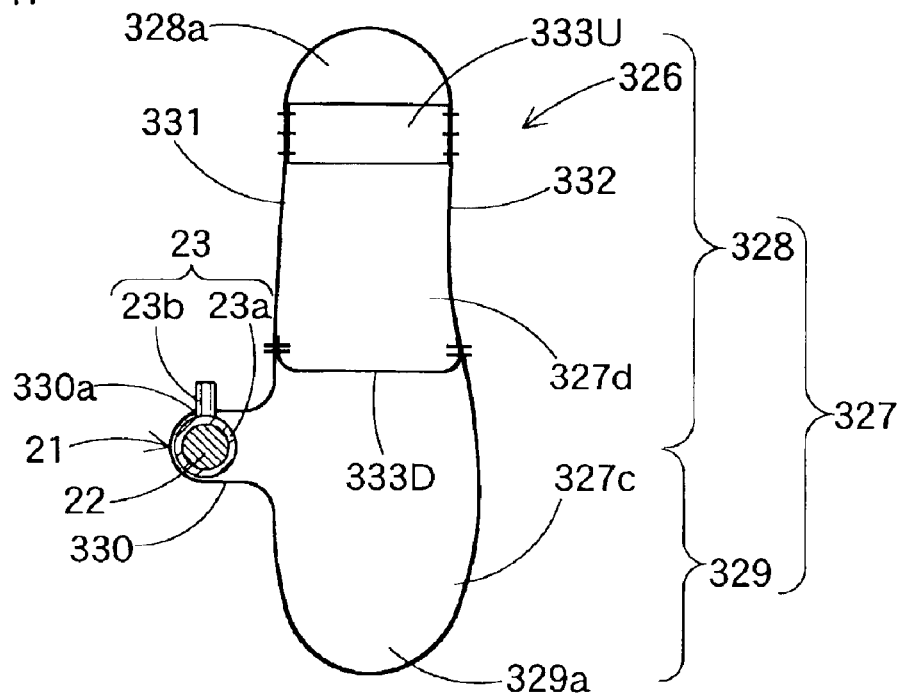
FIG. 47 is a sectional view of a portion XXXXVII—XXXXVII of FIG. 46.

The airbag 326 is formed of a flexible cloth of polyester, polyamide or the like. Moreover, this airbag 326 is equipped with a column cover side wall portion 331 and a driver side wall portion 332, as shown in FIGS. 46 and 47 and takes, when completing the expansion and inflation, a generally rectangular plate shape extending in the vertical direction. On the lower side of the column cover side wall portion 331, there is arranged a mounting portion 330 for housing and mounting the inflator 21. At the time of the expansion and inflation of the airbag 326, the mounting portion 330 is to be left in the case 319, and the body portion 327 of the airbag 326 other than the mounting portion 330 is to protrude from the case 319 of the housing portion. In the mounting portion 330, there are formed through holes 330a for inserting the bolts 23b of the inflator 21 thereinto.

In the case of the eighth embodiment, moreover, this body portion 327 is constructed to include an upper portion 328 and a lower portion 329. The upper portion 328 is so expanded upward as to cover from the case 319 acting as the housing portion to the side of the lower surface 9a of the column cover 9, thereby to protect the area from the upper side of the knee to the vicinity of the thigh of the driver D. The lower portion 329 is so expanded downward as to cover from the case 319 acting as the housing portion to the inner side of the airbag cover 312 thereby to protect the area from the lower side of the knee to the vicinity of the leg of the driver D. Here, the upper portion 328 of the airbag 326 covers, at the time of completion of the expansion and inflation, the area from the peripheral edge of the opening 317a of the holding plate 317 to the vicinity of the upper end (or rear end) 9d of the lower surface 9a of the column cover 9. The upper portion 328 also covers the lower side of the tilt/telescopic mechanism control lever 7e as the hard portion 7, as arranged on the left side face of the column cover 9. Moreover, the left and right portions near the upper end 328a of the airbag 326 covers the lower portions of the key cylinder 61 and the parking brake release lever 62 as the hard portion 60 arranged in the dashboard 11. This airbag 326 is rolled individually at the upper portion 328 and the lower portion 329, as shown in FIGS. 43 and 44, and is housed in the case 319.

In the upper portion 328, as shown in FIGS. 46 and 47, there are arranged a plurality of tethers 333 which act as connection means for connecting the column cover side wall portion 331 and the driver side wall portion 332 to each other so as to keep the thickness constant at the time of the expansion and inflation. In the case of the embodiment, the airbag 326 is provided with two tethers 333D and 333U. These tethers 333D and 333U are arranged to keep the thickness of the upper portion 328 constant at the time of the expansion and inflation so that the upper portion 328 being expanded and inflated may go smoothly into the clearance between the knee K of the driver D and the column cover lower surface 9a. The tether 333U is arranged from the center of the upper portion 328 to the vicinity of the upper end 328a and generally at the transverse center and extends vertically to the vehicle.

The tether 333D is arranged near the mounting portion 330 in the upper portion 328 and generally in parallel with the transverse direction of the vehicle. This tether 333D plays a role to partition the inner space of the body portion 327 of the airbag 326 into an upstream portion 327c and a downstream portion 327d of the inflating gas G. Specifically, the tether 333D divides the body portion 327 into the upstream portion 327c on the lower side and the downstream portion 327d on the upper side. Moreover, the tether 333D plays a role of the gas flow regulating member. Specifically, the left and right end portions 333a and 333b of the tether 333D are arranged apart from the left and right edges 327a and 327b of the body portion 327. Therefore, gas communication holes 327e and 327e are formed individually between the end portions 333a and 333b and the edges 327a and 327b. Thus, the inflating gas G is so regulated by the tether 333D as to flow to the left and right sides in the upstream portion 327c and then flows through the gas communication holes 327e and 327e to the downstream portion 327d. Moreover, the tether 333D is arranged in the body portion 327 of the airbag 326 at such a position as leaves the airbag housed portion (or the case 319) for the free space of the vehicle compartment at the time of expansion and inflation, but near the housed portion.

Here will be described how to mount the airbag device M8 on the vehicle. First of all, the airbag 326 is folded up while housing the inflator 21 therein. Here, the bolts 23b of the inflator 21 are individually protruded from the through holes 330a. Moreover, not-shown lead wires extending from the body 22 are led out from predetermined not-shown insertion holes of the airbag 326.

Figure 48:
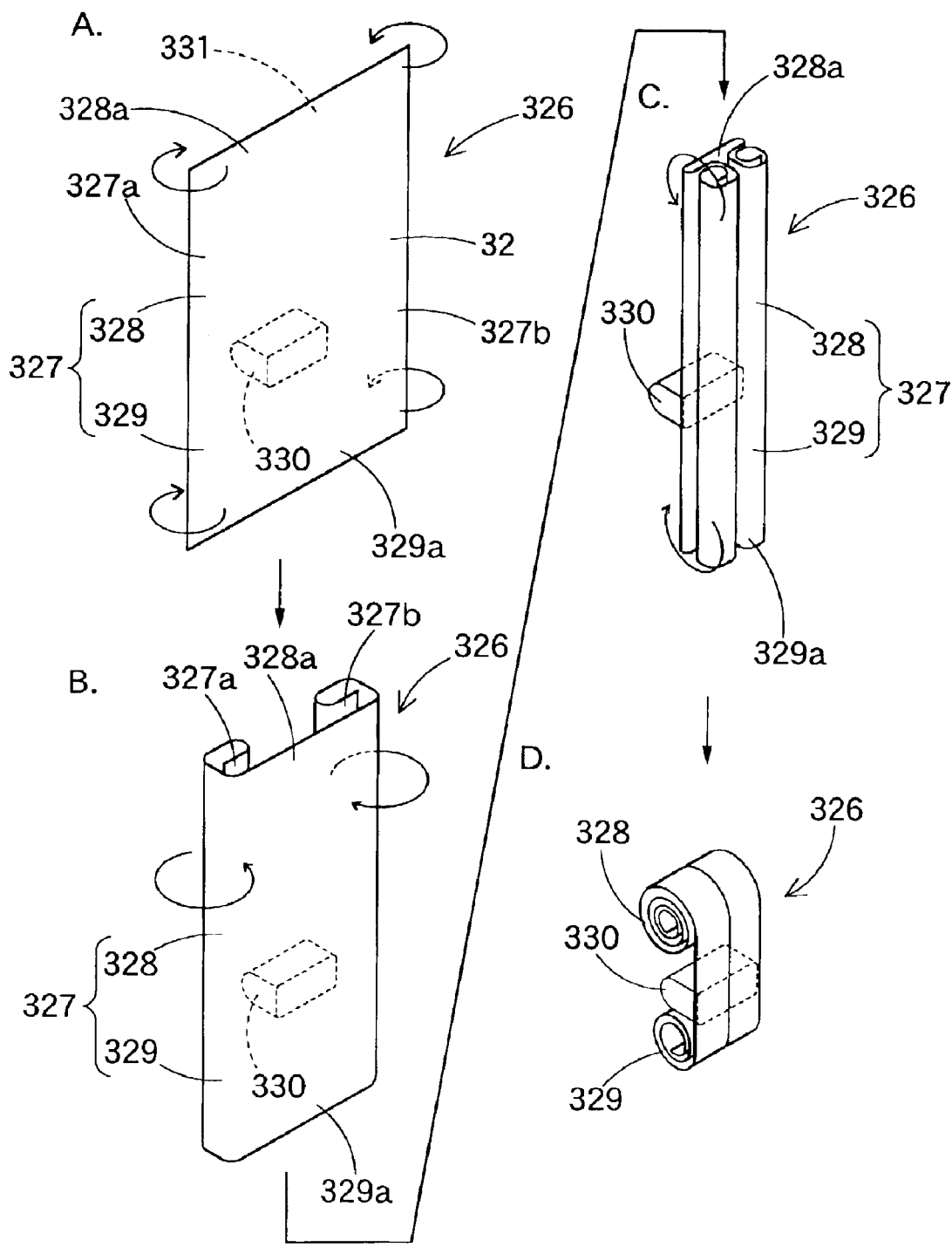
FIG. 48 presents schematic diagrams showing how to fold the airbag of the eighth embodiment.

The airbag 326 is folded up through a longitudinal folding step and a subsequent transverse folding step. At the longitudinal folding step, the column cover side wall portion 331 and the driver side wall portion 332 are expanded flat at first while being overlapped, as shown in FIG. 48A. Then, both the left and right edges 327a and 327b are folded in a rolled shape to the side of the column cover side wall portion 331, as shown in FIG. 48B. After this, the rolled portions are placed on the driver side wall portion 332 on the rear side of the vehicle and are folded up to a width substantially equal to the transverse width of the case 319, as shown in FIG. 48C. Thus, the longitudinal folding step is completed.

At the transverse folding step, as shown in FIG. 48D, the upper portion 328 is folded from the upper end 328a in a rolling manner on the side of the column cover side wall portion 331, and the lower portion 329 is folded from the lower end 329a in a rolling manner on the side of the column cover side wall portion 331. Thus, the transverse folding step is completed.

After folded, the airbag 326 is wrapped in a not-shown breakable wrapping film, and the individual bolts 23b are protruded through the wrapping film from the case 319. Then, the nuts 24 are fastened on the protruded individual bolts 23b to house the airbag 326 and the inflator 21 in the case 319, thereby to make the airbag assembly SA. Here, the not-shown lead wires extending from the inflator body 22 are led out from the wrapping film and not-shown through holes of the case 319.

Then, the airbag assembly SA is fixed on the holding plate 317 by using the flange portion 319d. After this, both the transverse ends of the holding plate 317 are fixed on the frame portions FC and FR, respectively, as arranged on the left and right of the vehicle by means of bolts. Then, the not-shown lead wires are connected with the control circuit, and the upper panel 12A and the lower panel 13C (or the airbag cover 312) of the dashboard 11 are mounted on the vehicle. Thus, the airbag device M8 can be mounted on the vehicle, as shown in FIG. 43.

Figure 49:
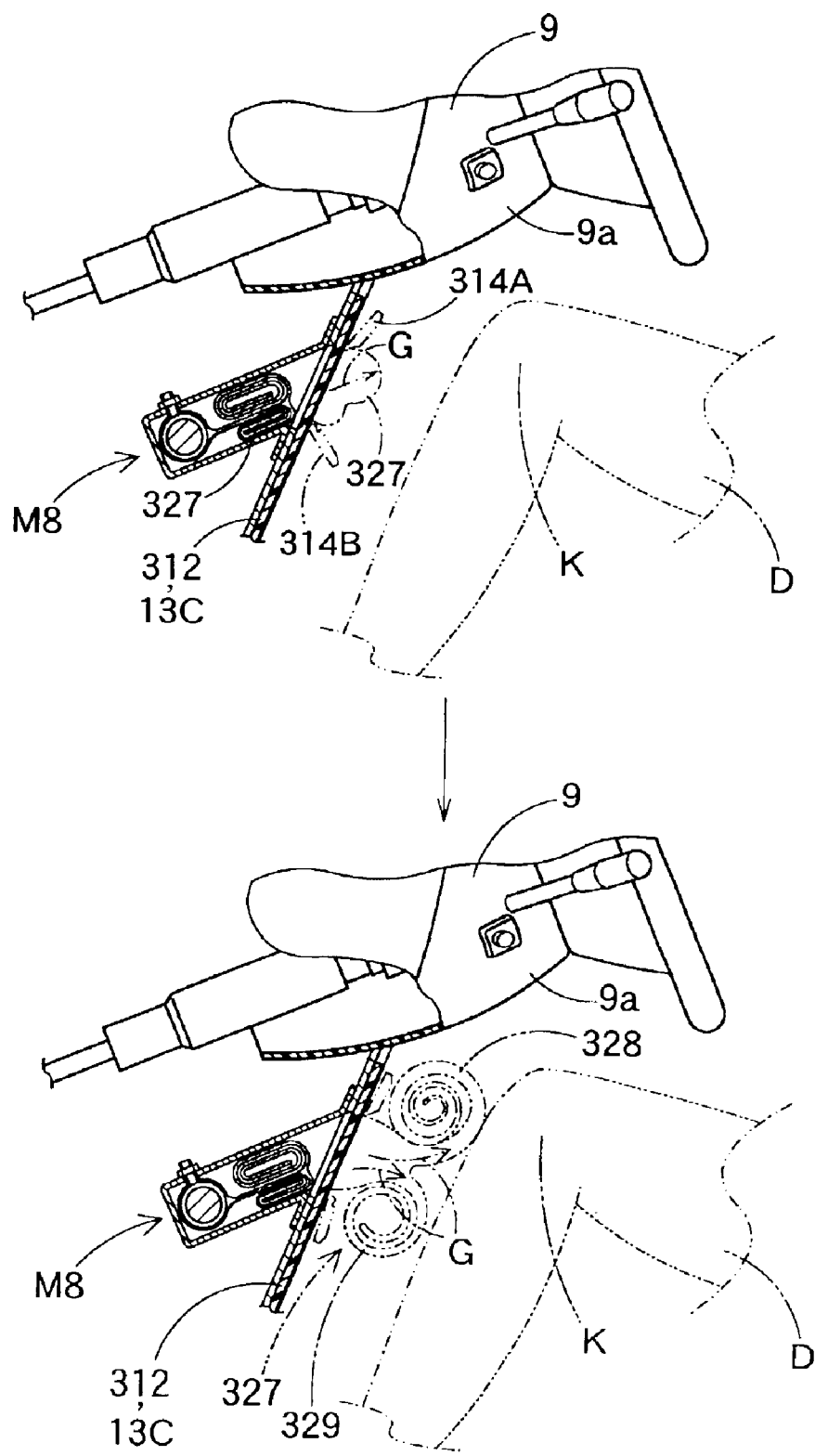
FIG. 49 presents diagrams for explaining the airbag of the eighth embodiment being expanded and inflated.
Figure 50:
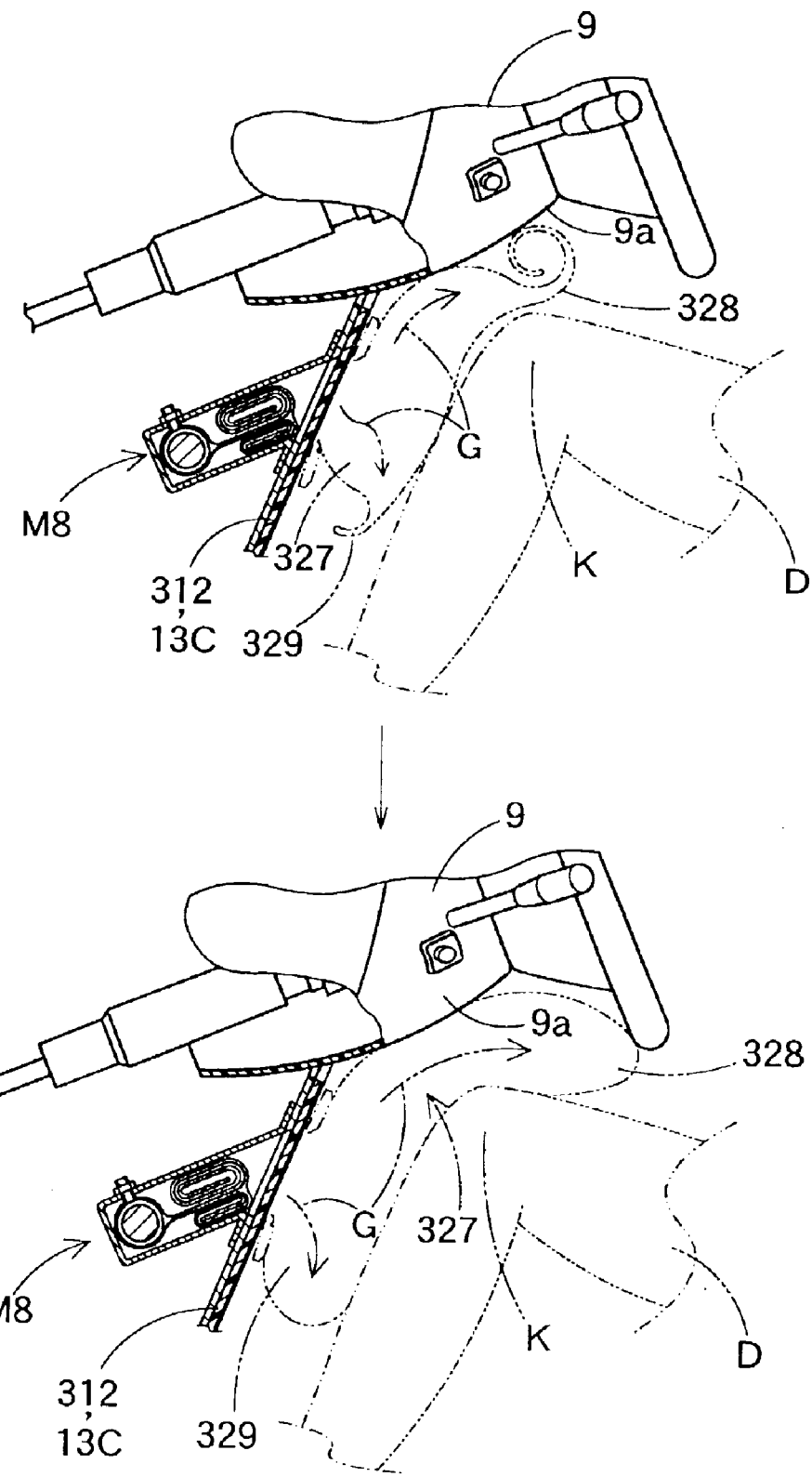
FIG. 50 presents diagrams for explaining the airbag of the eighth embodiment being expanded and inflated and shows the state after FIG. 49.

If a predetermined electric signal is inputted to the inflator body 22 after the airbag device M8 was mounted on the vehicle, the inflating gas G is discharged from the gas discharge ports 22a. Then, the airbag 326 is inflated, as shown in FIGS. 49 and 50, to break the not-shown wrapping film and to push and open the door portions 314 (314A and 314B) of the airbag cover 312 so that the upper portion 328 and the lower portion 329 are expanded and inflated upward and downward, along the column cover lower surface 9a and the surface of the airbag cover 312, respectively.

Figure 51:
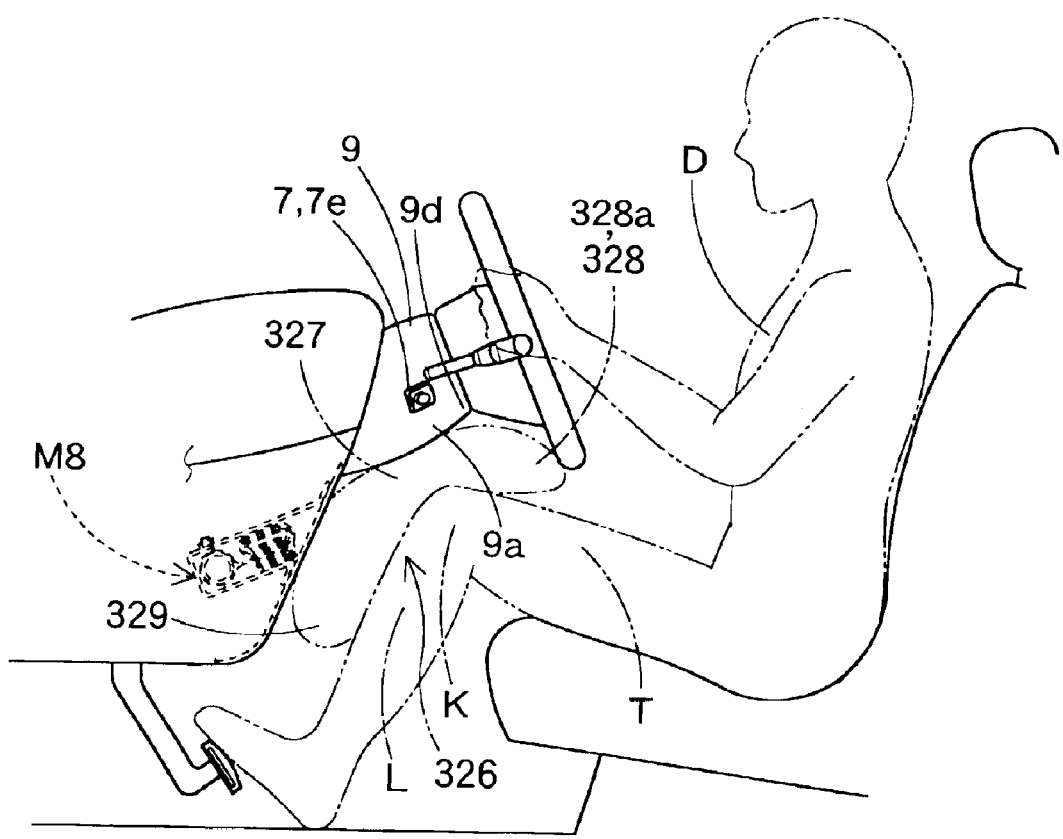
FIG. 51 is a schematic diagram showing the airbag of the eighth embodiment having completed the inflation.

In this eighth embodiment, when the airbag 326 is expanded and inflated, its upper portion 328 is expanded upward from the case 319 as the housing portion and is arranged, and the lower portion 329 is expanded downward from the case 319 as the housing portion and is arranged. Therefore, when the airbag 326 completes the expansion and inflation, as shown in FIG. 51, its upper portion 328 cushions the area from the upper portion of the knee K of the driver D to the vicinity of the thigh T against the lower surface 9a of the column cover 9 and the lower side near the control lever 7e, the key cylinder 61 and the release lever 62, and its lower portion 329 cushions the area from the lower portion of the knee K of the driver D to the vicinity of the leg L against the lower panel 13C and the column cover lower surface 9a. As a result, the airbag 326 expanded and inflated protects the knee K of the driver D properly over the wide range.

When the airbag 326 is expanded and inflated, the vicinity of the boundary between the upper portion 328 and the lower portion in the body portion 327 is once protruded to the rear side of the vehicle. However, the upper portion 328 and the lower portion 329 are individually folded in the rolled shape. At the time of the expansion and inflation, therefore, as shown in FIGS. 49 and 50, while unrolling, the upper portion 328 expands and inflates with its upper end 328a ascending along the column cover lower surface 9a, and the lower portion 329 expands and inflates with its lower end 329a descending along the surface of the airbag cover 312 (or the lower panel 13c). As a result, the airbag 326 is restrained from protruding toward the knee K and putting a pressure on the knee K of the driver D. Moreover, the airbag 326 of the embodiment can be smoothly expanded while being unrolled, even if it comes into contact with the knee K of the driver D.

In the airbag 326 of the eighth embodiment, on the other hand, the left and right edges 327a and 327b of the body portion 327 are rolled to the front side of the vehicle. At the time of the expansion and inflation, therefore, the upper portion 328 and the lower portion 329 are expanded to the left and right sides while being unrolled transversely, too.

In the eighth embodiment, moreover, the tether 333D is arranged near the mounting portion 330 in the upper portion 328 and generally in parallel with the transverse direction of the vehicle. Into the upper portion 328, on the other hand, there flows the inflating gas G from the gas communication holes 327e near the left and right ends 333a and 333b of the tether 333D. At the beginning of the inflation, therefore, the upper portion 328 is inflated and expanded to the left and right sides. As a result, the eighth embodiment can further suppress the protrusion of the airbag 326 toward the knee K.

Figure 52:
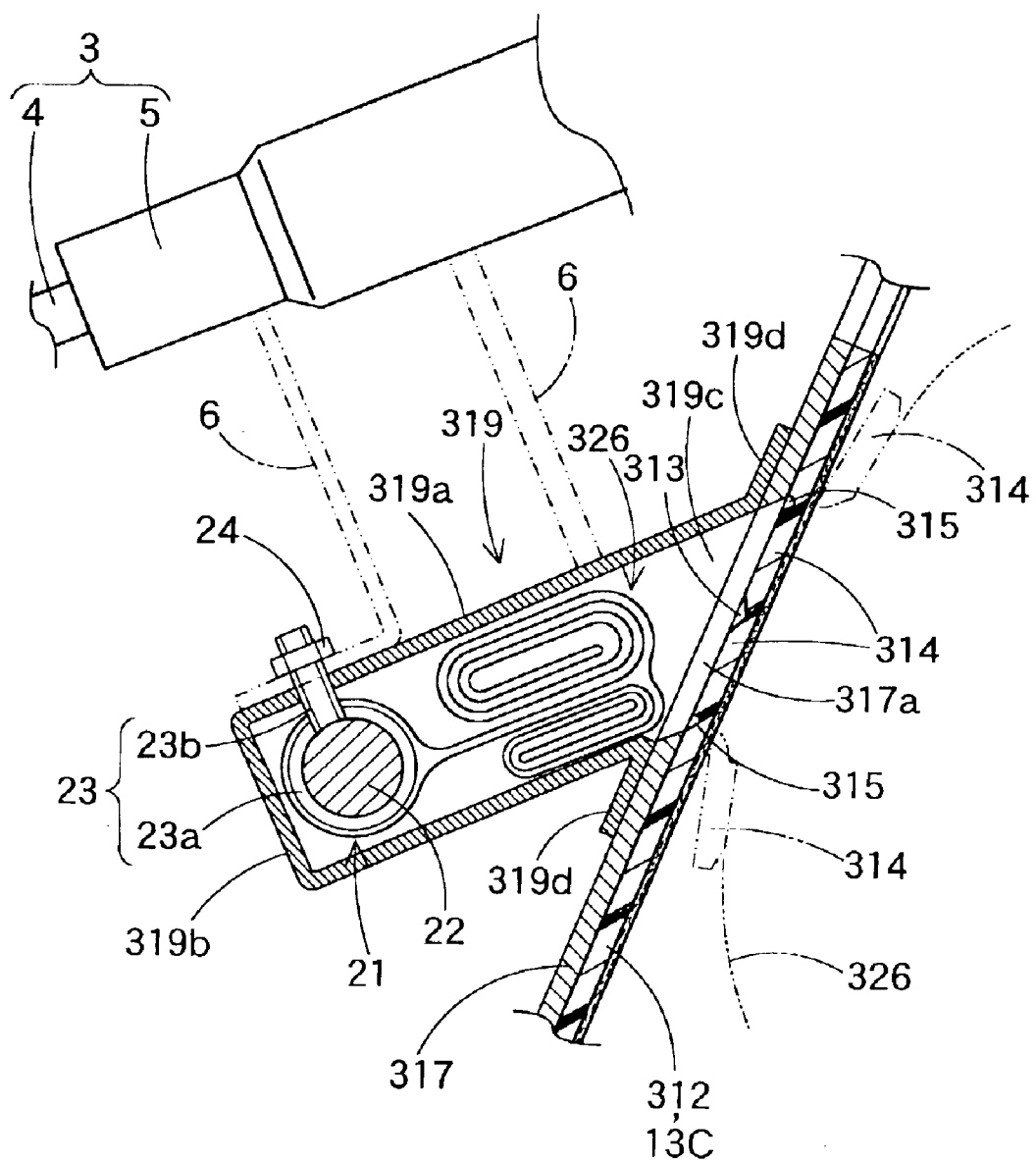
FIG. 52 is a sectional view showing a modification of the eighth embodiment.

In the eighth embodiment, on the other hand, the holding plate 317 made of a sheet metal and fixing the case 319 is fixed at both transverse ends on the frame portions FC and FR, as arranged on the left and right thereof. Therefore, the airbag device M8 is stably held on the frame portions FC and FR. Moreover, the airbag 326 having completed the expansion and inflation is also stably supported by the holding plate 317. Without considering these points, the construction may also be modified to eliminate the holding plate 317. As shown by double-dotted lines in FIG. 52, more specifically, the case 319 may be connected to and fixed to an immovable portion of the column tube 5 of the steering column 3, by using the bracket 6. Naturally, the construction may also be modified such that the case 319 is fixed on both the bracket 6 and the holding plate 317. With this construction, the case 319 is fixed at two portions, i.e., the bracket 6 and the holding plate 317. Therefore, the airbag device M8 is more stably held.

In the eighth embodiment, still moreover, the peripheral wall portion 319a of the case 319 has its axial direction O generally in parallel with that of the steering column 3. When the airbag 326 is protruded along the column cover lower surface 9a to the rear side of the vehicle, therefore, the airbag (especially its upper portion 328) goes smoothly into the clearance between the column cover 9 and the knee K of the driver D. As a result, the airbag 326 can protect the vicinity of the upper portion of the knee K of the driver D more properly.

Figure 53:
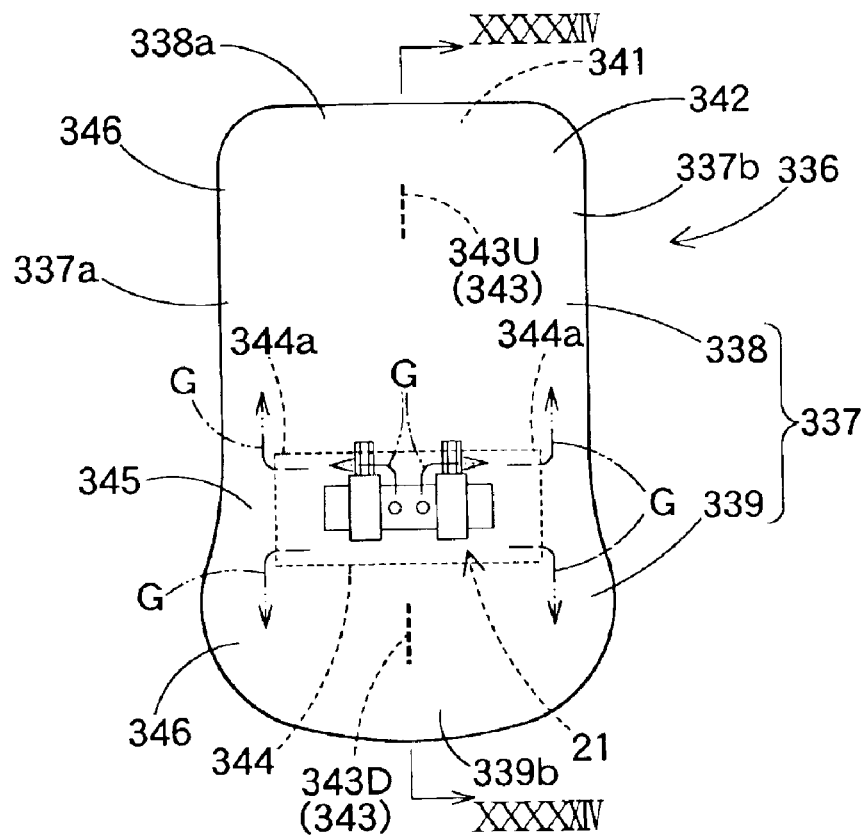
FIG. 53 is a top plan view showing a modification of the airbag of the eighth embodiment.
Figure 54:
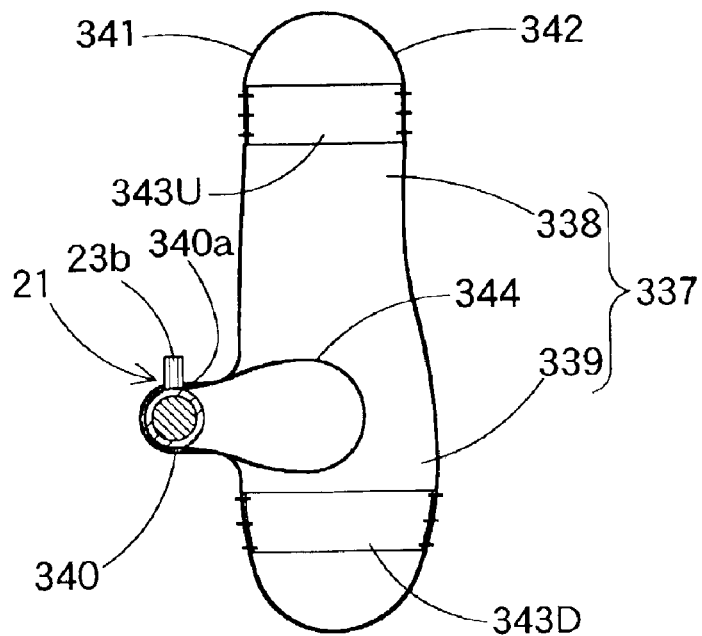
FIG. 54 is a sectional view showing a portion XXXXXIV—XXXXXIV of FIG. 53.

On the other hand, the airbag may be exemplified by an airbag 336 shown in FIGS. 53 and 54. This airbag 336 is provided, like the aforementioned airbag 326, with a body portion 337 and a mounting portion 340, and the body portion 337 is provided with an upper portion 338 and a lower portion 339. In the mounting portion 340, there are formed through holes 340a for inserting the bolts 23b of the inflator 21 thereinto. In the airbag 336, moreover, there is arranged a commutator cloth 344 acting as the gas flow regulating member. This commutator cloth 344 is formed into such a generally cylindrical shape as to cover the outer periphery of the inflator 21. In the commutator cloth 344, moreover, there are arranged openings 344a and 344a on the two transverse sides of the vehicle. In this airbag 336, an upstream portion 345 for the inflating gas G is arranged near the commutator cloth 344, and downstream portions 346 for the inflating gas G are arranged at two portions, that is, on the upper side of the commutator cloth 344 in the upper portion 338 and on the lower side of the commutator cloth 344 in the lower portion 339.

In the upper portion 338 and the lower portion 339, on the other hand, there are individually arranged tethers 343 (343D and 343U) for connecting a column cover side wall portion 341 and a driver side wall portion 342 to each other. The individual tethers 343 are arranged at the transverse center and along the vertical direction of the vehicle.

This airbag 336 is also folded like the airbag 326 and is housed in the case 319. When the airbag 336 is expanded and inflated, moreover, the inflating gas G to be discharged from the inflator 21 flows to both the left and right sides from the openings 344a and 344a of the commutator cloth 344, as shown in FIG. 53. Therefore, the inflating gas G from the inflator 21 is prevented from flowing directly into the upper portion 338 and the lower portion 339. Then, the inflating gas G flows from the sides of the left and right edges 337a and 337b of the body portion 337 to the upper end 338a of the upper portion 338 and to the lower end 339a of the lower portion 339. As a result, the upper and lower portions 338 and 339 are expanded and inflated while the vicinity of the commutator cloth 344 of the body portion 337 being expanded transversely. At the beginning of the inflation, more specifically, the upper portion 338 and the lower portion 339 are expanded and inflated enlarging the width in the transverse direction without protruding to the driver D, so that the thigh T, the knee K and the leg L of the driver D are protected properly.

What is claimed is:

1. A knee protecting airbag device for protecting the knee of a driver with an airbag to be expanded and inflated by an inflating gas, wherein:

said airbag, when having completed expansion and inflation, is configured in a shape to cover at least the lower surface of a column cover covering a steering column; and a portion of the airbag is configured to cover a hard area of the column cover and is thicker than a remaining general portion, the hard area being formed of a material harder than the column cover.

2. The knee protecting airbag device as set forth in claim 1, wherein:

said airbag, when having completed expansion and inflation, is configured in a generally plate shape and is configured to cover only a substantial lower surface of a column cover covering a steering column.

3. The knee protecting airbag device as set forth in claim 1, wherein:

said airbag, when having completed expansion and inflation, is configured in a generally plate shape.

4. A knee protecting airbag device as set forth in claim 1, wherein said hard portion is defined by the arranged position of at least a key cylinder on or near said column cover.

5. A knee protecting airbag device as set forth in claim 1, wherein:

the shape of said airbag is a generally plate shape; and the thickness of said airbag is set by partially connected peripheral walls opposite to each other in the thickness direction.

6. A knee protecting airbag device as set forth in claim 5, wherein said peripheral walls are connected at at least one connection portion arranged at a plurality of positions in said airbag.

7. A knee protecting airbag device as set forth in claim 5, wherein:

said peripheral walls are constructed to include a column cover side wall portion and a driver side wall portion opposite to each other;

said at least one connection portion is formed by connecting a band-shape tether to said column cover side wall portion at a first joint and said driver side wall portion opposite thereto at a second joint; and said second joint is disposed, at a position which is more distant from the portion covering said hard area than a position on the driver side wall opposite from the first joint.

8. A knee protecting airbag device as set forth in claim 1, wherein the portion covering said hard area is arranged closer to the downstream side of said inflating gas than said general portion.

9. The knee protecting airbag device as set forth in claim 1, wherein:

said airbag is folded and housed on the lower side of a steering column and is constructed to include: an upper portion configured to be expanded upward from a housed portion of said airbag and configured when having completed expansion to cover at least the lower surface of said column cover covering said steering column; and a lower portion configured to be expanded downward from the housed portion of said airbag at the time of the expansion and inflation.

* * * * *